(12) United States Patent
Guillebault et al.

(10) Patent No.: US 12,509,735 B2
(45) Date of Patent: Dec. 30, 2025

(54) USE OF PROBES TO DETECT TOXINOGENIC CYANOBACTERIA, DETECTION METHOD AND CORRESPONDING KITS

(71) Applicant: MICROBIA ENVIRONNEMENT, Saint-Jean Laseille (FR)

(72) Inventors: Delphine Guillebault, Saint-Jean-Laseille (FR); Elisa Villa, Port Vendres (FR); Linda Crawford, Pessac sur Dordogne (FR)

(73) Assignee: MICROBIA ENVIRONNEMENT, Saint-Jean Laseille (FR)

( * ) Notice: Subject to any disclaimer, the term of this patent is extended or adjusted under 35 U.S.C. 154(b) by 912 days.

(21) Appl. No.: 17/603,125

(22) PCT Filed: Apr. 10, 2020

(86) PCT No.: PCT/EP2020/060334
§ 371 (c)(1),
(2) Date: Oct. 12, 2021

(87) PCT Pub. No.: WO2020/208235
PCT Pub. Date: Oct. 15, 2020

(65) Prior Publication Data
US 2022/0186293 A1    Jun. 16, 2022

(30) Foreign Application Priority Data
Apr. 11, 2019  (FR) ...................................... 1903904

(51) Int. Cl.
C12Q 1/68       (2018.01)
C12Q 1/6888     (2018.01)
C12Q 1/689      (2018.01)

(52) U.S. Cl.
CPC .................................. *C12Q 1/689* (2013.01)

(58) Field of Classification Search
None
See application file for complete search history.

(56) References Cited

U.S. PATENT DOCUMENTS

2016/0256380 A1   9/2016  Smith

FOREIGN PATENT DOCUMENTS

CN     108 504 764 A     9/2018

OTHER PUBLICATIONS

Johnson et al. A Cantilever Biosensor-Based Assay for Toxin-Producing Cyanobacteria Microcystis aeruginosa using 16S rRNA. Environ. Sci. Technol. 2013, 47, 12333-12341.*
Matsunaga et al. 16S rRNA-Targeted identification of cyanobacterial genera using oligonucleotide-probes immobilized on bacterial magnetic particles. Journal of Applied Phycology 13: 389-394, 2001.*
Noguera et al. Mathematical tools to optimize the design of oligonucleotide probes and primers. Appl Microbiol Biotechnol (2014) 98: 9595-9608.*
GenBank: LC455594.1. Microcystis aeruginosa NIES-3797 gene for 16S ribosomal RNA, partial sequence. Dated Feb. 5, 2019.*
GenBank: KR813838.1. Aphanizomenon gracile DC-1 16S ribosomal RNA gene, partial sequence. Dated May 31, 2016.*
GenBank: KC242809.1. Dolichospermum planctonicum ES0931S1 16S ribosomal RNA gene, partial sequence. Dated Jan. 3, 2014.*
GenBank: EF568912.1. *Anabaena* sp. BIR256 16S ribosomal RNA gene, partial sequence. Dated Apr. 30, 2008.*
GenBank: GU903497.1. Planktothrix agardhii ENCB-PO01 16S ribosomal RNA gene, partial sequence. Dated Apr. 18, 2012.*
French Search Report issued on Jan. 28, 2020 in corresponding French Application No. 1903904; 4 pages.
International Search Report (with English translation) and Written Opinion (with Machine translation) issued on Aug. 3, 2020 in corresponding International Application No. PCT/EP2020/060334, 29 pages.
Tadashi Matsunaga et al: "16S rRNA-Targeted identification of cyanobacterial genera using oligonucleotide-probes Immobilized on bacterial magnetic particles", Journal of Applied Phycology, Aug. 1, 2001, pp. 389-394, 6pgs.
Nicole M Dearth, University of South Carolina, Scholar Commons, "Development of a Sandwich Hybridization Assay for the Harmful *Cyanobacteria microcystis* spp.", Dec. 31, 2017, Retrieved from the Internet: https://scholarcommons.sc.edu/cgi/viewcontent.cgi?article=55 I 6&context=etd, 83 pgs.
Jing Ping Zhu et al: "Identification and enumeration of Microcystis using a sandwich hybridization assay", The Journal of Microbiology, the Microbiological Society of Korea, Heidelberg, vol. 50, No. 2, Apr. 27, 2012, pp. 186-190, 5 pgs.
T. Kaneko et al: "Complete Genomic Structure of the Bloom-forming Toxic Cyanobacterium Microcystis aeruginosa NIES-843", DNA Research, vol. 14, No. 6, Jan. 7, 2008, pp. 247-256, 10 pgs.
"MG_Bb0008L08.F MG_Bb Mimulus guttatus genomic 5', genomic survey sequence.", Sep. 12, 2009, retrieved from EBI accession No. EM_GSS:GS461665, abstract No. Database accession No. GS461665, Retrieved from: EMBL [online] , 1 pg.
"*Shigella* sp. rRNA targeted helper sequence. SEQ ID 812.", Oct. 27, 2011, retrieved from EBI accession No. GSN: AZM52119, abstract No. Database accession No. AZM52119, Retrieved from: Geneseq [online] , 1 pg.
"*Microcystis* sp. amplicon fragment.", Feb. 26, 2015, retrieved from EBI accession No. GSN:BBT80761, abstract No. Database accession No. BBT80761, Retrieved from: Geneseq [online] , 1 pg.
"Uncultured bacterium clone D54RV7Z04CIXOK 16S ribosomal RNA gene, partial sequence.", Jun. 16, 2010, retrieved from EBI accession No. EM_STD:GU342365, abstract No. Database accession No. GU342365, Retrieved from: EMBL [online] , 1 pg.

* cited by examiner

*Primary Examiner* — Nianxiang Zou
(74) *Attorney, Agent, or Firm* — Maier & Maier, PLLC

(57) ABSTRACT

Probes for the detection of toxinogenic cyanobacteria, and the use of at least one pair of these probes in a method for the detection of the toxinogenic cyanobacteria in a sample likely to contain the toxinogenic cyanobacteria. Also, corresponding kits including at least one pair probes specific to toxinogenic cyanobacteria.

18 Claims, 6 Drawing Sheets

Specification includes a Sequence Listing.

A

B

SEQUENCE LISTING

```
<160> NUMBER OF SEQ ID NOS: 80

<210> SEQ ID NO 1
<211> LENGTH: 26
<212> TYPE: DNA
<213> ORGANISM: Artificial sequence
<220> FEATURE:
<223> OTHER INFORMATION: Probes
<220> FEATURE:
<221> NAME/KEY: misc_feature
<222> LOCATION: (1)..(26)
<223> OTHER INFORMATION: B = C, G ou T

<400> SEQUENCE: 1
gccaattagg tttcacctbg cggcac                                      26

<210> SEQ ID NO 2
<211> LENGTH: 28
<212> TYPE: DNA
<213> ORGANISM: Artificial sequence
<220> FEATURE:
<223> OTHER INFORMATION: Probes

<400> SEQUENCE: 2
atcgggtatt agcagtcgtt tccaactg                                    28
```

```
<210> SEQ ID NO 3
<211> LENGTH: 27
<212> TYPE: DNA
<213> ORGANISM: Artificial sequence
<220> FEATURE:
<223> OTHER INFORMATION: Probes

<400> SEQUENCE: 3
gctaatcaga cgcaagctct tctccag                                             27

<210> SEQ ID NO 4
<211> LENGTH: 29
<212> TYPE: DNA
<213> ORGANISM: Artificial sequence
<220> FEATURE:
<223> OTHER INFORMATION: Probes

<400> SEQUENCE: 4
ttgtccccgt cctgaagtta gattcttac                                           29

<210> SEQ ID NO 5
<211> LENGTH: 26
<212> TYPE: DNA
<213> ORGANISM: Artificial sequence
<220> FEATURE:
<223> OTHER INFORMATION: Probes

<400> SEQUENCE: 5
gaattcctgc tacccctact gctctc                                              26

<210> SEQ ID NO 6
<211> LENGTH: 27
<212> TYPE: DNA
<213> ORGANISM: Artificial sequence
<220> FEATURE:
<223> OTHER INFORMATION: Probes

<400> SEQUENCE: 6
tagtctgcca gtttccaccg cctttag                                             27

<210> SEQ ID NO 7
<211> LENGTH: 26
<212> TYPE: DNA
<213> ORGANISM: Artificial sequence
<220> FEATURE:
<223> OTHER INFORMATION: Probes

<400> SEQUENCE: 7
gtcgttaagc aacctgattt gacggc                                              26

<210> SEQ ID NO 8
<211> LENGTH: 22
<212> TYPE: DNA
<213> ORGANISM: Artificial sequence
<220> FEATURE:
<223> OTHER INFORMATION: Probes

<400> SEQUENCE: 8
gctgctggca cggagttagc cg                                                  22

<210> SEQ ID NO 9
<211> LENGTH: 24
<212> TYPE: DNA
<213> ORGANISM: Artificial sequence
<220> FEATURE:
<223> OTHER INFORMATION: Probes
```

<400> SEQUENCE: 9
aggctgattc ctcaagtacc gtca                                              24

<210> SEQ ID NO 10
<211> LENGTH: 35
<212> TYPE: DNA
<213> ORGANISM: Artificial sequence
<220> FEATURE:
<223> OTHER INFORMATION: Probes

<400> SEQUENCE: 10
ttccggataa cgcttgcctc ccccgtatta ccgcg                                  35

<210> SEQ ID NO 11
<211> LENGTH: 33
<212> TYPE: DNA
<213> ORGANISM: Artificial sequence
<220> FEATURE:
<223> OTHER INFORMATION: Probes

<400> SEQUENCE: 11
gaacttcttc cttgagaaaa gaggtttaca atc                                    33

<210> SEQ ID NO 12
<211> LENGTH: 26
<212> TYPE: DNA
<213> ORGANISM: Artificial sequence
<220> FEATURE:
<223> OTHER INFORMATION: Probes

<400> SEQUENCE: 12
ccgcgtgagg gaggaaggtc tttgga                                            26

<210> SEQ ID NO 13
<211> LENGTH: 35
<212> TYPE: DNA
<213> ORGANISM: Artificial sequence
<220> FEATURE:
<223> OTHER INFORMATION: Probes

<400> SEQUENCE: 13
ttgtaaacct cttttctcaa ggaagaagtt ctgac                                  35

<210> SEQ ID NO 14
<211> LENGTH: 27
<212> TYPE: DNA
<213> ORGANISM: Artificial sequence
<220> FEATURE:
<223> OTHER INFORMATION: Probes

<400> SEQUENCE: 14
ggtacttgag gaatcagcct cggctaa                                           27

<210> SEQ ID NO 15
<211> LENGTH: 27
<212> TYPE: DNA
<213> ORGANISM: Artificial sequence
<220> FEATURE:
<223> OTHER INFORMATION: Probes

<400> SEQUENCE: 15
agcaacctga tttgacggca gacttgg                                           27

<210> SEQ ID NO 16
<211> LENGTH: 24

<212> TYPE: DNA
<213> ORGANISM: Artificial sequence
<220> FEATURE:
<223> OTHER INFORMATION: Probes

<400> SEQUENCE: 16
ctgaccacct gcggacgctt tacg                                              24

<210> SEQ ID NO 17
<211> LENGTH: 27
<212> TYPE: DNA
<213> ORGANISM: Artificial sequence
<220> FEATURE:
<223> OTHER INFORMATION: Probes

<400> SEQUENCE: 17
ccagtttcca ccgcctttag gtcgtta                                           27

<210> SEQ ID NO 18
<211> LENGTH: 27
<212> TYPE: DNA
<213> ORGANISM: Artificial sequence
<220> FEATURE:
<223> OTHER INFORMATION: Probes

<400> SEQUENCE: 18
tgagtgtcag atacagccca gtagcac                                           27

<210> SEQ ID NO 19
<211> LENGTH: 24
<212> TYPE: DNA
<213> ORGANISM: Artificial sequence
<220> FEATURE:
<223> OTHER INFORMATION: Probes

<400> SEQUENCE: 19
gctttcgcca ccgatgttct tccc                                              24

<210> SEQ ID NO 20
<211> LENGTH: 24
<212> TYPE: DNA
<213> ORGANISM: Artificial sequence
<220> FEATURE:
<223> OTHER INFORMATION: Probes

<400> SEQUENCE: 20
aattccctct gccccgacca cact                                              24

<210> SEQ ID NO 21
<211> LENGTH: 26
<212> TYPE: DNA
<213> ORGANISM: Artificial sequence
<220> FEATURE:
<223> OTHER INFORMATION: Probes

<400> SEQUENCE: 21
ctagctttgt agtttccact gctctt                                            26

<210> SEQ ID NO 22
<211> LENGTH: 32
<212> TYPE: DNA
<213> ORGANISM: Artificial sequence
<220> FEATURE:
<223> OTHER INFORMATION: Probes

<400> SEQUENCE: 22

-continued

```
atttggttga gccaaactct ttaacagcag ac                                32
```

<210> SEQ ID NO 23
<211> LENGTH: 30
<212> TYPE: DNA
<213> ORGANISM: Artificial sequence
<220> FEATURE:
<223> OTHER INFORMATION: Probes

<400> SEQUENCE: 23

```
gcactcccat ctttcaacag gattcgtgac                                   30
```

<210> SEQ ID NO 24
<211> LENGTH: 32
<212> TYPE: DNA
<213> ORGANISM: Artificial sequence
<220> FEATURE:
<223> OTHER INFORMATION: Probes

<400> SEQUENCE: 24

```
gccatgcacc acctgtgttc acgctcccga ag                                32
```

<210> SEQ ID NO 25
<211> LENGTH: 25
<212> TYPE: DNA
<213> ORGANISM: Artificial sequence
<220> FEATURE:
<223> OTHER INFORMATION: Probes

<400> SEQUENCE: 25

```
ctcttcccca ggcagcaagc ctttc                                        25
```

<210> SEQ ID NO 26
<211> LENGTH: 31
<212> TYPE: DNA
<213> ORGANISM: Artificial sequence
<220> FEATURE:
<223> OTHER INFORMATION: Probes

<400> SEQUENCE: 26

```
acactaccaa ctagctaatc agacgcaagc t                                 31
```

<210> SEQ ID NO 27
<211> LENGTH: 28
<212> TYPE: DNA
<213> ORGANISM: Artificial sequence
<220> FEATURE:
<223> OTHER INFORMATION: Probes

<400> SEQUENCE: 27

```
tttccactgc tttgatctgg ttgagcca                                     28
```

<210> SEQ ID NO 28
<211> LENGTH: 30
<212> TYPE: DNA
<213> ORGANISM: Artificial sequence
<220> FEATURE:
<223> OTHER INFORMATION: Probes

<400> SEQUENCE: 28

```
gactctttaa cagcagacat acaatgccac                                   30
```

<210> SEQ ID NO 29
<211> LENGTH: 23
<212> TYPE: DNA
<213> ORGANISM: Artificial sequence

```
<220> FEATURE:
<223> OTHER INFORMATION: Probes

<400> SEQUENCE: 29
ctgcggaccc tttacgccca atc                                             23

<210> SEQ ID NO 30
<211> LENGTH: 26
<212> TYPE: DNA
<213> ORGANISM: Artificial sequence
<220> FEATURE:
<223> OTHER INFORMATION: Probes

<400> SEQUENCE: 30
cagacataca atgccacctg cggacc                                          26

<210> SEQ ID NO 31
<211> LENGTH: 32
<212> TYPE: DNA
<213> ORGANISM: Artificial sequence
<220> FEATURE:
<223> OTHER INFORMATION: Probes

<400> SEQUENCE: 31
ctttgatctg gttgagccag actctttaac ag                                   32

<210> SEQ ID NO 32
<211> LENGTH: 31
<212> TYPE: DNA
<213> ORGANISM: Artificial sequence
<220> FEATURE:
<223> OTHER INFORMATION: Probes

<400> SEQUENCE: 32
cgaccatact ctagctttgt agtttccact g                                    31

<210> SEQ ID NO 33
<211> LENGTH: 26
<212> TYPE: DNA
<213> ORGANISM: Artificial sequence
<220> FEATURE:
<223> OTHER INFORMATION: Probes

<400> SEQUENCE: 33
ctctgccccg accacactct agcttt                                          26

<210> SEQ ID NO 34
<211> LENGTH: 25
<212> TYPE: DNA
<213> ORGANISM: Artificial sequence
<220> FEATURE:
<223> OTHER INFORMATION: Probes

<400> SEQUENCE: 34
gtagtttcca ctgctcttat ttggt                                           25

<210> SEQ ID NO 35
<211> LENGTH: 30
<212> TYPE: DNA
<213> ORGANISM: Artificial sequence
<220> FEATURE:
<223> OTHER INFORMATION: Probes

<400> SEQUENCE: 35
tgagccaaac tctttaacag cagacttaca                                      30
```

```
<210> SEQ ID NO 36
<211> LENGTH: 28
<212> TYPE: DNA
<213> ORGANISM: Artificial sequence
<220> FEATURE:
<223> OTHER INFORMATION: Probes

<400> SEQUENCE: 36
catttcaccg ctacaccagg aattccct                                          28

<210> SEQ ID NO 37
<211> LENGTH: 32
<212> TYPE: DNA
<213> ORGANISM: Artificial sequence
<220> FEATURE:
<223> OTHER INFORMATION: Probes

<400> SEQUENCE: 37
tagactcttt aacagcagac tttcaatgcc ac                                     32

<210> SEQ ID NO 38
<211> LENGTH: 24
<212> TYPE: DNA
<213> ORGANISM: Artificial sequence
<220> FEATURE:
<223> OTHER INFORMATION: Probes

<400> SEQUENCE: 38
ctgccccgac cacactctag cttt                                              24

<210> SEQ ID NO 39
<211> LENGTH: 30
<212> TYPE: DNA
<213> ORGANISM: Artificial sequence
<220> FEATURE:
<223> OTHER INFORMATION: Probes

<400> SEQUENCE: 39
gtagtttcca ctgctcttat ctagttgagc                                        30

<210> SEQ ID NO 40
<211> LENGTH: 27
<212> TYPE: DNA
<213> ORGANISM: Artificial sequence
<220> FEATURE:
<223> OTHER INFORMATION: Probes
<220> FEATURE:
<221> NAME/KEY: misc_feature
<222> LOCATION: (1)..(27)
<223> OTHER INFORMATION: Y = C ou T

<400> SEQUENCE: 40
ggcacttcca tctttcaaya gaattcg                                           27

<210> SEQ ID NO 41
<211> LENGTH: 24
<212> TYPE: DNA
<213> ORGANISM: Artificial sequence
<220> FEATURE:
<223> OTHER INFORMATION: Probes

<400> SEQUENCE: 41
accacctgtg ttcacgttcc cgaa                                              24

<210> SEQ ID NO 42
<211> LENGTH: 29
```

```
<212> TYPE: DNA
<213> ORGANISM: Artificial sequence
<220> FEATURE:
<223> OTHER INFORMATION: Probes

<400> SEQUENCE: 42
tgacatgtca agccttggta aggttcttc                                    29

<210> SEQ ID NO 43
<211> LENGTH: 24
<212> TYPE: DNA
<213> ORGANISM: Artificial sequence
<220> FEATURE:
<223> OTHER INFORMATION: Probes

<400> SEQUENCE: 43
attccctctg ccccgaacgt actc                                         24

<210> SEQ ID NO 44
<211> LENGTH: 29
<212> TYPE: DNA
<213> ORGANISM: Artificial sequence
<220> FEATURE:
<223> OTHER INFORMATION: Probes

<400> SEQUENCE: 44
tagctctgta gtttccactg cctttacaa                                    29

<210> SEQ ID NO 45
<211> LENGTH: 32
<212> TYPE: DNA
<213> ORGANISM: Artificial sequence
<220> FEATURE:
<223> OTHER INFORMATION: Probes

<400> SEQUENCE: 45
ggttgagcct tgctctttaa cagcagactt ac                                32

<210> SEQ ID NO 46
<211> LENGTH: 24
<212> TYPE: DNA
<213> ORGANISM: Artificial sequence
<220> FEATURE:
<223> OTHER INFORMATION: Probes

<400> SEQUENCE: 46
ttcacgctcc cgaaggcact ccta                                         24

<210> SEQ ID NO 47
<211> LENGTH: 24
<212> TYPE: DNA
<213> ORGANISM: Artificial sequence
<220> FEATURE:
<223> OTHER INFORMATION: Probes

<400> SEQUENCE: 47
gacgacagcc atgcaccacc tgtg                                         24

<210> SEQ ID NO 48
<211> LENGTH: 31
<212> TYPE: DNA
<213> ORGANISM: Artificial sequence
<220> FEATURE:
<223> OTHER INFORMATION: Probes

<400> SEQUENCE: 48
```

-continued tatttctaca ggattcgtga catgtcaagc c          31

<210> SEQ ID NO 49
<211> LENGTH: 25
<212> TYPE: DNA
<213> ORGANISM: Artificial sequence
<220> FEATURE:
<223> OTHER INFORMATION: Probes

<400> SEQUENCE: 49
agcagacaaa caatgccacc tgcgg          25

<210> SEQ ID NO 50
<211> LENGTH: 33
<212> TYPE: DNA
<213> ORGANISM: Artificial sequence
<220> FEATURE:
<223> OTHER INFORMATION: Probes

<400> SEQUENCE: 50
ctgctcttat ttggttgagc caaactcttt aac          33

<210> SEQ ID NO 51
<211> LENGTH: 29
<212> TYPE: DNA
<213> ORGANISM: Artificial sequence
<220> FEATURE:
<223> OTHER INFORMATION: Probes

<400> SEQUENCE: 51
ccgaccatac tctagctttg tagtttcca          29

<210> SEQ ID NO 52
<211> LENGTH: 30
<212> TYPE: DNA
<213> ORGANISM: Artificial sequence
<220> FEATURE:
<223> OTHER INFORMATION: Probes

<400> SEQUENCE: 52
tagtttccac tgctcttatt tggttgagcc          30

<210> SEQ ID NO 53
<211> LENGTH: 22
<212> TYPE: DNA
<213> ORGANISM: Artificial sequence
<220> FEATURE:
<223> OTHER INFORMATION: Probes

<400> SEQUENCE: 53
ccccgaccac actctagctt tg          22

<210> SEQ ID NO 54
<211> LENGTH: 33
<212> TYPE: DNA
<213> ORGANISM: Artificial sequence
<220> FEATURE:
<223> OTHER INFORMATION: Probes

<400> SEQUENCE: 54
aaactcttta acagcagact tacaatgcca cct          33

<210> SEQ ID NO 55
<211> LENGTH: 27
<212> TYPE: DNA
<213> ORGANISM: Artificial sequence

```
<220> FEATURE:
<223> OTHER INFORMATION: Probes

<400> SEQUENCE: 55
cccgaaggca cttccatctt tcaatag                                27

<210> SEQ ID NO 56
<211> LENGTH: 32
<212> TYPE: DNA
<213> ORGANISM: Artificial sequence
<220> FEATURE:
<223> OTHER INFORMATION: Probes

<400> SEQUENCE: 56
aattcgtgac atgtcaagcc ttggtaaggt tc                          32

<210> SEQ ID NO 57
<211> LENGTH: 25
<212> TYPE: DNA
<213> ORGANISM: Artificial sequence
<220> FEATURE:
<223> OTHER INFORMATION: Probes

<400> SEQUENCE: 57
ccactgcttt tatttggttg agcca                                  25

<210> SEQ ID NO 58
<211> LENGTH: 27
<212> TYPE: DNA
<213> ORGANISM: Artificial sequence
<220> FEATURE:
<223> OTHER INFORMATION: Probes

<400> SEQUENCE: 58
cccgaccaca ctctagcttt gtagttt                                27

<210> SEQ ID NO 59
<211> LENGTH: 31
<212> TYPE: DNA
<213> ORGANISM: Artificial sequence
<220> FEATURE:
<223> OTHER INFORMATION: Probes

<400> SEQUENCE: 59
aactctttaa cagcagactt acaatgccac c                           31

<210> SEQ ID NO 60
<211> LENGTH: 22
<212> TYPE: DNA
<213> ORGANISM: Artificial sequence
<220> FEATURE:
<223> OTHER INFORMATION: Probes

<400> SEQUENCE: 60
ctctgccccg accaaactct ag                                     22

<210> SEQ ID NO 61
<211> LENGTH: 32
<212> TYPE: DNA
<213> ORGANISM: Artificial sequence
<220> FEATURE:
<223> OTHER INFORMATION: Probes

<400> SEQUENCE: 61
ccaaactctt taacagcaga ctttcaatgc ca                          32
```

```
<210> SEQ ID NO 62
<211> LENGTH: 34
<212> TYPE: DNA
<213> ORGANISM: Artificial sequence
<220> FEATURE:
<223> OTHER INFORMATION: Probes

<400> SEQUENCE: 62
gctttgtagt ttccactgct tttatttggt tgag                              34

<210> SEQ ID NO 63
<211> LENGTH: 27
<212> TYPE: DNA
<213> ORGANISM: Artificial sequence
<220> FEATURE:
<223> OTHER INFORMATION: Probes

<400> SEQUENCE: 63
ctcgctcttt aacagcagac ttggatg                                      27

<210> SEQ ID NO 64
<211> LENGTH: 31
<212> TYPE: DNA
<213> ORGANISM: Artificial sequence
<220> FEATURE:
<223> OTHER INFORMATION: Probes

<400> SEQUENCE: 64
tccagtttcc actgccttta cgaagttaag c                                 31

<210> SEQ ID NO 65
<211> LENGTH: 29
<212> TYPE: DNA
<213> ORGANISM: Artificial sequence
<220> FEATURE:
<223> OTHER INFORMATION: Probes

<400> SEQUENCE: 65
actacctacg gactctttac gcccaatca                                    29

<210> SEQ ID NO 66
<211> LENGTH: 27
<212> TYPE: DNA
<213> ORGANISM: Artificial sequence
<220> FEATURE:
<223> OTHER INFORMATION: Probes

<400> SEQUENCE: 66
ccctctgccc ctactacact ctagtct                                      27

<210> SEQ ID NO 67
<211> LENGTH: 25
<212> TYPE: DNA
<213> ORGANISM: Artificial sequence
<220> FEATURE:
<223> OTHER INFORMATION: Probes

<400> SEQUENCE: 67
cttacggcac tctcccttt caagg                                         25

<210> SEQ ID NO 68
<211> LENGTH: 27
<212> TYPE: DNA
<213> ORGANISM: Artificial sequence
<220> FEATURE:
<223> OTHER INFORMATION: Probes
```

```
<400> SEQUENCE: 68
agattccaga gatgtcaagt cctggta                                      27

<210> SEQ ID NO 69
<211> LENGTH: 26
<212> TYPE: DNA
<213> ORGANISM: Artificial sequence
<220> FEATURE:
<223> OTHER INFORMATION: Probes

<400> SEQUENCE: 69
gccatgcagc acctgtcttc tggttc                                       26

<210> SEQ ID NO 70
<211> LENGTH: 28
<212> TYPE: DNA
<213> ORGANISM: Artificial sequence
<220> FEATURE:
<223> OTHER INFORMATION: Probes

<400> SEQUENCE: 70
tcttcaggca gcaagccttt cacctctc                                     28

<210> SEQ ID NO 71
<211> LENGTH: 26
<212> TYPE: DNA
<213> ORGANISM: Artificial sequence
<220> FEATURE:
<223> OTHER INFORMATION: Probes

<400> SEQUENCE: 71
ggcatatccg gtattagcca cagttt                                       26

<210> SEQ ID NO 72
<211> LENGTH: 26
<212> TYPE: DNA
<213> ORGANISM: Artificial sequence
<220> FEATURE:
<223> OTHER INFORMATION: Probes

<400> SEQUENCE: 72
cgtggttgtc cccgacctga agctag                                       26

<210> SEQ ID NO 73
<211> LENGTH: 26
<212> TYPE: DNA
<213> ORGANISM: Artificial sequence
<220> FEATURE:
<223> OTHER INFORMATION: Probes

<400> SEQUENCE: 73
tctaccccga acgcactcta gccttg                                       26

<210> SEQ ID NO 74
<211> LENGTH: 26
<212> TYPE: DNA
<213> ORGANISM: Artificial sequence
<220> FEATURE:
<223> OTHER INFORMATION: Probes

<400> SEQUENCE: 74
tagtttccac tgcttttacc tagtta                                       26

<210> SEQ ID NO 75
```

```
<211> LENGTH: 32
<212> TYPE: DNA
<213> ORGANISM: Artificial sequence
<220> FEATURE:
<223> OTHER INFORMATION: Probes

<400> SEQUENCE: 75
agctaggttc tttaacagca gacttacata gc                                 32

<210> SEQ ID NO 76
<211> LENGTH: 29
<212> TYPE: DNA
<213> ORGANISM: Artificial sequence
<220> FEATURE:
<223> OTHER INFORMATION: Probes

<400> SEQUENCE: 76
ctgagctacg gttttgtgag atttgcatc                                     29

<210> SEQ ID NO 77
<211> LENGTH: 29
<212> TYPE: DNA
<213> ORGANISM: Artificial sequence
<220> FEATURE:
<223> OTHER INFORMATION: Probes

<400> SEQUENCE: 77
acattgctgt gtagctgccc tttgtccgt                                     29

<210> SEQ ID NO 78
<211> LENGTH: 27
<212> TYPE: DNA
<213> ORGANISM: Artificial sequence
<220> FEATURE:
<223> OTHER INFORMATION: Probes

<400> SEQUENCE: 78
caggaattcc ttttgccccct accgcac                                      27

<210> SEQ ID NO 79
<211> LENGTH: 34
<212> TYPE: DNA
<213> ORGANISM: Artificial sequence
<220> FEATURE:
<223> OTHER INFORMATION: Probes

<400> SEQUENCE: 79
tctagttctg tagtttccac cgcttttatt tggt                               34

<210> SEQ ID NO 80
<211> LENGTH: 31
<212> TYPE: DNA
<213> ORGANISM: Artificial sequence
<220> FEATURE:
<223> OTHER INFORMATION: Probes

<400> SEQUENCE: 80
taagccaaac tctttaacag cagactttca g                                  31
```

USE OF PROBES TO DETECT TOXINOGENIC CYANOBACTERIA, DETECTION METHOD AND CORRESPONDING KITS

FIELD

The present invention relates to the use of probes for the detection of toxinogenic cyanobacteria, a method for the detection of toxinogenic cyanobacteria and corresponding kits.

Recreational waters, aquaculture production sites and drinking water are frequently and increasingly affected by toxinogenic cyanobacteria. These are a real threat to human health, economic activities and the environment because they produce highly harmful toxins that not only contaminate natural drinking water reservoirs but also endanger all water-related economic activities such as fish farms, nautical and tourist activities. Monitoring the quality of freshwater is therefore a key economic and environmental issue.

BACKGROUND

Currently, warning systems for the contamination of freshwater resources by cyanobacteria are not adapted to monitor water quality and the proper functioning of ecosystems. In this context, risk anticipation is a determining factor in the sustainable management of water resources, particularly natural reservoirs, for the supply of drinking water and the security of sustainable economic activities. A rapid, reliable and sensitive identification of the toxinogenic cyanobacteria in question is therefore essential for effective monitoring and anticipation of blooms in the concerned sectors of activity.

However, the composition of these environmental waters of interest depends on biotic and abiotic factors (organisms present, various organic materials, chemical or biological pollution, etc.). So much so that the heterogeneity in terms of diversity, i.e. variability in content of organisms and organic and inorganic matter; and physiological state, e.g. a population of cyanobacteria may include several different genera and may contain all life stages of a cell, will have a direct and deleterious impact on the detection of the incriminated toxinogenic cyanobacteria.

Current methods for the detection of toxinogenic cyanobacteria are mainly based on microscopic analysis. However, these methods are time-consuming and tedious and are based on the identification and enumeration of cyanobacteria. Identification requires a strong expertise directly dependent on the operator who must have a thorough knowledge of phytoplankton but also a long experience in the taxonomic identification of cyanobacteria, leading to a certain uncertainty in the results.

Alert thresholds are today based on the identification and quantification of toxinogenic cyanobacteria at concentrations starting from 20,000 cells/mL for drinking water and 100,000 cells/mL for recreational water according to WHO recommendations (Afsset report 2006). Existing tools for monitoring cyanobacteria populations in aquatic reservoirs are generalist and include submersible spectro-fluorometric probes and buoys continuously measuring the physico-chemical parameters of the water and meteorological parameters related to phytoplankton blooms.

The development of efficient and rapid tests to monitor the microbial quality of water is an essential step in anticipating the risks of contamination of water resources by toxinogenic cyanobacteria.

The sandwich hybridization technique (SHA) is known and consists in the detection of a nucleic acid of a species to be detected thanks to the use of both a capture probe immobilized on a solid support and a signal probe, both of which are specific to the nucleic acid of the species to be detected. The presence of the nucleic acid to be detected leads to the formation of a complex consisting of the capture probe, the nucleic acid of the species to be detected and the signal probe. Various means of detection can then be used to reveal the presence of the complex.

Some works report the development of genetic biosensors based on SHA to identify and detect the genus *Microcystis* without combining speed of execution, sensitivity, targeting of cell activity through the detection of ribosomal RNA and use of unique and efficient genetic probes. In particular, N Dearth's thesis work describes a study of the *Microcystis* genus using an SHA carried out in approximately 1 hour (estimated in the document) and targeting ribosomal RNAs using a single pair of probes different from those described in the invention. The author reports only detection and quantification limits, established using cultures and relatively high, of 60,000 cells/mL and 310,000 cells/mL, without validation in an environmental matrix.

There is therefore a need for sensitive and reliable rapid techniques to detect the presence of toxinogenic cyanobacteria in various aquatic environments.

One of the goals of the invention is therefore to provide reliable, sensitive and rapid tools for the detection of toxinogenic cyanobacteria, which effectively overcome and overcome the variability of environmental waters of interest.

A first aspect of the invention concerns the use of nucleotide probes for the implementation of a method for the detection of toxinogenic cyanobacteria. A second aspect of the invention concerns pairs of probes for the detection of toxinogenic cyanobacteria. A third aspect of the invention concerns probes for the detection of toxinogenic cyanobacteria. A fourth aspect of the invention concerns a method for detecting toxinogenic cyanobacteria. A fifth aspect of the invention concerns kits for the detection of toxinogenic cyanobacteria. A sixth aspect of the invention concerns devices for the detection of toxinogenic cyanobacteria.

The present invention is based on the use of particular probes and the implementation of the sandwich hybridization technique in order to specifically detect and quantify the nucleic acids of active living cells of toxinogenic cyanobacteria optionally present in a fresh, brackish or industrial water at a very low detection threshold and in a time of less than 1 hour.

Thus, the present invention provides a means of early warning making it possible to anticipate contamination of fresh, brackish or industrial water by toxinogenic cyanobacteria in the aquatic environment.

The novelty and inventiveness of the invention lies in the development of probes capable of recognizing and hybridizing in a very sensitive manner the ribosomal nucleic acids of the large or small subunits of the targeted active toxinogenic cyanobacteria in less than one hour. Targeting the ribosomal nucleic acids allows detection of only living cells of toxinogenic cyanobacteria, i.e. cyanobacteria capable of growth and proliferation, representing a major potential toxinogenic risk. Using one or more calibration curve(s), it is then possible to determine the quantity of RNA of toxinogenic cyanobacteria and, by extrapolation, the number of cells present in a sample, taking into account the growth phase and the type of cell sought (Tanaka and Tsuneoka (2018), *Control of Ribosomal RNA Transcription by Nutrients*; Binder et al, *Applied Environmental Microbiology*, 1998, 64, 3346-3351).

DETAILED DESCRIPTION

Figure 1:
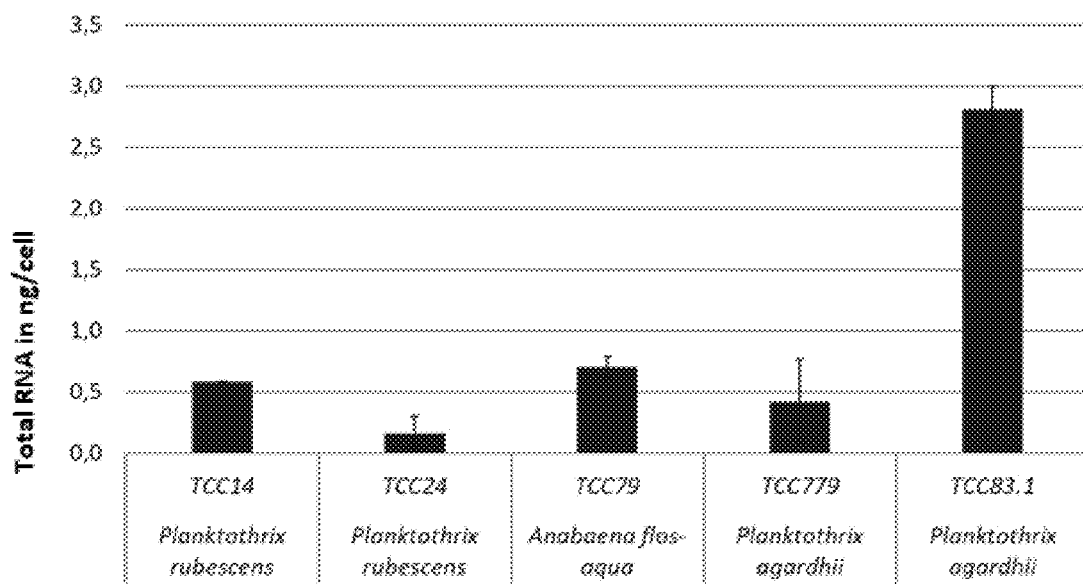
FIG. 1: Average concentration of RNA content per cell, expressed in pg RNA/cell, obtained from optimal culture conditions corresponding to the exponential phase of growth of different toxinogenic cyanobacteria.

Implementation comparisons between the present invention and the traditional technique based on the identification and counting of algae by microscopy with the Utermöhl method (1958) have been carried out on natural samples. These comparisons made it possible to calibrate and define, for the first time in the state of the art, detection thresholds in ng of RNA and in number of cells per mL in environmental samples.

In the present invention, "toxinogenic cyanobacteria" means cyanobacteria that can produce toxins which cause food poisoning, paralysis, amnesia, skin irritation or fever. Toxinogenic cyanobacteria can be of different kinds. The probes used in the present invention make it possible to detect toxinogenic cyanobacteria of the genera *Microcystis*, *Anabaena*, *Dolichospermum*, *Aphanizomenon*, *Nodularia*, *Planktothrix* and *Cylindrospermopsis*.

The classification of cyanobacteria is in constant evolution and the classification of a cyanobacteria in one genus rather than another is variable according to the references taken into account. In the case of the present invention, the classification of cyanobacteria was carried out according to the following articles:

"Taxonomic consequences from the combined molecular and phenotype evaluation of selected *Anabaena* and *Aphanizomenon* strain". Rajaniemi, Pirjo; Komárek, Jiři; Willame, Raphael; Hrouzek, Pavel; Kaštovská, Klara; Hoffmann, Lucien; Sivonen, Kaarina, Algological Studies, Volume 117, Number 1, October 2005, pp. 371-391(21)

"Phylogenetic and morphological evaluation of the genera *Anabaena*, *Aphanizomenon*, *Trichormus* and *Nostoc* (Nostocales, Cyanobacteria)". Rajaniemi P, Hrouzek P, Kastovska K, Willame R, Rantala A, Hoffmann L, Komarek J, Sivonen K. Int J Syst Evol Microbiol 55(1):11-26

"Taxonomic re-evaluation of *Aphanizomenon* flos-aquae NH-5 based on morphology and 16S rRNA gene sequences". Renhui Li, Wayne W. Carmichael, Yongding Liu, Makoto M. Watanabe, Hydrobiologia, November 2000, Volume 438, Issue 1-3, pp 99-105

"An update to modern taxonomy (2011) of freshwater planktic heterocytous cyanobacteria". Jiri Komarek, Jan Mareš, Phytoplankton responses to human impacts at different scales pp 327-351

The variability of the classification implies changes in genus names, particularly for the genera *Anabaena* and *Aphanizomenon*. Several studies carried out so far show that phylogeny carried out with three different genetic markers does not distinguish well between the genera *Anabaena* and *Aphanizomenon* and that the classification of the different clades within the order of Nostocales to which the genera *Anabaena* and *Aphanizomenon* belong, needs to be revised due to name changes due to morphological misassignment (J Komarec (2010), *Hydrobiologia* 639: 231-243; Gugger M et al. (2002), *Int. J Sys. Evol. Microbiol.* 52, 1867-1880).

"Active living cells" are defined as cells that are capable of growing and dividing regardless of environmental conditions and that will be able to multiply and proliferate rapidly as soon as these environmental conditions are favourable, as opposed to dormant cells that have minimal cellular activity to protect themselves from environmental conditions unfavourable to their development, or senescent cells that have begun a process of cell death and that see their cellular and genetic material degraded.

"Threshold of Detection" or "Limit of Detection (LOD)" means the smallest amount of RNA of toxinogenic cyanobacteria that can be detected by implementing the present invention. It is determined from an absorbance measurement at 450 nm or 630 nm made on an analytical blank from which the standard deviation of the signal is calculated, and corresponds to the concentration of toxinogenic cyanobacterial RNA which produces a signal whose intensity is equal to 3 times that of the standard deviation of the analytical blank. In other words, it is the value below which toxinogenic cyanobacterial RNA is considered undetected. (*ACS* (1980) *Guidelines for Data Acquisition and Data Quality Evaluation in Environmental Chemistry, Analytical chemistry*, 52, 14, 2242-2249).

"Threshold of Quantification" or "Limit of Quantification (LOQ)" means the smallest amount of RNA of toxinogenic cyanobacteria that can be quantified by implementing the present invention. The LOQ is calculated by taking as the value of the signal, 10 times the value of the standard deviation of the analytical blank. In other words, this is the value below which it is not possible to determine the quantity of toxinogenic cyanobacterial RNA (*ACS* (1980) *Guidelines for Data Acquisition and Data Quality Evaluation in Environmental Chemistry, Analytical chemistry*, 52, 14, 2242-2249).

Thus, in a first aspect, the present invention concerns the use of at least one pair of specific probes of toxinogenic cyanobacteria for the implementation of a method for the detection of at least one toxinogenic cyanobacteria selected from the group consisting of *Microcystis, Anabaena, Dolichospermum, Aphanizomenon, Nodularia, Planktothrix* and *Cylindrospermopsis*.

According to the present invention, the limit of detection of the ribosomal RNA of the cyanobacteria listed above is between 0.02 ng and 0.7 ng ribosomal RNA, which corresponds, depending on the type of cyanobacteria, to a limit of detection between 10 and 575 active living cells per millilitre of sample (cells/mL). Furthermore, according to the present invention, the limit of quantification of the cyanobacteria listed above is on average between 0.02 ng and 1 ng of ribosomal RNA depending on the type of cyanobacteria.

"Detection limit [ . . . ] between 0.02 ng to 0.7 ng of ribosomal RNA" means the concentration corresponding to the absolute minimum amount of material measured according to the invention. This may be related to one millilitre of sample, in which case it should be noted that it is not a "chemical" concentration of a reaction volume.

Similarly, "detection limit [ . . . ] of 10 to 575 active living cells per millilitre of sample (cells/mL)" means the minimum cell concentration estimated, using standard curves, that can be measured in a volume of one millilitre of sample. Consequently, it is not the cell concentration measured in a reaction volume. In addition, "sample" means any type of sample, including cell culture samples and/or raw natural samples taken in situ (also called environmental samples).

Furthermore, it should be noted that for the purposes of the invention, it is also possible to use synthetic RNAs as an internal control and standardisation tool, said synthetic RNAs (or synthetic standard) being oligonucleotide sequences obtained by chemical synthesis. It is also understood that the toxinogenic cyanobacteria cultures used are not axenic and the extraction of the total RNAs from the culture includes both the total RNAs of the target cyanobacteria but also the total RNAs of the contaminants (e.g. other bacteria) in the culture.

Embodiment A

More particularly, the present invention concerns the use of at least one pair of probes specific to toxinogenic cyanobacteria of the genus *Microcystis* for the implementation of a method for the detection of toxinogenic cyanobacteria in a sample likely to contain at least one toxinogenic cyanobacteria of the genus *Microcystis*, the sequences of the said probes being chosen from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)
x being 2, 3 or 4
or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
one probe of said pair being a capture probe linked to at least one attachment molecule positioned at 3' or 5' of its sequence and the other probe of said pair being a signal probe linked to at least one marking molecule positioned at 3' or 5' of its sequence,
said capture probe and said signal probe being capable of hybridizing with the ribosomal nucleic acid of the toxinogenic cyanobacteria of the genus *Microcystis* optionally present in said sample to form a complex,
the minimum detection threshold of the toxinogenic cyanobacteria of the genus *Microcystis* being
  estimated from 10 to 575 active living cells per millilitre of sample (cells/mL), or
  less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

In all aspects of the invention, "a pair of probes [ . . . ], the sequences of said probes being chosen from x elements of one of the following sets: (SEQ ID NO: 1, SEQ ID NO: 2, SEQ ID NO: 3 or SEQ ID NO: 4)" means the following pairs of probes:
SEQ ID NO: 1 and SEQ ID NO: 2
SEQ ID NO: 1 and SEQ ID NO: 3
SEQ ID NO: 1 and SEQ ID NO: 4
SEQ ID NO: 2 and SEQ ID NO: 3
SEQ ID NO: 2 and SEQ ID NO: 4
SEQ ID NO: 3 and SEQ ID NO: 4.

Similarly, "a pair of probes [ . . . ] the sequences of said probes being chosen from x elements of one of the following sets . . . ": (SEQ ID NO: 5, SEQ ID NO: 6 and SEQ ID NO: 7)" means the following pairs of probes:
SEQ ID NO: 5 and SEQ ID NO: 6
SEQ ID NO: 5 and SEQ ID NO: 7
SEQ ID NO: 6 and SEQ ID NO: 7

Similarly, "a pair of probes [ . . . ] the sequences of said probes being chosen from x elements of one of the following sets . . . ": (SEQ ID NO: 18 and SEQ ID NO: 19)" means the following pair of probes:
SEQ ID NO: 18 and SEQ ID NO: 19

In addition, for the purposes of the invention, "estimated from 10 to 575 active living cells per millilitre of sample (cells/mL)" means a minimum detection threshold of 10 to 100, 10 to 200, 10 to 300, 10 to 400, 10 to 500, 10 to 575, 100 to 500, 200 to 500, 300 to 500, 400 to 500, 10 to 50, 50 to 100, 10 to 20, 10 to 30, 10 to 40, or 10 to 50.

Similarly, "less than or equal to 1.0 ng of ribosomal RNA per millilitre of sample" means a minimum detection limit of less than 1.0; 0.9; 0.8; 0.7; 0.6; 0.5; 0.4; 0.3; 0.20 or 0.1 ng of ribosomal RNA per millilitre of sample. It also means a minimum detection limit of from 0.02 to 0.7; 0.05 to 0.7; 0.1 to 0.7; 0.2 to 0.6; 0.3 to 0.5; 0.02 to 0.1 or 0.05 to 0.1 ng of ribosomal RNA per millilitre of sample, said minimum detection limit being able to be equal to 0.02; 0.03; 0.04; 0.05; 0.06; 0.07; 0.08; 0.09 or 0.1 ng of ribosomal RNA per millilitre of sample.

The same reasoning may be applied to all pair of probes described above and below. This reasoning also applies to all aspects and embodiments of the present invention.

In this embodiment, the invention also concerns the use of at least one pair of probes specific to toxinogenic cyanobacteria of the genus *Microcystis* for the implementation of a method for the detection of toxinogenic cyanobacteria in a sample likely to contain at least one toxinogenic cyanobacteria of the genus *Microcystis*, the sequences of said probes being selected from x elements of one of the following sets:

(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)

x being 2, 3 or 4, or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, one probe of said pair being a capture probe linked to at least one attachment molecule positioned at 3' or 5' of its sequence and the other probe of said pair being a signal probe linked to at least one marking molecule positioned at 3' or 5' of its sequence said capture probe and said signal probe being capable of hybridizing with the ribosomal nucleic acid of the toxinogenic cyanobacteria of the genus *Microcystis* optionally present in said sample to form a complex, the minimum detection threshold for toxinogenic cyanobacteria of the genus *Microcystis* being from 0.02 ng/mL and 0.7 ng/mL ribosomal RNA.

As stated above, a minimum detection threshold for toxinogenic cyanobacteria of the genus *Microcystis* of 0.02 ng to 0.7 ng ribosomal RNA per millilitre of sample corresponds to a detection limit equivalent to 10 to 575 cells/mL.

In this embodiment, the invention also concerns the use of at least one pair of probes specific to toxinogenic cyanobacteria of the genus *Microcystis* for the implementation of a method for the detection of toxinogenic cyanobacteria in a sample likely to contain at least one toxinogenic cyanobacteria of the genus *Microcystis*, the sequences of said probes being selected from x elements of one of the following sets:

(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)

x being 2, 3 or 4, or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, one probe of said pair being a capture probe linked to at least one attachment molecule positioned at 3' or 5' of its sequence and the other probe of said pair being a signal probe linked to at least one marking molecule positioned at 3' or 5' of its sequence said capture probe and said signal probe being capable of hybridizing with the ribosomal nucleic acid of the toxinogenic cyanobacteria of the genus *Microcystis* optionally present in said sample to form a complex, the duration of the implementation of the said detection method being less than one hour.

In this embodiment, the invention also concerns the use of at least one pair of probes specific to toxinogenic cyanobacteria of the genus *Microcystis* as described above in which the minimum detection threshold of the toxinogenic cyanobacteria of the genus *Microcystis* is from 0.02 ng/mL and 0.7 ng/mL of ribosomal RNA and the duration of the implementation of the said detection method is less than one hour.

According to this embodiment, the invention also concerns the use of at least one pair of probes specific to toxinogenic cyanobacteria of the genus *Microcystis* as described above for the implementation of a method for detecting toxinogenic cyanobacteria in a sample likely to contain at least one toxinogenic cyanobacteria of the genus *Microcystis*, in which the sequences of the probes of the said pairs are as follows:

(SEQ ID NO: 1 and SEQ ID NO: 2), (SEQ ID NO: 1 and SEQ ID NO: 3), (SEQ ID NO: 1 and SEQ ID NO: 4), (SEQ ID NO: 2 and SEQ ID NO: 3), (SEQ ID NO: 3 and SEQ ID NO: 4)
(SEQ ID NO: 5 and SEQ ID NO: 6), (SEQ ID NO: 5 and SEQ ID NO: 7), (SEQ ID NO: 6 and SEQ ID NO: 7)
(SEQ ID NO: 8 and SEQ ID NO: 9), (SEQ ID NO: 8 and SEQ ID NO: 10), (SEQ ID NO: 8 and SEQ ID NO: 11), (SEQ ID NO: 9 and SEQ ID NO: 10), (SEQ ID NO: 9 and SEQ ID NO: 11), (SEQ ID NO: 10 and SEQ ID NO: 11)
(SEQ ID NO: 12 and SEQ ID NO: 13), (SEQ ID NO: 12 and SEQ ID NO: 14), (SEQ ID NO: 13 and SEQ ID NO: 14)
(SEQ ID NO: 15 and SEQ ID NO: 16), (SEQ ID NO: 15 and SEQ ID NO: 17), (SEQ ID NO: 16 and SEQ ID NO: 17)
(SEQ ID NO: 18 and SEQ ID NO: 19).

In addition to the detection of toxinogenic cyanobacteria of the genus *Microcystis*, the present invention concerns, in addition to the use of at least one pair of probes specific to toxinogenic cyanobacteria of the genus *Microcystis*, the use of at least one pair of probes specific to toxinogenic cyanobacteria selected from the group consisting of *Anabaena, Dolichospermum, Aphanizomenon, Nodularia, Planktothrix* and *Cylindrospermopsis*.

Embodiment B

Thus, the invention also concerns the use as described above for the detection of toxinogenic cyanobacteria of the genus *Microcystis* (embodiment A) comprising in addition the use of at least one pair of probes specific to toxinogenic cyanobacteria of the genus *Aphanizomenon* for the implementation of a method for the detection of toxinogenic cyanobacteria in a sample likely to contain at least one toxinogenic cyanobacteria of the genus *Microcystis* and/or

*Aphanizomenon*, the sequences of said probes being chosen from x elements of one of the following sets:

(SEQ ID NO: 20, SEQ ID NO: 21 and SEQ ID NO: 22)
(SEQ ID NO: 23 and SEQ ID NO: 24)

x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24, one probe of said pair being a capture probe linked to at least one attachment molecule positioned at 3' or 5' of its sequence and the other probe of said pair being a signal probe linked to at least one marking molecule positioned at 3' or 5' of its sequence
said capture probe and said signal probe being capable of hybridizing with the ribosomal nucleic acid of a toxinogenic cyanobacteria of the genus *Aphanizomenon* optionally present in said sample to form a complex,
the minimum detection threshold of the toxinogenic cyanobacteria of the genus *Aphanizomenon* being
  estimated from 10 to 575 active living cells per millilitre of sample (cells/mL), or
  less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

In a particular embodiment, the invention also concerns the use of at least one pair of probes specific to toxinogenic cyanobacteria of the genus *Aphanizomenon* as described above for the implementation of a method for the detection of toxinogenic cyanobacteria in a sample likely to contain at least one toxinogenic cyanobacteria of the genus *Aphanizomenon*, wherein the sequences of the probes of the said pairs are as follows:

(SEQ ID NO: 20 and SEQ ID NO: 21), (SEQ ID NO: 20 and SEQ ID NO: 22), (SEQ ID NO: 21 and SEQ ID NO: 22)
(SEQ ID NO: 23 and SEQ ID NO: 24).

As previously for the detection of *Microcystis* according to embodiment A, and in a particular embodiment, the minimum detection threshold of the toxinogenic cyanobacteria of the genus *Aphanizomenon* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, embodiment B allows the detection of *Microcystis* and *Aphanizomenon* thanks to the use of specific probes of toxinogenic cyanobacteria of the genus *Microcystis* and *Aphanizomenon*.

Embodiment C

In the same way, the invention also relates to one of the uses as described above according to embodiment A or according to embodiment B, further comprising the use of at least one pair of probes specific to toxinogenic cyanobacteria of the genus *Dolichospermum* for the implementation of a method for the detection of toxinogenic cyanobacteria in a sample likely to contain at least one toxinogenic cyanobacteria of the genus *Microcystis* and/or *Dolichospermum*, the sequences of said probes being selected from x elements of one of the following sets:

(SEQ ID NO: 25 and SEQ ID NO: 26)

x being 2,
or the sequences of said probes having at least 92% identity with the aforementioned sequences SEQ ID NO: 25, SEQ ID NO: 26,
one probe of said pair being a capture probe linked to at least one attachment molecule positioned at 3' or 5' of its sequence and the other probe of said pair being a signal probe linked to at least one marking molecule positioned at 3' or 5' of its sequence
said capture probe and said signal probe being capable of hybridizing with the ribosomal nucleic acid of a toxinogenic cyanobacteria of the genus *Dolichospermum* optionally present in said sample to form a complex,
the minimum detection limit of the toxinogenic cyanobacteria of the genus *Dolichospermum* being
  estimated from 10 to 575 active living cells per millilitre of sample (cells/mL), or
  less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

As previously for embodiments A and B, and in one particular embodiment, the minimum detection threshold of the toxinogenic cyanobacteria of the genus *Dolichospermum* is between 0.02 ng and 0.7 ng of ribosomal RNA per millilitre of sample, which corresponds to a detection limit equivalent to 10 to 575 cells/mL.

In the same way, in a particular implementation mode, the duration of the implementation of the said detection method is less than one hour.

Thus, embodiment C allows the detection of:
  C1: *Mycrocystis* and *Dolichospermum* (in combination with embodiment A)
  C2: *Microcystis*, *Aphanizomenon* and *Dolichospermum* (in combination with embodiment B)
thanks to the use of specific probes of toxinogenic cyanobacteria of the genus *Microcystis*, *Aphanizomenon* and *Dolichospermum*.

Embodiment D

In the same way, the invention also concerns one of the uses as described above according to the embodiments A, B or C, comprising in addition the use of at least one pair of probes specific to toxinogenic cyanobacteria of the genus *Anabaena* for the implementation of a method for the detection of toxinogenic cyanobacteria in a sample likely to contain at least one toxinogenic cyanobacteria of the genus *Microcystis* and/or *Anabaena*, the sequences of the said probes being chosen from x elements of one of the following sets:

(SEQ ID NO: 27, SEQ ID NO: 28 and SEQ ID NO: 29)
(SEQ ID NO: 30, SEQ ID NO: 31 and SEQ ID NO: 32)
(SEQ ID NO: 33, SEQ ID NO: 34 and SEQ ID NO: 35)
(SEQ ID NO: 36, SEQ ID NO: 37, SEQ ID NO: 38 and SEQ ID NO: 39)
(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)
(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)

(SEQ ID NO: 57, SEQ ID NO: 58 and SEQ ID NO: 59)
(SEQ ID NO: 60, SEQ ID NO: 61 and SEQ ID NO: 62)
x being 2, 3 or 4,
or the sequences of said probes having at least 92% identity with the abovementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62,
one probe of said pair being a capture probe linked to at least one attachment molecule positioned at 3' or 5' of its sequence and the other probe of said pair being a signal probe linked to at least one marking molecule positioned at 3' or 5' of its sequence,
said capture probe and said signal probe being capable of hybridizing with the ribosomal nucleic acid of a toxinogenic cyanobacteria of the genus *Anabaena* optionally present in said sample to form a complex,
the minimum detection threshold of the toxinogenic cyanobacteria of the genus *Anabaena* being
  estimated from 10 to 575 active living cells per millilitre of sample (cells/mL), or
  less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

In a particular embodiment, the invention also concerns the use of at least one pair of probes specific to toxinogenic cyanobacteria of the genus *Anabaena* as described above for the implementation of a method for the detection of toxinogenic cyanobacteria in a sample likely to contain at least one toxinogenic cyanobacteria of the genus *Anabaena*, in which the sequences of the probes of the said pairs are as follows:
  (SEQ ID NO: 27 and SEQ ID NO: 28), (SEQ ID NO: 27 and SEQ ID NO: 29), (SEQ ID NO: 28 and SEQ ID NO: 29)
  (SEQ ID NO: 30 and SEQ ID NO: 31), (SEQ ID NO: 30 and SEQ ID NO: 32), (SEQ ID NO: 31 and SEQ ID NO: 32)
  (SEQ ID NO: 33 and SEQ ID NO: 34), (SEQ ID NO: 33 and SEQ ID NO: 35), (SEQ ID NO: 34 and SEQ ID NO: 35)
  (SEQ ID NO: 36 and SEQ ID NO: 37), (SEQ ID NO: 36 and SEQ ID NO: 38), (SEQ ID NO: 36 and SEQ ID NO: 39), (SEQ ID NO: 37 and SEQ ID NO: 38), (SEQ ID NO: 37 and SEQ ID NO: 39), (SEQ ID NO: 38 and SEQ ID NO: 39)
  (SEQ ID NO: 40 and SEQ ID NO: 41), (SEQ ID NO: 40 and SEQ ID NO: 42), (SEQ ID NO: 41 and SEQ ID NO: 42)
  (SEQ ID NO: 43 and SEQ ID NO: 44), (SEQ ID NO: 43 and SEQ ID NO: 45), (SEQ ID NO: 44 and SEQ ID NO: 45)
  (SEQ ID NO: 46 and SEQ ID NO: 47), (SEQ ID NO: 46 and SEQ ID NO: 48), (SEQ ID NO: 47 and SEQ ID NO: 48)
  (SEQ ID NO: 49 and SEQ ID NO: 50), (SEQ ID NO: 49 and SEQ ID NO: 51), (SEQ ID NO: 50 and SEQ ID NO: 51)
  (SEQ ID NO: 52 and SEQ ID NO: 53), (SEQ ID NO: 52 and SEQ ID NO: 54), (SEQ ID NO: 53 and SEQ ID NO: 54)
  (SEQ ID NO: 55 and SEQ ID NO: 56)
  (SEQ ID NO: 57 and SEQ ID NO: 58), (SEQ ID NO: 57 and SEQ ID NO: 59), (SEQ ID NO: 58 and SEQ ID NO: 59)
  (SEQ ID NO: 60 and SEQ ID NO: 61), (SEQ ID NO: 60 and SEQ ID NO: 62), (SEQ ID NO: 61 and SEQ ID NO: 62).

As previously for embodiments A, B and C, and in one particular embodiment, the minimum detection limit of the toxinogenic cyanobacteria of the genus *Anabaena* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

For example, the embodiment D allows the detection of:
  D1: *Microcystis* and *Anabaena* (in combination with embodiment A)
  D2: *Microcystis, Aphanizomenon* and *Anabaena* (in combination with embodiment B)
  D3: *Microcystis, Dolichospermum* and *Anabaena* (in combination with embodiment
  D4: *Microcystis, Aphanizomenon, Dolichospermum* and *Anabaena* (in combination with embodiment C2)
thanks to the use of specific probes of toxinogenic cyanobacteria of the genus *Microcystis, Aphanizomenon, Dolichospermum* and *Anabaena*.

Embodiment E

In the same way, the invention also concerns to one of the uses as described above according to embodiments A, B, C or D, further comprising the use of at least one pair of probes specific for toxinogenic cyanobacteria of the genus *Planktothrix* for the implementation of a method for the detection of toxinogenic cyanobacteria in a sample likely to contain at least one toxinogenic cyanobacteria of the genus *Microcystis* and/or *Planktothrix*, the sequences of said probes being selected from x elements of one of the following sets:
  (SEQ ID NO: 63, SEQ ID NO: 64, SEQ ID NO: 65 and SEQ ID NO: 66)
  (SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
one probe of said pair being a capture probe linked to at least one attachment molecule positioned at 3' or 5' of its sequence and the other probe of said pair being a signal probe linked to at least one marking molecule positioned at 3' or 5' of its sequence,
said capture probe and said signal probe being capable of hybridizing with the ribosomal nucleic acid of a toxinogenic cyanobacteria of the genus *Planktothrix* optionally present in said sample to form a complex,
the minimum detection limit of the toxinogenic cyanobacteria of the genus *Planktothrix* being
  estimated from 10 to 575 active living cells per millilitre of sample (cells/mL), or
  less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

In a particular embodiment, the invention also concerns the use of at least one pair of probes specific to toxinogenic cyanobacteria of the genus *Planktothrix* as described above for the implementation of a method for the detection of toxinogenic cyanobacteria in a sample likely to contain at least one toxinogenic cyanobacteria of the genus *Planktothrix*, in which the sequences of the probes of the said pairs are as follows:

(SEQ ID NO: 63 and SEQ ID NO: 64), (SEQ ID NO: 63 and SEQ ID NO: 65), (SEQ ID NO: 63 and SEQ ID NO: 66), (SEQ ID NO: 64 and SEQ ID NO: 65), (SEQ ID NO: 64 and SEQ ID NO: 66), (SEQ ID NO: 65 and SEQ ID NO: 66)

(SEQ ID NO: 67 and SEQ ID NO: 68), (SEQ ID NO: 67 and SEQ ID NO: 69), (SEQ ID NO: 68 and SEQ ID NO: 69).

As previously for embodiments A, B, C and D, and in one particular embodiment, the minimum detection threshold of the toxinogenic cyanobacteria of the genus *Planktothrix* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, embodiment E allows the detection of:
E1: *Microcystis* and *Planktothrix* (in combination with embodiment A)
E2: *Microcystis, Aphanizomenon* and *Planktothrix* (in combination with embodiment B)
E3: *Microcystis, Dolichospermum* and *Planktothrix* (in combination with embodiment C1)
E4: *Microcystis, Aphanizomenon, Dolichospermum* and *Planktothrix* (in combination with embodiment C2)
E5: *Microcystis, Anabaena* and *Planktothrix* (in combination with embodiment D1)
E6: *Microcystis, Aphanizomenon, Anabaena* and *Planktothrix* (in combination with embodiment D2)
E7: *Microcystis, Dolichospermum, Anabaena* and *Planktothrix* (in combination with embodiment D3)
E8: *Microcystis, Aphanizomenon, Dolichospermum, Anabaena* and *Planktothrix* (in combination with embodiment D4)

thanks to the use of specific probes of toxinogenic cyanobacteria of the genus *Microcystis, Aphanizomenon, Dolichospermum, Anabaena* and *Planktothrix*.

Embodiment F

In the same way, the invention also concerns one of the uses as described above according to the embodiment A, B, C, D or E, further comprising the use of at least one pair of probes specific to toxinogenic cyanobacteria of the genus *Nodularia* for the implementation of a method for the detection of toxinogenic cyanobacteria in a sample likely to contain at least one toxinogenic cyanobacteria of the genus *Microcystis* and/or *Nodularia*, the sequences of said probes being selected from x elements of one of the following sets:
(SEQ ID NO: 70, SEQ ID NO: 71 and SEQ ID NO: 72)
(SEQ ID NO: 73, SEQ ID NO: 74 and SEQ ID NO: 75)
(SEQ ID NO: 76 and SEQ ID NO: 77)
x being 2 or 3,
or the sequences of said probes having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77, one probe of said pair being a capture probe linked to at least one attachment molecule positioned at 3' or 5' of its sequence and the other probe of said pair being a signal probe linked to at least one marking molecule positioned at 3' or 5' of its sequence said capture probe and said signal probe being capable of hybridizing with the ribosomal nucleic acid of a toxinogenic cyanobacteria of the genus *Nodularia* optionally present in said sample to form a complex, the minimum detection threshold of the toxinogenic cyanobacteria of the genus *Nodularia* being
estimated from 10 to 575 active living cells per millilitre of sample (cells/mL), or
less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

In a particular embodiment, the invention also concerns the use of at least one pair of probes specific to toxinogenic cyanobacteria of the genus *Nodularia* as described above for the implementation of a method for the detection of toxinogenic cyanobacteria in a sample likely to contain at least one toxinogenic cyanobacteria of the genus *Nodularia*, in which the sequences of the probes of the said pairs are as follows:

(SEQ ID NO: 70 and SEQ ID NO: 71), (SEQ ID NO: 70 and SEQ ID NO: 72), (SEQ ID NO: 71 and SEQ ID NO: 72)

(SEQ ID NO: 73 and SEQ ID NO: 74), (SEQ ID NO: 73 and SEQ ID NO: 75), (SEQ ID NO: 74 and SEQ ID NO: 75)

(SEQ ID NO: 76 and SEQ ID NO: 77).

As previously for embodiments A, B, C, D and E, and in one particular embodiment, the minimum detection limit of the toxinogenic cyanobacteria of the genus *Nodularia* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, the embodiment F allows the detection of:
F1: *Microcystis* and *Nodularia* (in combination with embodiment A)
F2: *Microcystis, Aphanizomenon* and *Nodularia* (in combination with embodiment B)
F3: *Microcystis, Dolichospermum* and *Nodularia* (in combination with embodiment C1)
F4: *Microcystis, Aphanizomenon, Dolichospermum* and *Nodularia* (in combination with embodiment C2)
F5: *Microcystis, Anabaena* and *Nodularia* (in combination with embodiment D1)
F6: *Microcystis, Aphanizomenon, Anabaena* and *Nodularia* (in combination with embodiment D2)
F7: *Microcystis, Dolichospermum, Anabaena* and *Nodularia* (in combination with design embodiment D3)
F8: *Microcystis, Aphanizomenon, Dolichospermum, Anabaena* and *Nodularia* (in combination with embodiment D4)
F9: *Microcystis, Planktothrix* and *Nodularia* (in combination with embodiment E1)
F10: *Microcystis, Aphanizomenon, Planktothrix* and *Nodularia* (in combination with embodiment E2)

F11: *Microcystis, Dolichospermum, Planktothrix* and *Nodularia* (in combination with embodiment E3)

F12: *Microcystis, Aphanizomenon, Dolichospermum, Planktothrix* and *Nodularia* (in combination with embodiment E4)

F13: *Microcystis, Anabaena, Planktothrix* and *Nodularia* (in combination with embodiment E5)

F14: *Microcystis, Aphanizomenon, Anabaena, Planktothrix* and *Nodularia* (in combination with embodiment E6)

F15: *Microcystis, Dolichospermum, Anabaena, Planktothrix* and *Nodularia* (in combination with embodiment E7)

F16: *Microcystis, Aphanizomenon, Dolichospermum, Anabaena, Planktothrix* and *Nodularia* (in combination with embodiment E8)

thanks to the use of specific probes of toxinogenic cyanobacteria of the genus *Microcystis, Aphanizomenon, Dolichospermum, Anabaena, Planktothrix* and *Nodularia*.

Embodiment G

In the same way, the invention also concerns one of the uses as described above according to the embodiment A, B, C, D, E or F, further comprising the use of at least one pair of probes specific to toxinogenic cyanobacteria of the genus *Cylindrospermopsis* for the implementation of a method for the detection of toxinogenic cyanobacteria in a sample likely to contain at least one toxinogenic cyanobacteria of the genus *Microcystis* and/or *Cylindrospermopsis*, the sequences of said probes being selected from x elements of one of the following sets:

(SEQ ID NO: 78, SEQ ID NO: 79 and SEQ ID NO: 80) x being 3, or the sequences of said probes having at least 92% identity with the aforementioned sequences SEQ ID NO: 78, SEQ ID NO: 79, SEQ ID NO: 80, one probe of said pair being a capture probe linked to at least one attachment molecule positioned at 3' or 5' of its sequence and the other probe of said pair being a signal probe linked to at least one marking molecule positioned at 3' or 5' of its sequence said capture probe and said signal probe being capable of hybridizing with the ribosomal nucleic acid of a toxinogenic cyanobacteria of the genus *Cylindrospermopsis* optionally present in said sample to form a complex, the minimum detection limit of the toxinogenic cyanobacteria of the genus *Cylindrospermopsis* being estimated from 10 to 575 active living cells per millilitre of sample (cells/mL), or less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

In a particular embodiment, the invention also concerns the use of at least one pair of probes specific to toxinogenic cyanobacteria of the genus *Cylindrospermopsis* as described above for the implementation of a method for the detection of toxinogenic cyanobacteria in a sample likely to contain at least one toxinogenic cyanobacteria of the genus *Cylindrospermopsis*, in which the sequences of the probes of the said pairs are as follows:

(SEQ ID NO: 78 and SEQ ID NO: 79), (SEQ ID NO: 78 and SEQ ID NO: 80), (SEQ ID NO: 79 and SEQ ID NO: 80).

As previously for embodiment A, B, C, D, E and F, and in one particular embodiment, the minimum detection threshold of the toxinogenic cyanobacteria of the genus *Cylindrospermopsis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, embodiment G allows the detection of:

G1: *Microcystis* and *Cylindrospermopsis* (in combination with embodiment A)

G2: *Microcystis, Aphanizomenon* and *Cylindrospermopsis* (in combination with embodiment B)

G3: *Microcystis, Dolichospermum* and *Cylindrospermopsis* (in combination with embodiment C1)

G4: *Microcystis, Aphanizomenon, Dolichospermum* and *Cylindrospermopsis* (in combination with embodiment C2)

G5: *Microcystis, Anabaena* and *Cylindrospermopsis* (in combination with design embodiment D1)

G6: *Microcystis, Aphanizomenon, Anabaena* and *Cylindrospermopsis* (in combination with embodiment D2)

G7: *Microcystis, Dolichospermum, Anabaena* and *Cylindrospermopsis* (in combination with embodiment D3)

G8: *Microcystis, Aphanizomenon, Dolichospermum, Anabaena* and *Cylindrospermopsis* (in combination with embodiment D4)

G9: *Microcystis, Planktothrix* and *Cylindrospermopsis* (in combination with embodiment E1)

G10: *Microcystis, Aphanizomenon, Planktothrix* and *Cylindrospermopsis* (in combination with embodiment E2)

G11: *Microcystis, Dolichospermum, Planktothrix* and *Cylindrospermopsis* (in combination with embodiment E3)

G12: *Microcystis, Aphanizomenon, Dolichospermum, Planktothrix* and *Cylindrospermopsis* (in combination with embodiment E4)

G13: *Microcystis, Anabaena, Planktothrix* and *Cylindrospermopsis* (in combination with embodiment E5)

G14: *Microcystis, Aphanizomenon, Anabaena, Planktothrix* and *Cylindrospermopsis* (in combination with embodiment E6)

G15: *Microcystis, Dolichospermum, Anabaena, Planktothrix* and *Cylindrospermopsis* (in combination with embodiment E7)

G16: *Microcystis, Aphanizomenon, Dolichospermum, Anabaena, Planktothrix* and *Cylindrospermopsis* (in combination with embodiment E8)

G17: *Microcystis, Nodularia* and *Cylindrospermopsis* (in combination with embodiment F1)

G18: *Microcystis, Aphanizomenon, Nodularia* and *Cylindrospermopsis* (in combination with embodiment F2)

G19: *Microcystis, Dolichospermum, Nodularia* and *Cylindrospermopsis* (in combination with embodiment F3)

G20: *Microcystis, Aphanizomenon, Dolichospermum, Nodularia* and *Cylindrospermopsis* (in combination with embodiment F4)

G21: *Microcystis, Anabaena, Nodularia* and *Cylindrospermopsis* (in combination with embodiment F5)

G22: *Microcystis, Aphanizomenon, Anabaena, Nodularia* and *Cylindrospermopsis* (in combination with embodiment F6)

G23: *Microcystis, Dolichospermum, Anabaena, Nodularia* and *Cylindrospermopsis* (in combination with embodiment F7)

G24: *Microcystis, Aphanizomenon, Dolichospermum, Anabaena, Nodularia* and *Cylindrospermopsis* (in combination with embodiment F8)

G25: *Microcystis, Planktothrix, Nodularia* and *Cylindrospermopsis* (in combination with embodiment F9)

G26: *Microcystis, Aphanizomenon, Planktothrix, Nodularia* and *Cylindrospermopsis* (in combination with embodiment F10)

G27: *Microcystis, Dolichospermum, Planktothrix, Nodularia* and *Cylindrospermopsis* (in combination with embodiment F1)

G28: *Microcystis, Aphanizomenon, Dolichospermum, Planktothrix, Nodularia* and *Cylindrospermopsis* (in combination with embodiment F12)

G29: *Microcystis, Anabaena, Planktothrix, Nodularia* and *Cylindrospermopsis* (in combination with embodiment F13)

G30: *Microcystis, Aphanizomenon, Anabaena, Planktothrix, Nodularia* and *Cylindrospermopsis* (in combination with embodiment F14)

G31: *Microcystis, Dolichospermum, Anabaena, Planktothrix, Nodularia* and *Cylindrospermopsis* (in combination with embodiment F15)

G32: *Microcystis, Aphanizomenon, Dolichospermum, Anabaena, Planktothrix, Nodularia* and *Cylindrospermopsis* (in combination with embodiment F16)

thanks to the use of specific probes of toxinogenic cyanobacteria of the genus *Microcystis, Aphanizomenon, Dolichospermum, Anabaena, Planktothrix, Nodularia* and *Cylindrospermopsis*.

Embodiment H

In another embodiment, the invention also concerns the use of at least one pair of probes specific to toxinogenic cyanobacteria of the genus *Aphanizomenon* for the implementation of a method for the detection of toxinogenic cyanobacteria in a sample likely to contain at least one toxinogenic cyanobacteria of the genus *Aphanizomenon*, the sequences of said probes being selected from x elements of one of the following sets:

(SEQ ID NO: 20, SEQ ID NO: 21 and SEQ ID NO: 22)
(SEQ ID NO: 23 and SEQ ID NO: 24)

x being 2 or 3, or the sequences of said probes having at least 92% identity with the abovementioned sequences SEQ ID NO: 20, SEQ ID NO: 21, SEQ ID NO: 22, SEQ ID NO: 23, SEQ ID NO: 24, one probe of said pair being a capture probe linked to at least one attachment molecule positioned at 3' or 5' of its sequence and the other probe of said pair being a signal probe linked to at least one marking molecule positioned at 3' or 5' of its sequence said capture probe and said signal probe being capable of hybridizing with the ribosomal nucleic acid of the toxinogenic cyanobacteria of the genus *Aphanizomenon* optionally present in said sample to form a complex, the minimum detection threshold of the toxinogenic cyanobacteria of the genus *Aphanizomenon* being estimated from 10 to 575 active living cells per millilitre of sample (cells/mL), or less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

As above, and in a particular embodiment, the minimum detection threshold of the toxinogenic cyanobacteria of the genus *Aphanizomenon* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, in this particular embodiment, the invention also concerns the use as described above, in which the minimum threshold of the toxinogenic cyanobacteria of the genus *Aphanizomenon* is between 0.02 ng/mL and 0.7 ng/mL of ribosomal RNA and the duration of the implementation of the said detection method is less than one hour.

Embodiment I

In another embodiment, the invention also concerns the use of at least one pair of probes specific to toxinogenic cyanobacteria of the genus *Dolichospermum* for the implementation of a method for the detection of toxinogenic cyanobacteria in a sample likely to contain at least one toxinogenic cyanobacteria of the genus *Dolichospermum*, the sequences of said probes being selected from x elements of one of the following sets:

(SEQ ID NO: 25 and SEQ ID NO: 26)

x being 2, or the sequences of said probes having at least 92% identity with the aforementioned sequences SEQ ID NO: 25, SEQ ID NO: 26, one probe of said pair being a capture probe linked to at least one attachment molecule positioned at 3' or 5' of its sequence and the other probe of said pair being a signal probe linked to at least one marking molecule positioned at 3' or 5' of its sequence said capture probe and said signal probe being capable of hybridizing with the ribosomal nucleic acid of the toxinogenic cyanobacteria of the genus *Dolichospermum* optionally present in said sample to form a complex, the minimum detection threshold of the toxinogenic cyanobacteria of the genus *Dolichospermum* being estimated from 10 to 575 active living cells per millilitre of sample (cells/mL), or less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

As above, and in a particular embodiment, the minimum detection threshold of the toxinogenic cyanobacteria of the genus *Dolichospermum* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, in this particular embodiment, the invention also concerns the use as described above, in which the minimum detection threshold of the toxinogenic cyanobacteria of the genus *Dolichospermum* is between 0.02 ng/mL and 0.7 ng/mL of ribosomal RNA and the duration of the implementation of the said detection method is less than one hour.

Embodiment J

In another embodiment, the invention also concerns the use of at least one pair of probes specific to toxinogenic cyanobacteria of the genus *Anabaena* for the implementation of a method for the detection of toxinogenic cyanobacteria in a sample likely to contain at least one toxinogenic cyanobacteria of the genus *Anabaena*, the sequences of said probes being selected from x elements of one of the following sets:

(SEQ ID NO: 27, SEQ ID NO: 28 and SEQ ID NO: 29)
(SEQ ID NO: 30, SEQ ID NO: 31 and SEQ ID NO: 32)
(SEQ ID NO: 33, SEQ ID NO: 34 and SEQ ID NO: 35)
(SEQ ID NO: 36, SEQ ID NO: 37, SEQ ID NO: 38 and SEQ ID NO: 39)
(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)
(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)
(SEQ ID NO: 57, SEQ ID NO: 58 and SEQ ID NO: 59)
(SEQ ID NO: 60, SEQ ID NO: 61 and SEQ ID NO: 62)

x being 2, 3 or 4, or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62, one probe of said pair being a capture probe linked to at least one attachment molecule positioned at 3' or 5' of its sequence and the other probe of said pair being a signal probe linked to at least one marking molecule positioned at 3' or 5' of its sequence, said capture probe and said signal probe being capable of hybridizing with the ribosomal nucleic acid of the toxinogenic cyanobacteria of the genus *Anabaena* optionally present in said sample to form a complex, the minimum detection threshold of the toxinogenic cyanobacteria of the genus *Anabaena* being estimated from 10 to 575 active living cells per millilitre of sample (cells/mL), or less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

As above, and in a particular embodiment, the minimum detection threshold of the toxinogenic cyanobacteria of the genus *Anabaena* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, in this particular embodiment, the invention also concerns the use as described above, in which the minimum detection threshold of the toxinogenic cyanobacteria of the genus *Anabaena* is between 0.02 ng/mL and 0.7 ng/mL of ribosomal RNA and the duration of the implementation of the said detection method is less than one hour.

Embodiment K

In another embodiment, the invention also concerns the use of at least one pair of probes specific to toxinogenic cyanobacteria of the genus *Planktothrix* for the implementation of a method for the detection of toxinogenic cyanobacteria in a sample likely to contain at least one toxinogenic cyanobacteria of the genus *Planktothrix*, the sequences of said probes being selected from x elements of one of the following sets:

(SEQ ID NO: 63, SEQ ID NO: 64, SEQ ID NO: 65 and SEQ ID NO: 66)
(SEQ ID NO: 67, SEQ ID NO: 68 and SEQ ID NO: 69)

x being 3 or 4, or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69, one probe of said pair being a capture probe linked to at least one attachment molecule positioned at 3' or 5' of its sequence and the other probe of said pair being a signal probe linked to at least one marking molecule positioned at 3' or 5' of its sequence said capture probe and said signal probe being capable of hybridizing with the ribosomal nucleic acid of the toxinogenic cyanobacteria of the genus *Planktothrix* optionally present in said sample to form a complex, the minimum detection threshold of the toxinogenic cyanobacteria of the genus *Planktothrix* being estimated from 10 to 575 active living cells per millilitre of sample (cells/mL), or less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

As above, and in a particular embodiment, the minimum detection threshold of the toxinogenic cyanobacteria of the *Planktothrix* genus is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, in this particular embodiment, the invention also concerns the use as described above, in which the minimum detection threshold of the toxinogenic cyanobacteria of the genus *Planktothrix* is between 0.02 ng/mL and 0.7 ng/mL of ribosomal RNA and the duration of the implementation of the said detection method is less than one hour.

"Percentage identity" in relation to a given sequence means the percentage of amino acids that are identical to those in a reference sequence and that are found in the same positions.

"At least 92% identity" means the ranges of at least 92%, at least 93%, at least 94%, at least 95%, at least 96%, at least 97%, at least 98%, at least 99% and 100% identity.

In all embodiments of this first aspect, and according to a particular embodiment, said capture probe is linked to at least one attachment molecule positioned 5' from its sequence and said signal probe is linked to at least one marking molecule positioned 5' from its sequence.

In all embodiments of this first aspect, and according to a particular embodiment, said capture probe is linked to at least one attachment molecule positioned 5' from its sequence and said signal probe is linked to at least one marking molecule positioned 3' from its sequence.

In all embodiments of this first aspect, and according to a particular embodiment, said capture probe is linked to at least one attachment molecule positioned 3' from its sequence and said signal probe is linked to at least one marking molecule positioned 5' from its sequence.

In all embodiments of this first aspect, and according to a particular embodiment, said capture probe is linked to at least one attachment molecule positioned in 3' of its sequence and said signal probe is linked to at least one marking molecule positioned in 3' of its sequence.

In all embodiments of this first aspect, the "at least one attachment molecule" can be chosen from a biotin molecule, avidin molecule, streptavidin molecule, a thiol group, an amine group and a carbon.

In all embodiments of this first aspect, and in one particularly embodiment, the "at least one attachment molecule" is a biotin molecule.

In all embodiments of this first aspect, the "at least one marking molecule" may be chosen from a fluorochrome, a biotin, a biotin-bound molecule, digoxigenin, an enzyme using a chemiluminescent substrate, an enzyme using a chromogenic substrate or an enzyme using an electrochemical oxidation substrate.

In all embodiments of this first aspect, and in one particularly embodiment, the "at least one marking molecule" is digoxigenin.

In all embodiments of this first aspect, the said fluorochrome can be chosen from the group consisting of: Alexa fluor, in particular Alexa fluor 350, 405, 430, 488, 500, 514, 532, 546, 555, 568, 594, 610, 633, 647, 660, 680, 700, 750 or 790, Fluorescein Isothiocyanate (FITC), Rhodamine, Allophycocyanine (APC) and Phycoerythrin (PE).

In all embodiments of this first aspect, said enzyme using a chemiluminescent substrate may be horseradish peroxidase (HRP) and said chemiluminescent substrate may be luminol, or said enzyme using a chemiluminescent substrate may be luciferase and said chemiluminescent substrate may be luciferin. In this case, the reaction of the enzyme and its substrate generates light which can be measured by a luminescence reader.

In all embodiments of this first aspect, the said enzyme using a chromogenic substrate can be alkaline phosphatase and the said chromogenic substrate can be Tetrazolium Nitroblue (NBT) or Bromochlorylindolophosphate (BCIP), said enzyme using a chromogenic substrate can be horseradish peroxidase (HRP) and said chromogenic substrate can be 3,3'-Diaminobenzidine (DAB), 3,3',5,5'-Tetramethylbenzidine (TMB), or 2,2'-azino-bis(3-ethylbenzothiazoline-6-sulphonic acid) (ABTS). In this case, the enzyme oxidizes a substrate, which, when reduced, produces a coloured precipitate, which can be measured by an absorbance meter.

In all embodiments of this first aspect, said enzyme using an electrochemically oxidized substrate can be horseradish peroxidase (HRP) and said electrochemically oxidized substrate can be 3,3',5,5'-Tetramethylbenzidine (TMB). In this case, the enzyme (e.g. Horseradish Peroxidase), reacts in the presence of $H_2O_2$, and oxidises a substrate (e.g. TMB) which, when reduced, produces an electrical potential difference. This electrical potential difference can be measured by an electrode.

Thus, in a particular embodiment, the present invention also concerns the use as described above in which said capture probe is linked to at least one attachment molecule positioned 5' from its sequence and said signal probe is linked to at least one marking molecule positioned 5' from its sequence, or said capture probe is linked to at least one attachment molecule positioned 5' of its sequence and said signal probe is linked to at least one marking molecule positioned 3' of its sequence, or said capture probe is linked to at least one attachment molecule positioned 3' of its sequence and said signal probe is linked to at least one marking molecule positioned 5' of its sequence, or said capture probe is linked to at least one attachment molecule positioned 3' of its sequence and said signal probe is linked to at least one marking molecule positioned 3' of its sequence, said "at least one attachment molecule" being in particular selected from a biotin molecule, avidin molecule, streptavidin molecule, a thiol group, an amine group and a carbon, preferably a biotin molecule, the said "at least one marking molecule" being in particular chosen from a fluorochrome, a biotin, a biotin-bound molecule, digoxigenin, an enzyme using a chemiluminescent substrate, an enzyme using a chromogenic substrate or an enzyme using an electrochemically oxidised substrate, preferably digoxigenin, preferably, said enzyme using a chromogenic substrate is alkaline phosphatase and said chromogenic substrate is Tetrazolium Nitroblue (NBT) or Bromochlorylindolophosphate (BCIP), or said enzyme using a chromogenic substrate is horseradish peroxidase (HRP) and said chromogenic substrate is selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

In all embodiments of this first aspect, the sample may be a sample of fresh water, brackish water, culture media or culture media of commercially produced cyanobacteria.

The term "freshwater sample" refers to a volume of water from rivers, lakes, streams, ponds that contains living organisms such as phytoplankton and zooplankton.

The term "brackish water sample" refers to a volume of water resulting from the meeting of fresh and salt water bodies, such as a river estuary, a lagoon, a basin.

The term "culture medium" refers to a support that allows the culture of micro-organisms such as cyanobacteria, bacteria, yeasts.

The term "cyanobacterial cultures" refers to the management of an aquatic ecosystem in order to promote the production of one or more species of commercial interest, such as unicellular, colonial or filamentous cyanobacteria.

In a second aspect, the invention concerns pairs of probes for the detection of toxinogenic cyanobacteria.

Thus, in this second aspect, the invention concerns at least one pair of probes for the detection of toxinogenic cyanobacteria of the genus *Microcystis*, the sequences of which are chosen from x elements of one of the following sets:
    (SEQ ID NO: 1, SEQ ID NO: 2, SEQ ID NO: 3 and SEQ ID NO: 4)
    (SEQ ID NO: 5, SEQ ID NO: 6 and SEQ ID NO: 7)
    (SEQ ID NO: 8, SEQ ID NO: 9, SEQ ID NO: 10 and SEQ ID NO: 11)
    (SEQ ID NO: 12, SEQ ID NO: 13 and SEQ ID NO: 14)
    (SEQ ID NO: 15, SEQ ID NO: 16 and SEQ ID NO: 17)
    (SEQ ID NO: 18 and SEQ ID NO: 19)
x being 2, 3 or 4
or the sequences of said probes having at least 92% identity with the abovementioned sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19.

In a particular embodiment, the invention also concerns at least one pair of probes for the detection of toxinogenic cyanobacteria of the genus *Microcystis*, the sequences of the probes of the said pairs are as follows:

(SEQ ID NO: 1 and SEQ ID NO: 2), (SEQ ID NO: 1 and SEQ ID NO: 3), (SEQ ID NO: 1 and SEQ ID NO: 4), (SEQ ID NO: 2 and SEQ ID NO: 3), (SEQ ID NO: 2 and SEQ ID NO: 4), (SEQ ID NO: 3 and SEQ ID NO: 4)

(SEQ ID NO: 5 and SEQ ID NO: 6), (SEQ ID NO: 5 and SEQ ID NO: 7), (SEQ ID NO: 6 and SEQ ID NO: 7)

(SEQ ID NO: 8 and SEQ ID NO: 9), (SEQ ID NO: 8 and SEQ ID NO: 10), (SEQ ID NO: 8 and SEQ ID NO: 11), (SEQ ID NO: 9 and SEQ ID NO: 10), (SEQ ID NO: 9 and SEQ ID NO: 11), (SEQ ID NO: 10 and SEQ ID NO: 11)

(SEQ ID NO: 12 and SEQ ID NO: 13), (SEQ ID NO: 12 and SEQ ID NO: 14), (SEQ ID NO: 13 and SEQ ID NO: 14)

(SEQ ID NO: 15 and SEQ ID NO: 16), (SEQ ID NO: 15 and SEQ ID NO: 17), (SEQ ID NO: 16 and SEQ ID NO: 17)

(SEQ ID NO: 18 and SEQ ID NO: 19).

In this second aspect, the invention also concerns at least one pair of probes for the detection of toxinogenic cyanobacteria of the genus *Aphanizomenon*, the sequences of which are selected from x elements of one of the following sets:

(SEQ ID NO: 20, SEQ ID NO: 21 and SEQ ID NO: 22)

(SEQ ID NO: 23 and SEQ ID NO: 24)

x being 2 or 3, or the sequences of said probes having at least 92% identity with the abovementioned sequences SEQ ID NO: 20, SEQ ID NO: 21, SEQ ID NO: 22, SEQ ID NO: 23, SEQ ID NO: 24.

In a particular embodiment, the invention also concerns at least one pair of probes for the detection of toxinogenic cyanobacteria of the genus *Aphanizomenon*, the sequences of the probes of the said pairs are as follows:

(SEQ ID NO: 20 and SEQ ID NO: 21), (SEQ ID NO: 20 and SEQ ID NO: 22), (SEQ ID NO: 21 and SEQ ID NO: 22)

(SEQ ID NO: 23 and SEQ ID NO: 24).

In this second aspect, the invention also concerns at least one pair of probes for the detection of toxinogenic cyanobacteria of the genus *Dolichospermum*, the sequences of which are selected from x elements of one of the following sets:

(SEQ ID NO: 25 and SEQ ID NO: 26)

x being 2, or the sequences of said probes having at least 92% identity with the aforementioned sequences SEQ ID NO: 25, SEQ ID NO: 26.

In this second aspect, the invention also concerns at least one pair of probes for the detection of toxinogenic cyanobacteria of the genus *Anabaena*, the sequences of which are selected from x elements of one of the following sets:

(SEQ ID NO: 27, SEQ ID NO: 28 and SEQ ID NO: 29)
(SEQ ID NO: 30, SEQ ID NO: 31 and SEQ ID NO: 32)
(SEQ ID NO: 33, SEQ ID NO: 34 and SEQ ID NO: 35)
(SEQ ID NO: 36, SEQ ID NO: 37, SEQ ID NO: 38 and SEQ ID NO: 39)
(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)
(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)
(SEQ ID NO: 57, SEQ ID NO: 58 and SEQ ID NO: 59)
(SEQ ID NO: 60, SEQ ID NO: 61 and SEQ ID NO: 62)

x being 2, 3 or 4, or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62.

In a particular embodiment, the invention also concerns at least one pair of probes for the detection of toxinogenic cyanobacteria of the genus *Anabaena*, the sequences of the probes of the said pairs are as follows:

(SEQ ID NO: 27 and SEQ ID NO: 28), (SEQ ID NO: 27 and SEQ ID NO: 29), (SEQ ID NO: 28 and SEQ ID NO: 29)

(SEQ ID NO: 30 and SEQ ID NO: 31), (SEQ ID NO: 30 and SEQ ID NO: 32), (SEQ ID NO: 31 and SEQ ID NO: 32)

(SEQ ID NO: 33 and SEQ ID NO: 34), (SEQ ID NO: 33 and SEQ ID NO: 35), (SEQ ID NO: 34 and SEQ ID NO: 35)

(SEQ ID NO: 36 and SEQ ID NO: 37), (SEQ ID NO: 36 and SEQ ID NO: 38), (SEQ ID NO: 36 and SEQ ID NO: 39), (SEQ ID NO: 37 and SEQ ID NO: 38), (SEQ ID NO: 37 and SEQ ID NO: 39), (SEQ ID NO: 38 and SEQ ID NO: 39)

(SEQ ID NO: 40 and SEQ ID NO: 41), (SEQ ID NO: 40 and SEQ ID NO: 42), (SEQ ID NO: 41 and SEQ ID NO: 42)

(SEQ ID NO: 43 and SEQ ID NO: 44), (SEQ ID NO: 43 and SEQ ID NO: 45), (SEQ ID NO: 44 and SEQ ID NO: 45)

(SEQ ID NO: 46 and SEQ ID NO: 47), (SEQ ID NO: 46 and SEQ ID NO: 48), (SEQ ID NO: 47 and SEQ ID NO: 48)

(SEQ ID NO: 49 and SEQ ID NO: 50), (SEQ ID NO: 49 and SEQ ID NO: 51), (SEQ ID NO: 50 and SEQ ID NO: 51)

(SEQ ID NO: 52 and SEQ ID NO: 53), (SEQ ID NO: 52 and SEQ ID NO: 54), (SEQ ID NO: 53 and SEQ ID NO: 54)

(SEQ ID NO: 55 and SEQ ID NO: 56)

(SEQ ID NO: 57 and SEQ ID NO: 58), (SEQ ID NO: 57 and SEQ ID NO: 59), (SEQ ID NO: 58 and SEQ ID NO: 59)

(SEQ ID NO: 60 and SEQ ID NO: 61), (SEQ ID NO: 60 and SEQ ID NO: 62), (SEQ ID NO: 61 and SEQ ID NO: 62).

In this second aspect, the invention also concerns at least one pair of probes for the detection of toxinogenic cyanobacteria of the genus *Planktothrix*, the sequences of which are selected from x elements of one of the following sets:

(SEQ ID NO: 63, SEQ ID NO: 64, SEQ ID NO: 65 and SEQ ID NO: 66)

(SEQ ID NO: 67, SEQ ID NO: 68 and SEQ ID NO: 69)

x being 3 or 4, or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69.

In a particular embodiment, the invention also concerns at least one pair of probes for the detection of toxinogenic cyanobacteria of the genus *Planktothrix*, the sequences of the probes of the said pairs are as follows:

(SEQ ID NO: 63 and SEQ ID NO: 64), (SEQ ID NO: 63 and SEQ ID NO: 65), (SEQ ID NO: 63 and SEQ ID NO: 66), (SEQ ID NO: 64 and SEQ ID NO: 65), (SEQ ID NO: 64 and SEQ ID NO: 66), (SEQ ID NO: 65 and SEQ ID NO: 66)

(SEQ ID NO: 67 and SEQ ID NO: 68), (SEQ ID NO: 67 and SEQ ID NO: 69), (SEQ ID NO: 68 and SEQ ID NO: 69).

In this second aspect, the invention also concerns at least one pair of probes for the detection of toxinogenic cyanobacteria of the genus *Nodularia*, the sequences of which are selected from x elements of one of the following sets:

(SEQ ID NO: 70, SEQ ID NO: 71 and SEQ ID NO: 72)
(SEQ ID NO: 73, SEQ ID NO: 74 and SEQ ID NO: 75)
(SEQ ID NO: 76 and SEQ ID NO: 77)

x being 2 or 3, or the sequences of said probes having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77.

In a particular embodiment, the invention also concerns at least one pair of probes for the detection of toxinogenic cyanobacteria of the genus *Nodularia*, the sequences of the probes of the said pairs are as follows:

(SEQ ID NO: 70 and SEQ ID NO: 71), (SEQ ID NO: 70 and SEQ ID NO: 72), (SEQ ID NO: 71 and SEQ ID NO: 72)

(SEQ ID NO: 73 and SEQ ID NO: 74), (SEQ ID NO: 73 and SEQ ID NO: 75), (SEQ ID NO: 74 and SEQ ID NO: 75)

(SEQ ID NO: 76 and SEQ ID NO: 77).

In this second aspect, the invention also concerns at least one pair of probes for the detection of toxinogenic cyanobacteria of the genus *Cylindrospermopsis*, the sequences of which are selected from x elements of one of the following sets:

(SEQ ID NO: 78, SEQ ID NO: 79 and SEQ ID NO: 80)

x being 3, or the sequences of said probes having at least 92% identity with the aforementioned sequences SEQ ID NO: 78, SEQ ID NO: 79, SEQ ID NO: 80.

In a particular embodiment, the invention also concerns at least one pair of probes for the detection of toxinogenic cyanobacteria of the genus *Cylindrospermopsis*, the sequences of the probes of the said pairs are as follows:

(SEQ ID NO: 78 and SEQ ID NO: 79), (SEQ ID NO: 78 and SEQ ID NO: 80), (SEQ ID NO: 79 and SEQ ID NO: 80).

In all embodiments of this second aspect of the invention, one probe of said pair is a capture probe linked to at least one attachment molecule positioned at 3' or 5' of its sequence and the other probe of said pair is a signal probe linked to at least one marking molecule positioned at 3' or 5' of its sequence.

In a particular embodiment of this second aspect, said capture probe is linked to at least one attachment molecule positioned 5' from its sequence and said signal probe is linked to at least one marking molecule positioned 5' from its sequence.

In a particular embodiment of this second aspect, said capture probe is linked to at least one attachment molecule positioned 5' from its sequence and said signal probe is linked to at least one marking molecule positioned 3' from its sequence.

In a particular embodiment of this second aspect, said capture probe is linked to at least one attachment molecule positioned 3' from its sequence and said signal probe is linked to at least one marking molecule positioned 5' from its sequence.

In a particular embodiment of this second aspect, said capture probe is linked to at least one attachment molecule positioned 3' from its sequence and said signal probe is linked to at least one marking molecule positioned 3' from its sequence.

In all embodiments of this second aspect, the attachment molecule can be selected from a biotin molecule, avidin molecule, streptavidin molecule, a thiol group, an amine group and a carbon. In a particularly preferred embodiment, the attachment molecule is a biotin molecule.

In all embodiments of this second aspect, the marking molecule can be chosen from a fluorochrome, a biotin, a biotin-bound molecule, digoxigenin, an enzyme using a chemiluminescent substrate, an enzyme using a chromogenic substrate or an enzyme using an electrochemically oxidised substrate.

In a particularly preferred embodiment, the marking molecule is digoxigenin.

In all embodiments of this second aspect of the invention, said fluorochrome can be selected from the group consisting of: Alexa fluor, in particular Alexa fluor 350, 405, 430, 488, 500, 514, 532, 546, 555, 568, 594, 610, 633, 647, 660, 680, 700, 750 or 790, Fluorescein Isothiocyanate (FITC), Rhodamine, Allophycocyanine (APC) and Phycoerythrin (PE).

In all embodiments of this second aspect of the invention, said enzyme using a chemiluminescent substrate may be horseradish peroxidase (HRP) and said chemiluminescent substrate may be luminol, or said enzyme using a chemiluminescent substrate may be luciferase and said chemiluminescent substrate may be luciferin.

In all embodiments of this second aspect of the invention, said enzyme using a chromogenic substrate may be alkaline phosphatase and said chromogenic substrate may be Tetrazolium Nitroblue (NBT) or Bromochlorylindolophosphate (BCIP), said enzyme using a chromogenic substrate may be horseradish peroxidase (HRP) and said chromogenic substrate may be selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

In all embodiments of this second aspect of the invention, said enzyme using an electrochemically oxidisable substrate may be horseradish peroxidase (HRP) and said electrochemically oxidisable substrate may be 3,3',5,5'-Tetramethylbenzidine (TMB).

In a third aspect, the invention concerns probes for the detection of toxinogenic cyanobacteria.

In this third aspect, the invention concerns at least one probe for the detection of toxinogenic cyanobacteria of the genus *Microcystis*, said probe having a sequence selected from the sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19 or the sequence of said probe having at least 92% identity with the abovementioned sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19.

In this third aspect, the invention also concerns at least one probe for the detection of toxinogenic cyanobacteria of the genus *Aphanizomenon*, said probe having a sequence selected from the sequences SEQ ID NO: 20, SEQ ID NO: 21, SEQ ID NO: 22, SEQ ID NO: 23, SEQ ID NO: 24 or the sequence of said probe having at least 92% identity with the abovementioned sequences SEQ ID NO: 20, SEQ ID NO: 21, SEQ ID NO: 22, SEQ ID NO: 23, SEQ ID NO: 24.

In this third aspect, the invention also concerns at least one probe for the detection of toxinogenic cyanobacteria of the genus *Dolichospermum*, said probe having a sequence selected from the sequences SEQ ID NO: 25, SEQ ID NO: 26 or the sequence of said probe having at least 92% identity with the abovementioned sequences SEQ ID NO: 25, SEQ ID NO: 26.

In this third aspect, the invention also concerns at least one probe for the detection of toxinogenic cyanobacteria of the genus *Anabaena*, said probe having a sequence selected from the sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62 or the sequence of said probe having at least 92% identity with the abovementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62.

In this third aspect, the invention also concerns at least one probe for the detection of toxinogenic cyanobacteria of the genus *Planktothrix*, said probe having a sequence selected from the sequences SEQ ID NO: 63, SEQ ID NO: 64, SEQ ID NO: 65, SEQ ID NO: 66, SEQ ID NO: 67, SEQ ID NO: 68, SEQ ID NO: 69 or the sequence of said probe having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69.

In this third aspect, the invention also concerns at least one probe for the detection of toxinogenic cyanobacteria of the genus *Nodularia*, said probe having a sequence selected from the sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77 or the sequence of said probe having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77.

In this third aspect, the invention also concerns at least one probe for the detection of toxinogenic cyanobacteria of the genus *Cylindrospermopsis*, said probe having a sequence chosen from the sequences SEQ ID NO: 78, SEQ ID NO: 79, SEQ ID NO: 80 or the sequence of the said probe having at least 92% identity with the abovementioned sequences SEQ ID NO: 78, SEQ ID NO: 79, SEQ ID NO: 80.

In a particular embodiment of this third aspect, the invention also concerns probes of sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62, SEQ ID NO: 63, SEQ ID NO: 64, SEQ ID NO: 65, SEQ ID NO: 66, SEQ ID NO: 67, SEQ ID NO: 68, SEQ ID NO: 69 or having at least 92% identity with the abovementioned sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62, SEQ ID NO: 63, SEQ ID NO: 64, SEQ ID NO: 65, SEQ ID NO: 66, SEQ ID NO: 67, SEQ ID NO: 68, SEQ ID NO: 69.

According to all embodiments of this third aspect, the said probe can be linked to at least one attachment molecule at 3' or 5' of its sequence or to at least one marking molecule at 3' or 5' of its sequence.

In a particular embodiments of this third aspect, said probe is linked to at least one attachment molecule in 3' of its sequence.

In another particular embodiments of this third aspect, said probe is linked to at least one attachment molecule in 5' of its sequence.

In another particular embodiments of this third aspect, said probe is linked to at least one marking molecule in 3' of its sequence.

In a particular embodiments of this third aspect, said probe is linked to at least one marking molecule in 5' of its sequence.

According to all embodiments of this third aspect, the "at least one attachment molecule" can be chosen from a biotin molecule, avidin molecule, streptavidin molecule, a thiol group, an amine group and a carbon.

In a particularly preferred embodiments, the "at least one attachment molecule" is a biotin molecule.

According to all embodiments of this third aspect, the "at least one marking molecule" may be selected from a fluorochrome, a biotin, a biotin-bound molecule, digoxigenin, an enzyme using a chemiluminescent substrate, an enzyme using a chromogenic substrate or an enzyme using an electrochemically oxidised substrate.

In a particularly preferred embodiments, the "at least one marking molecule" is digoxigenin. According to all embodiments of this third aspect, the said fluorochrome can be selected from the group consisting of: Alexa fluor, in particular Alexa fluor 350, 405, 430, 488, 500, 514, 532, 546, 555, 568, 594, 610, 633, 647, 660, 680, 700, 750 or 790, Fluorescein Isothiocyanate (FITC), Rhodamine, Allophycocyanine (APC) and Phycoerythrin (PE).

According to all embodiments of this third aspect, said enzyme using a chemiluminescent substrate may be horseradish peroxidase (HRP) and said chemiluminescent substrate may be luminol, or said enzyme using a chemiluminescent substrate may be luciferase and said chemiluminescent substrate may be luciferin.

According to all embodiments of this third aspect, said enzyme using a chromogenic substrate can be alkaline phosphatase and said chromogenic substrate can be Tetrazolium Nitroblue (NBT) and Bromochlorylindolophosphate (BCIP), said enzyme using a chromogenic substrate may be horseradish peroxidase (HRP) and said chromogenic substrate may be selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

According to all embodiments of this third aspect, said enzyme using an electrochemically oxidised substrate can be horseradish peroxidase (HRP) and said electrochemically oxidised substrate can be 3,3',5,5'-Tetramethylbenzidine (TMB).

In a fourth aspect, the invention concerns a method for the detection of toxinogenic cyanobacteria.

Thus, the present invention also concerns a method for detecting toxinogenic cyanobacteria in a sample likely to contain at least one toxinogenic cyanobacteria of the genus *Microcystis* comprising the following steps:
  a) optional hybridization resulting from the contact of the said sample with a capture probe and a signal probe specific to toxinogenic cyanobacteria of the genus *Microcystis*, the capture probe and the signal probe forming a pair of probes, the sequences of the said pair of probes being chosen from x elements of one of the following sets:
    (SEQ ID NO: 1, SEQ ID NO: 2, SEQ ID NO: 3 and SEQ ID NO: 4)
    (SEQ ID NO: 5, SEQ ID NO: 6 and SEQ ID NO: 7)
    (SEQ ID NO: 8, SEQ ID NO: 9, SEQ ID NO: 10 and SEQ ID NO: 11)
    (SEQ ID NO: 12, SEQ ID NO: 13 and SEQ ID NO: 14)
    (SEQ ID NO: 15, SEQ ID NO: 16 and SEQ ID NO: 17)
    (SEQ ID NO: 18 and SEQ ID NO: 19)
x being 2, 3 or 4
or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
said capture probe and said signal probe being capable of hybridizing with the ribosomal nucleic acid of a toxinogenic cyanobacteria of the genus *Microcystis* optionally present in said sample to form a complex,
  b) detection of said optional complex,
hybridization indicating the presence of toxinogenic cyanobacteria of the genus *Microcystis*.

The invention also concerns a method for detecting toxinogenic cyanobacteria in a sample likely to contain at least one toxinogenic cyanobacteria of the genus *Microcystis* comprising the following steps:
  a) optional hybridization resulting from the contact of the said sample with a capture probe and a signal probe specific to toxinogenic cyanobacteria of the genus *Microcystis*, the capture probe and the signal probe forming a pair of probes, the sequences of the said of probes being chosen from x elements of one of the following sets:
    (SEQ ID NO: 1, SEQ ID NO: 2, SEQ ID NO: 3 and SEQ ID NO: 4)
    (SEQ ID NO: 5, SEQ ID NO: 6 and SEQ ID NO: 7)
    (SEQ ID NO: 8, SEQ ID NO: 9, SEQ ID NO: 10 and SEQ ID NO: 11)
    (SEQ ID NO: 12, SEQ ID NO: 13 and SEQ ID NO: 14)
    (SEQ ID NO: 15, SEQ ID NO: 16 and SEQ ID NO: 17)
    (SEQ ID NO: 18 and SEQ ID NO: 19)
x being 2, 3 or 4
or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
said capture probe and said signal probe being capable of hybridizing with the ribosomal nucleic acid of a toxinogenic cyanobacteria of the genus *Microcystis* optionally present in said sample to form a complex,
  b) detection of said optional complex,
hybridization indicating the presence of toxinogenic cyanobacteria of the genus *Microcystis*, the minimum detection threshold of the toxinogenic cyanobacteria of the genus *Microcystis* being
    estimated from 10 to 575 active living cells per millilitre of sample (cells/mL), or
    less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

As stated above, a minimum detection threshold for toxinogenic cyanobacteria of the genus *Microcystis* of 0.02 ng to 0.7 ng ribosomal RNA per millilitre of sample corresponds to a detection limit equivalent to 10 to 575 cells/mL.

The invention also relates to a method for the detection of toxinogenic cyanobacteria in a sample likely to contain at least one toxinogenic cyanobacteria of the genus *Microcystis*, as described above, in which the duration of the implementation of said detection method is less than one hour.

Thus, the invention also concerns a method for detecting toxinogenic cyanobacteria in a sample likely to contain at least one toxinogenic cyanobacteria of the genus *Microcystis* comprising the following steps:
  a) possible hybridization resulting from the contact of the said sample with a capture probe and a signal probe specific to toxinogenic cyanobacteria of the genus *Microcystis*, the capture probe and the signal probe forming a pair of probes, the sequences of the said pair of probes being chosen from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)
x being 2, 3 or 4
or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
said capture probe and said signal probe being capable of hybridizing with the ribosomal nucleic acid of a toxinogenic cyanobacteria of the genus *Microcystis* optionally present in said sample to form a complex,
b) detection of said optional complex,
hybridization indicating the presence of toxinogenic cyanobacteria of the genus *Microcystis*, the duration of the implementation of the said detection method being less than one hour.

In this embodiment, the invention also concerns a method for detecting toxinogenic cyanobacteria in a sample likely to contain at least one toxinogenic cyanobacteria of the genus *Microcystis*, as described above, in which the minimum detection threshold of the toxinogenic cyanobacteria of the genus *Microcystis* is between 0.02 ng and 0.7 ng of ribosomal RNA and the duration of the implementation of the said detection method is less than one hour.

In a particular embodiment, the method for the detection of toxinogenic cyanobacteria in a sample likely to contain at least one toxinogenic cyanobacteria of the genus *Microcystis*, as described above, may also include, before the optional hybridization step, a step of preparation of the said sample to be analysed in order to obtain a prepared sample.

In a particular embodiment, the method for the detection of toxinogenic cyanobacteria in a sample likely to contain at least one toxinogenic cyanobacteria of the genus *Microcystis*, as described above, may also include a step for the quantification of toxinogenic cyanobacteria of the genus *Microcystis* in the case of a hybridization indicating the presence of toxinogenic cyanobacteria of the genus *Microcystis*.

Thus, the invention also concerns a method for detecting toxinogenic cyanobacteria in a sample likely to contain at least one toxinogenic cyanobacteria of the genus *Microcystis* comprising the following steps:
a) preparation of said sample to be analysed in order to obtain a prepared sample
b) optional hybridization resulting from the contact of said prepared sample with a capture probe and a signal probe specific to toxinogenic cyanobacteria of the genus *Microcystis*, the capture probe and the signal probe forming a pair of probes, the sequences of said pair of probes being selected from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)
x being 2, 3 or 4,
or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
said capture probe and said signal probe being capable of hybridizing with the ribosomal nucleic acid of a toxinogenic cyanobacteria of the genus *Microcystis* optionally present in said sample to form a complex,
c) detection of said optional complex
d) quantification of toxinogenic cyanobacteria of the genus *Microcystis*, in the case of hybridization,
hybridization indicating the presence of toxinogenic cyanobacteria of the genus *Microcystis*.

The invention also concerns a method for detecting toxinogenic cyanobacteria in a sample likely to contain at least one toxinogenic cyanobacteria of the genus *Microcystis* comprising the following steps:
a) preparation of said sample to be analysed in order to obtain a prepared sample
b) possible hybridization resulting from the contact of said prepared sample with a capture probe and a signal probe specific to toxinogenic cyanobacteria of the genus *Microcystis*, the capture probe and the signal probe forming a pair of probes, the sequences of said pair of probes being selected from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)
x being 2, 3 or 4,
or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
said capture probe and said signal probe being capable of hybridizing with the ribosomal nucleic acid of a toxinogenic cyanobacteria of the genus *Microcystis* optionally present in said sample to form a complex,
c) detection of said optional complex
d) quantification of toxinogenic cyanobacteria of the genus *Microcystis*, in the case of hybridization,
hybridization indicating the presence of toxinogenic cyanobacteria of the genus *Microcystis*, the minimum detection threshold of the toxinogenic cyanobacteria of the genus *Microcystis* being
estimated from 10 to 575 active living cells per millilitre of sample (cells/mL), or
less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample.

As stated above, a minimum detection threshold for toxinogenic cyanobacteria of the genus *Microcystis* of 0.02 ng to 0.7 ng ribosomal RNA per millilitre of sample corresponds to a detection limit equivalent to 10 to 575 cells/mL.

The invention also concerns a method for detecting toxinogenic cyanobacteria in a sample likely to contain at least one toxinogenic cyanobacteria of the genus *Microcystis* comprising the following steps:
  a) preparation of said sample to be analysed in order to obtain a prepared sample
  b) possible hybridization resulting from the contact of said prepared sample with a capture probe and a signal probe specific to toxinogenic cyanobacteria of the genus *Microcystis*, the capture probe and the signal probe forming a pair of probes, the sequences of said pair of probes being selected from x elements of one of the following sets:
    (SEQ ID NO: 1, SEQ ID NO: 2, SEQ ID NO: 3 and SEQ ID NO: 4)
    (SEQ ID NO: 5, SEQ ID NO: 6 and SEQ ID NO: 7)
    (SEQ ID NO: 8, SEQ ID NO: 9, SEQ ID NO: 10 and SEQ ID NO: 11)
    (SEQ ID NO: 12, SEQ ID NO: 13 and SEQ ID NO: 14)
    (SEQ ID NO: 15, SEQ ID NO: 16 and SEQ ID NO: 17)
    (SEQ ID NO: 18 and SEQ ID NO: 19)
  x being 2, 3 or 4,
  or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
  said capture probe and said signal probe being capable of hybridizing with the ribosomal nucleic acid of a toxinogenic cyanobacteria of the genus *Microcystis* optionally present in said sample to form a complex,
  c) detection of said optional complex
  d) quantification of toxinogenic cyanobacteria of the genus *Microcystis*, in the case of hybridization,
hybridization indicating the presence of toxinogenic cyanobacteria of the genus *Microcystis*, the duration of the implementation of steps b) and c) being less than one hour.

In a particular embodiment, the invention also relates to a method of detecting toxinogenic cyanobacteria in a sample likely to contain at least one toxinogenic cyanobacteria of the genus *Microcystis*, as described above, in which the minimum detection threshold of the toxinogenic cyanobacteria of the genus *Microcystis* is between 0.02 ng/mL and 0.7 ng/mL of ribosomal RNA and the duration of the implementation of steps b) and c) is less than one hour.

Thus, the invention also concerns a method for detecting toxinogenic cyanobacteria in a sample likely to contain at least one toxinogenic cyanobacteria of the genus *Microcystis* comprising the following steps:
  a) preparation of said sample to be analysed in order to obtain a prepared sample
  b) possible hybridization resulting from the contact of said prepared sample with a capture probe and a signal probe specific to toxinogenic cyanobacteria of the genus *Microcystis*, the capture probe and the signal probe forming a pair of probes, the sequences of said pair of probes being selected from x elements of one of the following sets:
    (SEQ ID NO: 1, SEQ ID NO: 2, SEQ ID NO: 3 and SEQ ID NO: 4)
    (SEQ ID NO: 5, SEQ ID NO: 6 and SEQ ID NO: 7)
    (SEQ ID NO: 8, SEQ ID NO: 9, SEQ ID NO: 10 and SEQ ID NO: 11)
    (SEQ ID NO: 12, SEQ ID NO: 13 and SEQ ID NO: 14)
    (SEQ ID NO: 15, SEQ ID NO: 16 and SEQ ID NO: 17)
    (SEQ ID NO: 18 and SEQ ID NO: 19)
  x being 2, 3 or 4,
  or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
  said capture probe and said signal probe being capable of hybridizing with the ribosomal nucleic acid of a toxinogenic cyanobacteria of the genus *Microcystis* optionally present in said sample to form a complex,
  c) detection of said optional complex
  d) quantification of toxinogenic cyanobacteria of the genus *Microcystis*, in the case of hybridization,
hybridization indicating the presence of toxinogenic cyanobacteria of the genus *Microcystis*, the minimum detection threshold of the toxinogenic cyanobacteria of the genus *Microcystis* being
  estimated from 10 to 575 active living cells per millilitre of sample (cells/mL), or
  less than or equal to 1.0 ng of ribosomal RNA per millilitre of sample, and in particular from 0.02 ng to 0.7 ng of ribosomal RNA per millilitre of sample and preferably from 0.02 ng to 0.1 ng of ribosomal RNA per millilitre of sample,
the duration of the implementation of steps b) and c) being less than one hour.

In a particular embodiment, the invention concerns a method for detecting toxinogenic cyanobacteria in a sample likely to contain at least one toxinogenic cyanobacteria of the genus *Microcystis*, as described above, in which said step of preparing said sample to be analysed comprises the following steps:
  a) a step of concentration of the sample in order to obtain a concentrated sample
  b) a step of lysis of toxinogenic cyanobacteria optionally present in the said sample, resulting in the release of ribosomal nucleic acids from toxinogenic cyanobacteria of the genus *Microcystis* likely to be contained in said sample.

In a particular embodiment, the invention concerns a method for the detection of toxinogenic cyanobacteria in a sample likely to contain at least one toxinogenic cyanobacteria of the genus *Microcystis*, as described above, which may furthermore comprise a step of extraction and purification of the ribosomal nucleic acids obtained following the lysis step b) using a nucleic acid extraction and purification protocol known to man of the art.

In one embodiment, the invention concerns a method for the detection of toxinogenic cyanobacteria in a sample likely to contain at least one toxinogenic cyanobacteria of the genus *Microcystis*, as described above, which may furthermore comprise a step of fragmentation of the ribosomal nucleic acids obtained following the lysis step b) in order to homogenise the size of the extracted and purified nucleic acids.

In a particular embodiment, the said step of concentrating the said sample may be a centrifugation or filtration step.

In a particular embodiment, the said filtration can be carried out on nylon or polycarbonate filters. These filters can, for example, have a porosity of 0.2 to 100 µm.

In a particular embodiment, the said lysis step may be a chemical lysis step comprising the addition of a lysis solution to the said concentrated sample obtained in step (a) described above.

In a particular embodiment, said lysis solution may comprise a neutral buffer, a chaotropic agent, an ionic or non-ionic detergent, a reducing agent and a chelating agent.

The neutral buffer can for example be phosphate, Saline Sodium Citrate (SSC) or Tris. The chaotropic agent can for example be guanidium chloride. The ionic or non-ionic detergent can for example be Sodium Dodecyl Sulphate (SDS) or Triton X100. The reducing agent can for example be b-mercaptoethanol or DiThioTreitol. The chelating agent can for example be Ethylene Diamine Tetra Acetic Acid (EDTA) or Ethylene Glycol Tetraacetic Acid (EGTA). In a particular embodiment, the said chemical lysis step may be accompanied by thermal lysis, sonic lysis and/or mechanical lysis. Thermal lysis can for example be carried out with liquid nitrogen or by heating the said sample. Sonic lysis can for example be carried out using ultrasound or vibration. Mechanical lysis can for example be carried out using a vortex or grinding.

In a particular embodiment, the invention concerns a method for detecting toxinogenic cyanobacteria in a sample likely to contain at least one toxinogenic cyanobacteria of the genus *Microcystis*, as described above, in which said capture probe is linked to at least one attachment molecule positioned 5' from its sequence and said signal probe is linked to at least one marking molecule positioned 5' from its sequence.

In another particular embodiment, the invention concerns a method for detecting toxinogenic cyanobacteria in a sample likely to contain at least one toxinogenic cyanobacteria of the genus *Microcystis*, as described above, in which said capture probe is linked to at least one attachment molecule positioned 5' from its sequence and said signal probe is linked to at least one marking molecule positioned 3' from its sequence.

In another particular embodiment, the invention concerns a method for detecting toxinogenic cyanobacteria in a sample likely to contain at least one toxinogenic cyanobacteria of the genus *Microcystis*, as described above, in which said capture probe is linked to at least one attachment molecule positioned 3' from its sequence and said signal probe is linked to at least one marking molecule positioned 5' from its sequence.

In another particular embodiment, the invention concerns a method for detecting toxinogenic cyanobacteria in a sample likely to contain at least one toxinogenic cyanobacteria of the genus *Microcystis* as described above, in which said capture probe is linked to at least one attachment molecule positioned 3' from its sequence and said signal probe is linked to at least one marking molecule positioned 3' from its sequence.

In a particular embodiment, the attachment molecule can be selected from a biotin, avidin, streptavidin molecule, a thiol group, an amine group and a carbon group.

In a particularly preferred embodiment, the said attachment molecule is a biotin molecule.

In a particular embodiment, the marking molecule may be chosen from a fluorochrome, a biotin, a biotin-bound molecule, digoxigenin, an enzyme using a chemiluminescent substrate, an enzyme using a chromogenic substrate or an enzyme using an electrochemical oxidation substrate.

In a particularly preferred embodiment, the marking molecule is digoxigenin.

In a particular embodiment, said fluorochrome can be selected from the group consisting of: Alexa fluor, in particular Alexa fluor 350, 405, 430, 488, 500, 514, 532, 546, 555, 568, 594, 610, 633, 647, 660, 680, 700, 750 or 790, Fluorescein Isothiocyanate (FITC), Rhodamine, Allophyco-cyanine (APC) and Phycoerythrin (PE).

In a particular embodiment, said enzyme using a chemiluminescent substrate may be horseradish peroxidase (HRP) and said chemiluminescent substrate may be luminol, or said enzyme using a chemiluminescent substrate may be luciferase and said chemiluminescent substrate may be luciferin.

In a particular embodiment, said enzyme using a chromogenic substrate may be alkaline phosphatase and said chromogenic substrate may be Tetrazolium Nitroblue (NBT) and Bromochlorylindolophosphate (BCIP), or said enzyme using a chromogenic substrate may be horseradish peroxidase (HRP) and said chromogenic substrate may be selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

In a particular embodiment, said enzyme using an electrochemically oxidizable substrate may be horseradish peroxidase (HRP) and said electrochemically oxidizable substrate may be 3,3',5,5'-Tetramethylbenzidine (TMB).

In a particular embodiment, the invention relates to a method for detecting toxinogenic cyanobacteria in a sample likely to contain at least one toxinogenic cyanobacteria of the genus *Microcystis*, as described above, in which said hybridization is carried out in a hybridization solution.

In a particular embodiment, said hybridization solution comprises 0 to 0.3 M NaCl, 0 to 0.1 M buffer selected from citrate, Tris-HCl, PIPES, HEPES or phosphate, 0.001 to 0.05% detergent agent selected from SDS, triton, TWEEN20, optionally 0.001 to 0.5 M chelating agent selected from EDTA or EGTA, optionally 0.1 to 30% blocking agent selected from BSA, herring DNA, salmon DNA, calf DNA, yeast DNA or an exogenous protein and optionally another chemical agent selected from $MgCl_2$, KCl and $CaCl_2$, preferably $MgCl_2$.

In a further particular embodiment, said hybridization solution comprises 0.1 M to 1 M of NaCl or KCl, 0.01 M to 1 M of Tris-HCl, HEPES, PBS, $KH_2PO_4$ or SSC with a pH ranging from 6.0 to 9.0, 0.01 to 0.05% of detergent agent selected from SDS or N-Lauroylsarcosine, optionally 0.01 and 0.1 M chelating agent selected from EDTA, EGTA or a similar chelating agent selected from calcium citrate or sodium hexametaphosphate and optionally 0.1 and 30% blocking agent selected from a protein such as Bovine Serum Albumin Protein (BSA) or a nucleic acid such as Herring DNA.

In a particularly preferred embodiment, the said hybridization solution consists of 0.3M NaCl, 0.08M Tris-HCl and 0.04% SDS and is pH 8.

In a particular embodiment, the said hybridization is carried out at a temperature ranging from 37° C. to 70° C. In a particularly preferred embodiment, said hybridization is carried out at a temperature of 60° C.

In a particular embodiment, the contact time of said sample with said capture probe and said signal probe is between 10 and 60 minutes. In a particularly preferred embodiment, the contact time of said sample with said capture probe and said signal probe is 10 minutes.

In a particular embodiment, the said detection step may be followed by one or more washing steps with a washing solution. In a particularly preferred embodiment, three washing steps are performed.

In a particular embodiment, each washing step can last from 1 to 60 minutes.

In a particular embodiment, said washing solution comprises 0 to 0.3 M NaCl, 0 to 0.1 M buffer selected from citrate, Tris-HCl, PIPES, HEPES or phosphate, 0.001 to 0.05% detergent agent selected from SDS, triton, TWEEN20, optionally 0.001 to 0.5 M chelating agent selected from EDTA or EGTA, optionally 0.1 to 30% blocking agent selected from BSA, herring DNA, salmon DNA, calf DNA, yeast DNA or an exogenous protein and optionally another chemical agent selected from $MgCl_2$, KCl and $CaCl_2$, preferably $MgCl_2$.

In a further particular embodiment, said washing solution comprises 0.1 M to 1 M of NaCl or KCl, 0.01 M to 1 M of Tris-HCl, HEPES, PBS, $KH_2PO_4$ or SSC with a pH ranging from 6.0 to 9.0, 0.01 and 0.05% of detergent agent selected from SDS or N-Lauroylsarcosine, optionally 0.01 and 0.1 M chelating agent selected from EDTA, EGTA or a similar chelating agent selected from calcium citrate or sodium hexametaphosphate and optionally 0.1 and 30% blocking agent selected from a protein such as Bovine Serum Albumin Protein (BSA) or a nucleic acid such as Herring DNA.

In a particularly preferred embodiment, said washing solution comprising 0.01 and 0.7 M of PBS, $Na_2HPO_4$, $KH_2PO_4$, $K_2PO_4$ and/or SSC, and 0.1 and 0.4 M of NaCl or KCl.

In another particularly preferred embodiment, the said washing solution consists of 0.1M $K_2PO_4$, 0.1M $KH_2PO_4$ and 0.1M KCl and has a pH of 7.6.

In a particular embodiment, the invention also concerns a method for the detection of toxinogenic cyanobacteria in a sample likely to contain at least one toxinogenic cyanobacteria of the genus *Microcystis*, as described above, in which the said step of detecting the said complex can be carried out by a fluorescence reader, by a luminescence reader, by an absorbance reader, by a gamma camera, by a beta camera or by means of an ammeter or a potentiometer.

The said detection step of the said complex can be carried out by fluorescence microscopy or fluorescence reader when:
the marking molecule is a fluorochrome
when the marking molecule is biotin and is detected via a fluorochrome conjugated to streptavidin or avidin
when the marking molecule is conjugated to biotin and is detected via a fluorochrome conjugated to streptavidin or avidin
when the marking molecule is digoxigenin and is detected via a fluorochrome conjugated to an anti-digoxigenin antibody.

The said detection step of the said complex can be performed by luminescence reader when:
the marking molecule is an enzyme using a chemiluminescent substrate
the marking molecule is biotin and is detected via an enzyme using a chemiluminescent substrate conjugated to streptavidin or avidin
the marking molecule is conjugated to biotin and is detected via an enzyme using a chemiluminescent substrate conjugated to streptavidin or avidin
the marking molecule is digoxigenin and is detected via an enzyme using a chemiluminescent substrate conjugated to an anti-digoxigenin antibody.

The said detection step of the said complex can be carried out by an absorbance reader when:
the marking molecule is an enzyme using a chromogenic substrate
the marking molecule is biotin and is detected via an enzyme using a chromogenic substrate conjugated to streptavidin or avidin
the marking molecule is conjugated to biotin and is detected via an enzyme using a chromogenic substrate conjugated to streptavidin or avidin
the marking molecule is digoxigenin and is detected via an enzyme using a chromogenic substrate conjugated to an anti-digoxigenin antibody.

The said detection step of the said complex can be carried out by means of an ammeter or potentiometer when:
the marking molecule is an enzyme using an electrochemical oxidation substrate
the marking molecule is biotin and is detected via an enzyme using an electrochemically oxidised substrate conjugated to streptavidin or avidin
the marking molecule is conjugated to biotin and is detected via an enzyme using an electrochemically oxidised substrate conjugated to streptavidin or avidin
the marking molecule is digoxigenin and is detected via an enzyme using an electrochemically oxidised substrate conjugated to an anti-digoxigenin antibody,
said enzyme using an electrochemically oxidizing substrate reacting in the presence of $H_2O_2$ and oxidizing said electrochemically oxidizing substrate which, when reduced, generates an electric potential difference measured by the electrode.

In one embodiment, the said florochrome can be chosen from the group consisting of: Alexa fluor, in particular Alexa fluor 350, 405, 430, 488, 500, 514, 532, 546, 555, 568, 594, 610, 633, 647, 660, 680, 700, 750 or 790, Fluorescein Isothiocyanate (FITC), Rhodamine, Allophycocyanine (APC) and Phycoerythrin (PE).

In one embodiment, said enzyme using a chemiluminescent substrate may be horseradish peroxidase (HRP) and said chemiluminescent substrate may be luminol, or said enzyme using a chemiluminescent substrate may be luciferase and said chemiluminescent substrate may be luciferin.

In one embodiment, said enzyme using a chromogenic substrate may be alkaline phosphatase and said chromogenic substrate may be Tetrazolium Nitroblue (NBT) and Bromochlorylindolophosphate (BCIP), or said enzyme using a chromogenic substrate may be horseradish peroxidase (HRP) and said chromogenic substrate may be selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

In one embodiment, said enzyme using an electrochemically oxidizable substrate may be horseradish peroxidase (HRP) and said electrochemically oxidizable substrate may be 3,3',5,5'-Tetramethylbenzidine (TMB).

In a particular embodiment, the invention also relates to a method for detecting toxinogenic cyanobacteria as described above in which said capture probe is linked to at least one attachment molecule positioned 5' to its sequence and said signal probe is linked to at least one marking molecule positioned 5' to its sequence, or
said capture probe is linked to at least one attachment molecule positioned 5' of its sequence and said signal probe is linked to at least one marking molecule positioned 3' of its sequence, or said capture probe is linked to at least one attachment molecule positioned 3' of its sequence and said signal probe is linked to at least one marking molecule positioned 5' of its sequence, or said capture probe is linked to at least one attachment molecule positioned 3' of its sequence and said signal probe is linked to at least one marking molecule positioned 3' of its sequence, said "at least one attachment molecule" being in particular selected from a biotin molecule, avidin molecule, streptavidin molecule, a thiol group, an amine group and a carbon, preferably a biotin molecule, the said "at least one marking molecule" being chosen in particular from a fluorochrome, a biotin, a biotin-bound molecule, digoxigenin, an enzyme using a chemiluminescent substrate, an enzyme using a chromogenic substrate or an enzyme using an electrochemically oxidised substrate, preferably digoxigenin, preferably, said enzyme using a chromogenic substrate is alkaline phosphatase and said chromogenic substrate is Tetrazolium Nitroblue (NBT) or Bromochlorylindolophosphate (BCIP), or said enzyme using a chromogenic substrate is horseradish peroxidase (HRP) and said chromogenic substrate is selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

For the quantification step, the results can be expressed in absorbance at 630 or 450 nm after reading with a microplate reader, or in current intensity after reading with an ammeter or potentiometer. For each test, a calibration curve is produced using synthetic standards of known increasing concentrations. Quantification is determined by plotting the mean absorbance or current values from each sample on the calibration curve. The standards are related to RNA or cell equivalent values established from known numbers of cultured cells added to an uncontaminated environmental sample.

According to this embodiment, the sample may be a sample of fresh water, brackish water, culture media or cyanobacteria cultures produced for commercially purposes.

The invention also concerns a method for detecting toxinogenic cyanobacteria, as described above in embodiment A, in a sample likely to contain in addition at least one toxinogenic cyanobacteria of the genus *Aphanizomenon*, comprising in addition to the optional hybridization step resulting from bringing said sample into contact with a capture probe and a signal probe specific to toxinogenic cyanobacteria of the genus *Microcystis*, An optional hybridization step resulting from bringing said sample into contact with a probe and a signal probe specific to toxinogenic cyanobacteria of the genus *Aphanizomenon*, the capture probe and the signal probe forming a pair of probes, the sequences of said pair of probes being selected from x elements of one of the following sets:
(SEQ ID NO: 20, SEQ ID NO: 21 and SEQ ID NO: 22)
(SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24, hybridization indicating the presence of toxinogenic cyanobacteria of the genus *Aphanizomenon*.

All the different embodiments described for the detection method in embodiment A can be used for embodiment B.

As previously for the detection of *Microcystis* according to embodiment A, in a particular embodiment, the minimum detection threshold of the toxinogenic cyanobacteria of the genus *Aphanizomenon* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Embodiment L

In the same way, the invention also concerns one of the methods for detecting toxinogenic cyanobacteria, as described according to embodiment A or according to embodiment B, in a sample likely to contain in addition at least one toxinogenic cyanobacteria of the genus *Dolichospermum*, comprising in addition to the optional hybridization step resulting from bringing of said sample into contact with a capture probe and a signal probe specific to toxinogenic cyanobacteria of the genus *Microcystis*, An optional hybridization step resulting from bringing said sample into contact with a probe and a signal probe specific to toxinogenic cyanobacteria of the genus *Dolichospermum*, the capture probe and the signal probe forming a pair of probes, the sequences of said pair of probes being selected from x elements of one of the following sets:
(SEQ ID NO 25 and SEQ ID NO 26)
x being 2,
or the sequences of said probes having at least 92% identity with the aforementioned sequences SEQ ID NO: 25, SEQ ID NO: 26,
hybridization indicating the presence of toxinogenic cyanobacteria of the genus *Dolichospermum*.

All the different embodiments described for the detection method in embodiment A can be used for embodiment C.

As previously for the detection of *Microcystis* according to embodiment A, in a particular embodiment, the minimum detection threshold of the toxinogenic cyanobacteria of the genus *Dolichospermum* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Type of Construction M

In the same way, the invention also concerns one of the methods for detecting toxinogenic cyanobacteria, as described according to embodiments A, B or C, in a sample likely to contain in addition at least one toxinogenic cyanobacteria of the genus *Anabaena*, comprising in addition to the optional hybridization step resulting from bringing said sample into contact with a capture probe and a signal probe specific to toxinogenic cyanobacteria of the genus *Microcystis*, an optional hybridization step resulting from bringing said sample into contact with a probe and a signal probe specific to toxinogenic cyanobacteria of the genus *Anabaena*, the capture probe and the signal probe forming a pair of probes, the sequences of said pair of probes being selected from x elements of one of the following sets:
(SEQ ID NO: 27, SEQ ID NO: 28 and SEQ ID NO: 29)
(SEQ ID NO: 30, SEQ ID NO: 31 and SEQ ID NO: 32)
(SEQ ID NO: 33, SEQ ID NO: 34 and SEQ ID NO: 35)
(SEQ ID NO: 36, SEQ ID NO: 37, SEQ ID NO: 38 and SEQ ID NO: 39)
(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)

(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)
(SEQ ID NO: 57, SEQ ID NO: 58 and SEQ ID NO: 59)
(SEQ ID NO: 60, SEQ ID NO: 61 and SEQ ID NO: 62)
x being 2, 3 or 4,
or the sequences of said probes having at least 92% identity with the abovementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62, hybridization indicating the presence of toxinogenic cyanobacteria of the genus *Anabaena*.

All the different embodiments described for the detection method in embodiment A can be used for embodiment D.

As previously for the detection of *Microcystis* according to embodiment A, in a particular embodiment, the minimum detection threshold of the toxinogenic cyanobacteria of the genus *Anabaena* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Type of Construction N

In the same way, the invention also concerns one of the methods for detecting toxinogenic cyanobacteria, as described above according to embodiments A, B, C or D, in a sample likely to contain in addition at least one toxinogenic cyanobacteria of the genus *Planktothrix*, comprising in addition to the optional hybridization step resulting from bringing said sample into contact with a capture probe and a signal probe specific to toxinogenic cyanobacteria of the genus *Microcystis*, An optional hybridization step resulting from the contact of said sample with a probe and a signal probe specific to toxinogenic cyanobacteria of the genus *Planktothrix*, the capture probe and the signal probe forming a pair of probes, the sequences of said pair of probes being selected from x elements of one of the following sets:

(SEQ ID NO: 63, SEQ ID NO: 64, SEQ ID NO: 65 and SEQ ID NO: 66)
(SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
hybridization indicating the presence of toxinogenic cyanobacteria of the genus *Planktothrix*.

All the different embodiments described for the detection method in embodiment A can be used for embodiment E.

As previously for the detection of *Microcystis* according to embodiment A, in a particular embodiment, the minimum detection threshold of the toxinogenic cyanobacteria of the genus *Planktothrix* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Method of Construction O

In the same way, the invention also concerns one of the methods for detecting toxinogenic cyanobacteria, as described according to embodiments A, B, C, D or E, in a sample likely to contain in addition at least one toxinogenic cyanobacteria of the genus *Nodularia*, comprising in addition to the optional hybridization step resulting from bringing said sample into contact with a capture probe and a signal probe specific to toxinogenic cyanobacteria of the genus *Microcystis*, an optional hybridization step resulting from bringing said sample into contact with a probe and a signal probe specific to toxinogenic cyanobacteria of the genus *Nodularia*, the capture probe and the signal probe forming a pair of probes, the sequences of said pair of probes being selected from x elements of one of the following sets:

(SEQ ID NO: 70, SEQ ID NO: 71 and SEQ ID NO: 72)
(SEQ ID NO: 73, SEQ ID NO: 74 and SEQ ID NO: 75)
(SEQ ID NO: 76 and SEQ ID NO: 77)
x being 2 or 3,
or the sequences of said probes having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77,
hybridization indicating the presence of toxinogenic cyanobacteria of the genus *Nodularia*.

All the different embodiments described for the detection method in embodiment A can be used for embodiment F.

As previously for the detection of *Microcystis* according to embodiment A, in a particular embodiment, the minimum detection threshold of the toxinogenic cyanobacteria of the genus *Nodularia* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Method of Implementation P

In the same way, the invention also concerns one of the methods for detecting toxinogenic cyanobacteria, as described above according to embodiments A, B, C, D, E or F, in a sample likely to contain in addition at least one toxinogenic cyanobacteria of the genus *Cylindrospermopsis*, comprising in addition to the optional hybridization step resulting from bringing said sample into contact with a capture probe and a signal probe specific to toxinogenic cyanobacteria of the genus *Microcystis*, an optional hybridization step resulting from bringing said sample into contact with a probe and a signal probe specific to toxinogenic cyanobacteria of the genus *Cylindrospermopsis*, the capture probe and the signal probe forming a pair of probes, the sequences of said pair of probes being selected from x elements of one of the following sets:

(SEQ ID NO: 78, SEQ ID NO: 79 and SEQ ID NO: 80)
x being 3,
or the sequences of said probes having at least 92% identity with the aforementioned sequences SEQ ID NO: 78, SEQ ID NO: 79, SEQ ID NO: 80, hybridization indicating the presence of toxinogenic cyanobacteria of the genus *Cylindrospermopsis*.

All the embodiments described for the detection method in embodiment A can be used for embodiment G.

As previously for the detection of *Microcystis* according to embodiment A, in a particular embodiment, the minimum detection threshold of the toxinogenic cyanobacteria of the genus *Cylindrospermopsis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

As with the first aspect relating to the use, all combinations of embodiments A, B, C, D, E, F or G of this fourth aspect can be considered. In this way, all the combinations of toxinogenic cyanobacteria B to G32 described in the first aspect can be detected by the methods as described in this fourth aspect.

In another embodiment, the invention also concerns a method for detecting toxinogenic cyanobacteria in a sample likely to contain at least one toxinogenic cyanobacteria of the genus *Aphanizomenon* comprising the following steps:
  a) optional hybridization resulting from the contact of said sample with a capture probe and a signal probe specific to toxinogenic cyanobacteria of the genus *Aphanizomenon*, the capture probe and the signal probe forming a pair of probes, the sequences of said pair of probes being selected from x elements of one of the following sets:
  (SEQ ID NO: 20, SEQ ID NO: 21 and SEQ ID NO: 22)
  (SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24,
said capture probe and said signal probe being capable of hybridizing with the ribosomal nucleic acid of a toxinogenic cyanobacteria of the genus *Aphanizomenon* optionally present in said sample to form a complex,
  b) detection of said optional complex, hybridization indicating the presence of toxinogenic cyanobacteria of the genus *Aphanizomenon*.

All of the different embodiments described for the detection method in embodiment A can be applied to this embodiment.

As before, and in a particular embodiment, the minimum detection threshold of the toxinogenic cyanobacteria of the genus *Aphanizomenon* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, in this particular embodiment, the invention also concerns a method for detecting toxinogenic cyanobacteria in a sample likely to contain at least one toxinogenic cyanobacteria of the genus *Aphanizomenon*, as described above, in which the minimum detection threshold of the toxinogenic cyanobacteria of the genus *Aphanizomenon* is between 0.02 ng/mL and 0.7 ng/mL of ribosomal RNA and the duration of the implementation of the said detection method is less than one hour.

In another embodiment, the invention also concerns a method for detecting toxinogenic cyanobacteria in a sample likely to contain at least one toxinogenic cyanobacteria of the genus *Dolichospermum* comprising the following steps:
  a) optional hybridization resulting from the contact of the said sample with a capture probe and a signal probe specific to toxinogenic cyanobacteria of the genus *Dolichospermum*, the capture probe and the signal probe forming a pair of probes, the sequences of the said pair of probes being chosen from x elements of one of the following sets:
  (SEQ ID NO: 25 and SEQ ID NO: 26)
x being 2,
or the sequences of said probes having at least 92% identity with the aforementioned sequences SEQ ID NO: 25, SEQ ID NO: 26,
said capture probe and said signal probe being capable of hybridizing with the ribosomal nucleic acid of a toxinogenic cyanobacteria of the genus *Dolichospermum* optionally present in said sample to form a complex,
  b) detection of said optional complex,
hybridization indicating the presence of toxinogenic cyanobacteria of the genus *Dolichospermum*.

All of the different embodiments described for the detection method in embodiment A can be applied to this embodiment.

As before, and in a particular embodiment, the minimum detection threshold of the toxinogenic cyanobacteria of the genus *Dolichospermum* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, in this particular embodiment, the invention also concerns a method for detecting toxinogenic cyanobacteria in a sample likely to contain at least one toxinogenic cyanobacteria of the genus *Dolichospermum*, as described above, in which the minimum detection threshold of the toxinogenic cyanobacteria of the genus *Dolichospermum* is between 0.02 ng/mL and 0.7 ng/mL of ribosomal RNA and the duration of the implementation of the said detection method is less than one hour.

In another embodiment, the invention also concerns a method for detecting toxinogenic cyanobacteria in a sample likely to contain at least one toxinogenic cyanobacteria of the genus *Anabaena* comprising the following steps:
  a) optional hybridization resulting from the contact of said sample with a capture probe and a signal probe specific to toxinogenic cyanobacteria of the genus *Anabaena*, the capture probe and the signal probe forming a pair of probes, the sequences of said pair of probe being selected from x elements of one of the following sets:
  (SEQ ID NO: 27, SEQ ID NO: 28 and SEQ ID NO: 29)
  (SEQ ID NO: 30, SEQ ID NO: 31 and SEQ ID NO: 32)
  (SEQ ID NO: 33, SEQ ID NO: 34 and SEQ ID NO: 35)
  (SEQ ID NO: 36, SEQ ID NO: 37, SEQ ID NO: 38 and SEQ ID NO: 39)
  (SEQ ID NO: 40, SEQ ID NO: 41 and SEQ ID NO: 42)
  (SEQ ID NO: 43, SEQ ID NO: 44 and SEQ ID NO: 45)
  (SEQ ID NO: 46, SEQ ID NO: 47 and SEQ ID NO: 48)
  (SEQ ID NO: 49, SEQ ID NO: 50 and SEQ ID NO: 51)
  (SEQ ID NO: 52, SEQ ID NO: 53 and SEQ ID NO: 54)
  (SEQ ID NO: 55 and SEQ ID NO: 56)
  (SEQ ID NO: 57, SEQ ID NO: 58 and SEQ ID NO: 59)
  (SEQ ID NO: 60, SEQ ID NO: 61 and SEQ ID NO: 62)
x being 2, 3 or 4,
or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62, said capture probe and said signal probe being capable of hybridizing with the ribosomal nucleic acid of a toxinogenic cyanobacteria of the genus *Anabaena* optionally present in said sample to form a complex, b) detection of said optional complex, hybridization indicating the presence of toxinogenic cyanobacteria of the genus *Anabaena*.

All of the embodiments described for the detection method in embodiment A can be applied to this embodiment.

As before, and in a particular embodiment, the minimum detection threshold of the toxinogenic cyanobacteria of the genus *Anabaena* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, in this particular embodiment, the invention also concerns a method for detecting toxinogenic cyanobacteria in a sample likely to contain at least one toxinogenic cyanobacteria of the genus *Anabaena*, as described above, in which the minimum detection threshold of the toxinogenic cyanobacteria of the genus *Anabaena* is between 0.02 ng/mL and 0.7 ng/mL of ribosomal RNA and the duration of the implementation of the said detection method is less than one hour.

In another embodiment, the invention also concerns a method for detecting toxinogenic cyanobacteria in a sample likely to contain at least one toxinogenic cyanobacteria of the *Planktothrix* genus comprising the following steps:

a) optional hybridization resulting from the contact of said sample with a capture probe and a signal probe specific to toxinogenic cyanobacteria of the genus *Planktothrix*, the capture probe and the signal probe forming a pair of probes, the sequences of said pair of probes being selected from x elements of one of the following sets:
(SEQ ID NO: 63, SEQ ID NO: 64, SEQ ID NO: 65 and SEQ ID NO: 66)
(SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
said capture probe and said signal probe being capable of hybridizing with the ribosomal nucleic acid of a toxinogenic cyanobacteria of the genus *Planktothrix* optionally present in said sample to form a complex, b) detection of said optional complex, hybridization indicating the presence of toxinogenic cyanobacteria of the genus *Planktothrix*.

All of the different embodiments described for the detection method in embodiment A can be applied to this embodiment.

As before, and in a particular embodiment, the minimum detection threshold of the toxinogenic cyanobacteria of the *Planktothrix* genus is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

Thus, in this particular embodiment, the invention also concerns a method for detecting toxinogenic cyanobacteria in a sample likely to contain at least one toxinogenic cyanobacteria of the genus *Planktothrix*, as described above, in which the minimum detection threshold of the toxinogenic cyanobacteria of the genus *Planktothrix* is between 0.02 ng/mL and 0.7 ng/mL of ribosomal RNA and the duration of the implementation of the said detection method is less than one hour.

The hybridization step described above between the ribosomal nucleic acid of the toxinogenic cyanobacteria to be detected and the capture and signal probes can be performed in several ways.

In a first aspect (realization mode A1 to G1), the capture probes are incubated on the support and the signal probes are incubated with the ribosomal nucleic acids of the toxinogenic cyanobacteria to be detected. Any pairs optionally formed between signal probes and ribosomal nucleic acids of the toxinogenic cyanobacteria to be detected are then incubated with the support containing the capture probes.

In a second aspect (execution mode A2 to G2), the capture probes are incubated on the support. Then, the signal probes, the ribosomal nucleic acids of the toxinogenic cyanobacteria to be detected and the support containing the capture probes are incubated together.

In a third aspect (realization mode A3 to G3), the capture and signal probes are incubated with the ribosomal nucleic acids of the toxinogenic cyanobacteria to be detected. This mixture is then incubated with the support.

In a fourth aspect (realization mode A4 to G4), the capture probes are incubated with the ribosomal nucleic acids of the toxinogenic cyanobacteria to be detected. This mixture is then incubated with the support and the signal probes.

Thus, according to a particular embodiment of this fourth aspect, the invention also concerns a method of detecting toxinogenic cyanobacteria in a sample likely to contain at least one toxinogenic cyanobacteria of the genus *Microcystis*, comprising the following steps:

a) addition of an optional complex formed between the ribosomal nucleic acid of a toxinogenic cyanobacteria of the genus *Microcystis*, and a signal probe on a support containing a capture probe, b) detection of the optional hybridization of the aforementioned complex with the said capture probe, the hybridization taking place between the capture probe and the ribosomal nucleic acid of the aforementioned complex, hybridization indicating the presence of toxinogenic cyanobacteria of the genus *Microcystis*, said capture probe and said signal probe forming a pair of probes, the sequences of said pair of probes being selected from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)
x being 2, 3 or 4
or the sequences of said probes having at least 92% identity with said sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19.

All the different embodiments described for the detection method in embodiment A can be applied to embodiment A1.

As before, and in a particular embodiment, the minimum detection threshold of the toxinogenic cyanobacteria of the genus *Microcystis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also relates to a method for detecting toxinogenic cyanobacteria, as described according to embodiment A1, in a sample likely to contain in addition at least one toxinogenic cyanobacteria of the genus *Aphanizomenon*, comprising, in addition, the addition of an optional complex formed between the ribosomal nucleic acid of a toxinogenic cyanobacteria of the genus *Aphanizomenon* and a signal probe on a support containing a capture probe, said capture probe and said signal probe forming a pair of probes, the sequences of said pair of probes being selected from x elements of one of the following sets:
  (SEQ ID NO: 20, SEQ ID NO: 21 and SEQ ID NO: 22)
  (SEQ ID NO: 23 and SEQ ID NO: 24)
x being 2 or 3, or the sequences of said probes having at least 92% identity with the abovementioned sequences SEQ ID NO: 20, SEQ ID NO: 21, SEQ ID NO: 22, SEQ ID NO: 23, SEQ ID NO: 24, hybridization indicating the presence of a toxinogenic cyanobacteria of the genus *Aphanizomenon*.

All the different embodiments described for the detection method in embodiment A can be applied to embodiment B1.

As before, and in a particular embodiment, the minimum detection threshold of the toxinogenic cyanobacteria of the genus *Aphanizomenon* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described according to embodiment A1 or according to embodiment B1, in a sample likely to contain in addition at least one toxinogenic cyanobacteria of the genus *Dolichospermum*, comprising in addition the addition of an optional complex formed between the ribosomal nucleic acid of a toxinogenic cyanobacteria of the genus *Dolichospermum* and a signal probe on a support containing a capture probe, said capture probe and said signal probe forming a pair of probes, the sequences of said pair of probes being selected from x elements of one of the following sets:
  (SEQ ID NO: 25 and SEQ ID NO: 26)
x being 2,
or the sequences of said probes having at least 92% identity with the aforementioned sequences SEQ ID NO: 25, SEQ ID NO: 26,
hybridization indicating the presence of toxinogenic cynaobacteria of the genus *Dolichospermum*.

All the different embodiments described for the detection method in embodiment A can be applied to embodiment C1.

As before, and in a particular embodiment, the minimum detection threshold of the toxinogenic cyanobacteria of the genus *Dolichospermum* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also relates to one of the methods for detecting toxinogenic cyanobacteria, as described above according to embodiments A1, B1 or C1, in a sample likely to contain in addition at least one toxinogenic cyanobacteria of the genus *Anabaena*, comprising in addition the addition of an optional complex formed between the ribosomal nucleic acid of a toxinogenic cyanobacteria of the genus *Anabaena* and a signal probe on a support containing a capture probe, said capture probe and said signal probe forming a pair of probes, the sequences of said pair of probes being selected from x elements of one of the following sets:
  (SEQ ID NO: 27, SEQ ID NO: 28 and SEQ ID NO: 29)
  (SEQ ID NO: 30, SEQ ID NO: 31 and SEQ ID NO: 32)
  (SEQ ID NO: 33, SEQ ID NO: 34 and SEQ ID NO: 35)
  (SEQ ID NO: 36, SEQ ID NO: 37, SEQ ID NO: 38 and SEQ ID NO: 39)
  (SEQ ID NO: 40, SEQ ID NO: 41 and SEQ ID NO: 42)
  (SEQ ID NO: 43, SEQ ID NO: 44 and SEQ ID NO: 45)
  (SEQ ID NO: 46, SEQ ID NO: 47 and SEQ ID NO: 48)
  (SEQ ID NO: 49, SEQ ID NO: 50 and SEQ ID NO: 51)
  (SEQ ID NO: 52, SEQ ID NO: 53 and SEQ ID NO: 54)
  (SEQ ID NO: 55 and SEQ ID NO: 56)
  (SEQ ID NO: 57, SEQ ID NO: 58 and SEQ ID NO: 59)
  (SEQ ID NO: 60, SEQ ID NO: 61 and SEQ ID NO: 62)
x being 2, 3 or 4,
or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62,
hybridization indicating the presence of toxinogenic cyanobacteria of the genus *Anabaena*.

All the different embodiments described for the detection method in embodiment A can be applied to embodiment D1.

As before, and in a particular embodiment, the minimum detection threshold of the toxinogenic cyanobacteria of the genus *Anabaena* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also relates to one of the methods for detecting toxinogenic cyanobacteria, as described above according to the embodiments A1, B1, C1 or D1, in a sample likely to contain in addition at least one toxinogenic cyanobacteria of the genus *Planktothrix*, comprising in addition the addition of an optional complex formed between the ribosomal nucleic acid of a toxinogenic cyanobacteria of the genus *Planktothrix* and a signal probe on a support containing a capture probe, said capture probe and said signal probe forming a pair of probes, the sequences of said pair of probes being selected from x elements of one of the following sets:
(SEQ ID NO: 63, SEQ ID NO: 64, SEQ ID NO: 65 and SEQ ID NO: 66)
(SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
hybridization indicating the presence of toxinogenic cyanobacteria of the genus *Planktothrix*.

All the different embodiments described for the detection method in embodiment A can be applied to embodiment E1.

As before, and in a particular embodiment, the minimum detection threshold of the toxinogenic cyanobacteria of the genus *Planktothrix* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also relates to one of the methods for detecting toxinogenic cyanobacteria, as described above according to embodiments A1, B1, C1, D1 or E1, in a sample likely to contain in addition at least one toxinogenic cyanobacteria of the genus *Nodularia*, comprising in addition the addition of an optional complex formed between the ribosomal nucleic acid of a toxinogenic cyanobacteria of the genus *Nodularia* and a signal probe on a support containing a capture probe,
the capture probe and the signal probe forming a pair of probes, the sequences of said pair of probes being selected from x elements of one of the following sets:
(SEQ ID NO: 70, SEQ ID NO: 71 and SEQ ID NO: 72)
(SEQ ID NO: 73, SEQ ID NO: 74 and SEQ ID NO: 75)
(SEQ ID NO: 76 and SEQ ID NO: 77)
x being 2 or 3,
or the sequences of said probes having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77,
hybridization indicating the presence of toxinogenic cyanobacteria of the genus *Nodularia*.

All the different embodiments described for the detection method in embodiment A can be applied to embodiment F1.

As before, and in a particular embodiment, the minimum detection threshold of the toxinogenic cyanobacteria of the genus *Nodularia* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also relates to one of the methods for detecting toxinogenic cyanobacteria, as described according to the embodiments A1, B1, C1, D1, E1 or F1, in a sample likely to contain in addition at least one toxinogenic cyanobacteria of the genus *Cylindrospermopsis*, comprising in addition the addition of an optional complex formed between the ribosomal nucleic acid of a toxinogenic cyanobacteria of the genus *Cylindrospermopsis* and a signal probe on a support containing a capture probe,
the capture probe and the signal probe forming a pair of probes, the sequences of said pair of probes being selected from x elements of one of the following sets:
(SEQ ID NO: 78, SEQ ID NO: 79 and SEQ ID NO: 80)
x being 3,
or the sequences of said probes having at least 92% identity with the aforementioned sequences SEQ ID NO: 78, SEQ ID NO: 79, SEQ ID NO: 80,
hybridization indicating the presence of toxinogenic cyanobacteria of the genus *Cylindrospermopsis*.

All the different embodiments described for the detection method in embodiment A can be applied to embodiment G1.

As before, and in a particular embodiment, the minimum detection threshold of the toxinogenic cyanobacteria of the genus *Cylindrospermopsis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

As with the first aspect relating to the use, all combinations of embodiments A1, B1, C1, D1, E1, F1 and/or G1 of this fourth aspect can be considered. In this way, all the combinations of toxinogenic cyanobacteria B to G32 described in the first aspect can be detected by the methods as described in this fourth aspect.

According to another embodiment, the invention also concerns a method for detecting toxinogenic cyanobacteria in a sample likely to contain at least one toxinogenic cyanobacteria of the genus *Aphanizomenon*, comprising the following steps:
a) addition of an optional complex formed between the ribosomal nucleic acid of a toxinogenic cyanobacteria of the genus *Aphanizomenon*, and a signal probe on a support containing a capture probe,
b) detection of the optional hybridization of the aforementioned complex with the said capture probe, the hybridization taking place between the capture probe and the ribosomal nucleic acid of the aforementioned complex,
hybridization indicating the presence of toxinogenic cyanobacteria of the genus *Aphanizomenon*, said capture probe and said signal probe forming a pair of probes, the sequences of said pair of probes being selected from x elements of one of the following sets:
(SEQ ID NO: 20, SEQ ID NO: 21 and SEQ ID NO: 22)
(SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24.

According to another embodiment, the invention also concerns a method for detecting toxinogenic cyanobacteria in a sample likely to contain at least one toxinogenic cyanobacteria of the genus *Dolichospermum*, comprising the following steps:
a) addition of an optional complex formed between the ribosomal nucleic acid of a toxinogenic cyanobacteria of the genus *Dolichospermum*, and a signal probe on a support containing a capture probe,
b) detection of the optional hybridization of the aforementioned complex with the said capture probe, the hybridization taking place between the capture probe and the ribosomal nucleic acid of the aforementioned complex,
hybridization indicating the presence of toxinogenic cyanobacteria of the genus *Dolichospermum*, said capture probe and said signal probe forming a pair of probes, the sequences of said pair of probes being selected from x elements of one of the following sets:
(SEQ ID NO: 25 and SEQ ID NO: 26)
x being 2,
or the sequences of said probes having at least 92% identity with the aforementioned sequences SEQ ID NO: 25, SEQ ID NO: 26.

According to another embodiment, the invention also concerns a method for detecting toxinogenic cyanobacteria in a sample likely to contain at least one toxinogenic cyanobacteria of the genus *Anabaena*, comprising the following steps:
a) addition of an optional complex formed between the ribosomal nucleic acid of a toxinogenic cyanobacteria of the genus *Anabaena*, and a signal probe on a support containing a capture probe,
b) detection of the optional hybridization of the aforementioned complex with the said capture probe, the hybridization taking place between the capture probe and the ribosomal nucleic acid of the aforementioned complex, hybridization indicating the presence of toxinogenic cyanobacteria of the genus *Anabaena*, said capture probe and said signal probe forming a pair of probes, the sequences of said pair of probes being selected from x elements of one of the following sets:
(SEQ ID NO: 27, SEQ ID NO: 28 and SEQ ID NO: 29)
(SEQ ID NO: 30, SEQ ID NO: 31 and SEQ ID NO: 32)
(SEQ ID NO: 33, SEQ ID NO: 34 and SEQ ID NO: 35)
(SEQ ID NO: 36, SEQ ID NO: 37, SEQ ID NO: 38 and SEQ ID NO: 39)
(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)
(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)
(SEQ ID NO: 57, SEQ ID NO: 58 and SEQ ID NO: 59)
(SEQ ID NO: 60, SEQ ID NO: 61 and SEQ ID NO: 62)
x being 2, 3 or 4,
or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62.

According to another embodiment, the invention also concerns a method for detecting toxinogenic cyanobacteria in a sample likely to contain at least one toxinogenic cyanobacteria of the *Planktothrix* genus, comprising the following steps:
a) addition of an optional complex formed between the ribosomal nucleic acid of a toxinogenic cyanobacteria of the genus *Planktothrix*, and a signal probe on a support containing a capture probe,
b) detection of the optional hybridization of the aforementioned complex with the said capture probe, the hybridization taking place between the capture probe and the ribosomal nucleic acid of the aforementioned complex, hybridization indicating the presence of toxinogenic cyanobacteria of the genus *Planktothrix*, said capture probe and said signal probe forming a pair of probes, the sequences of said pair of probes being selected from x elements of one of the following sets:
(SEQ ID NO: 63, SEQ ID NO: 64, SEQ ID NO: 65 and SEQ ID NO: 66)
(SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69.

Thus, according to another embodiment of this fourth aspect, the invention concerns a method of detecting toxinogenic cyanobacteria in a sample likely to contain at least one toxinogenic cyanobacteria of the genus *Microcystis* comprising the following steps:
a) addition of the ribosomal nucleic acid of a toxinogenic cyanobacteria of the genus *Microcystis* and a signal probe to a support containing a capture probe,
b) detection of the optional hybridization of a complex formed between said capture probe, said ribosomal nucleic acid and said signal probe, the hybridization taking place between the capture probe, the ribosomal nucleic acid and the signal probe, hybridization indicating the presence of toxinogenic cyanobacteria of the genus *Microcystis*, said capture probe and said signal probe forming a pair of probes, the sequences of said pair of probes being selected from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)
x being 2, 3 or 4,
or the sequences of said probes having at least 92% identity with the abovementioned sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19.

All the different embodiments described for the detection method in embodiment A can be applied to embodiment A2.

As before, and in a particular embodiment, the minimum detection threshold of the toxinogenic cyanobacteria of the genus *Microcystis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also relates to a method for detecting toxinogenic cyanobacteria, as described according to embodiment A2, in a sample likely to contain in addition at least one toxinogenic cyanobacteria of the genus *Aphanizomenon*, comprising, in addition, the addition of the ribosomal nucleic acid of a toxinogenic cyanobacteria of the genus *Aphanizomenon* and a signal probe to a support containing a capture probe, said capture probe and said signal probe forming a pair of probes, the sequences of said pair of probes being selected from x elements of one of the following sets:

(SEQ ID NO: 20, SEQ ID NO: 21 and SEQ ID NO: 22)
(SEQ ID NO: 23 and SEQ ID NO: 24)

x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24, hybridization indicating the presence of toxinogenic cyanobacteria of the genus *Aphanizomenon*.

All of the different embodiments described for the detection method in embodiment A can be applied to embodiment B2.

As before, and in a particular embodiment, the minimum detection limit of the toxinogenic cyanobacteria of the genus *Aphanizomenon* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described according to embodiment A2 or according to embodiment B2, in a sample likely to contain in addition at least one toxinogenic cyanobacteria of the genus *Dolichospermum*, comprising in addition the addition of the ribosomal nucleic acid of a toxinogenic cyanobacteria of the genus *Dolichospermum* and a signal probe to a support containing a capture probe, said capture probe and said signal probe forming a pair of probes, the sequences of said pair of probes being selected from x elements of one of the following sets:

SEQ ID NO: 25 and SEQ ID NO: 26)

x being 2,
or the sequences of said probes having at least 92% identity with the aforementioned sequences SEQ ID NO: 25, SEQ ID NO: 26,
hybridization indicating the presence of toxinogenic cyanobacteria of the genus *Dolichospermum*.

All the different embodiments described for the detection procedure in embodiment A can be applied to embodiment C2.

As before, and in a particular embodiment, the minimum detection threshold of the toxinogenic cyanobacteria of the genus *Dolichospermum* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also relates to one of the methods for detecting toxinogenic cyanobacteria, as described according to embodiments A2, B2 or C2, in a sample likely to contain in addition at least one toxinogenic cyanobacteria of the genus *Anabaena*, comprising in addition the addition of the ribosomal nucleic acid of a toxinogenic cyanobacteria of the genus *Anabaena* and a signal probe to a support containing a capture probe,
said capture probe and said signal probe forming a pair of probes, the sequences of said pair of probes being selected from x elements of one of the following sets:

(SEQ ID NO: 27, SEQ ID NO: 28 and SEQ ID NO: 29)
(SEQ ID NO: 30, SEQ ID NO: 31 and SEQ ID NO: 32)
(SEQ ID NO: 33, SEQ ID NO: 34 and SEQ ID NO: 35)
(SEQ ID NO: 36, SEQ ID NO: 37, SEQ ID NO: 38 and SEQ ID NO: 39)
(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)
(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)
(SEQ ID NO: 57, SEQ ID NO: 58 and SEQ ID NO: 59)
(SEQ ID NO: 60, SEQ ID NO: 61 and SEQ ID NO: 62)

x being 2, 3 or 4,
or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37; SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62,
hybridization indicating the presence of toxinogenic cyanobacteria of the genus *Anabaena*.

All the different embodiments described for the detection method in embodiment A can be applied to embodiment D2.

As before, and in a particular embodiment, the minimum detection threshold of the toxinogenic cyanobacteria of the genus *Anabaena* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to embodiments A2, B2, C2 or D2, in a sample likely to contain in addition at least one toxinogenic cyanobacteria of the genus *Planktothrix*, comprising in addition the addition of the ribosomal nucleic acid of a toxinogenic cyanobacteria of the genus *Planktothrix* and a signal probe to a support containing a capture probe,
said capture probe and said signal probe forming a pair of probes, the sequences of said pair of probes being selected from x elements of one of the following sets:

(SEQ ID NO: 63, SEQ ID NO: 64, SEQ ID NO: 65 and SEQ ID NO: 66)
(SEQ ID NO: 67, SEQ ID NO: 68 and SEQ ID NO: 69)

x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
hybridization indicating the presence of toxinogenic cyanobacteria of the genus *Planktothrix*.

All the different embodiments described for the detection method in embodiment A can be applied to embodiment E2.

As before, and in a particular embodiment, the minimum detection threshold of the toxinogenic cyanobacteria of the *Planktothrix* genus is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to embodiments A2, B2, C2, D2 or E2, in a sample likely to contain in addition at least one toxinogenic cyanobacteria of the genus *Nodularia*, comprising in addition the addition of the ribosomal nucleic acid of a toxinogenic cyanobacteria of the genus *Nodularia* and a signal probe to a support containing a capture probe, the capture probe and the signal probe forming a pair of probes, the sequences of said pair of probes being selected from x elements of one of the following sets:
  (SEQ ID NO: 70, SEQ ID NO: 71 and SEQ ID NO: 72)
  (SEQ ID NO: 73, SEQ ID NO: 74 and SEQ ID NO: 75)
  (SEQ ID NO: 76 and SEQ ID NO: 77)
x being 2 or 3,
or the sequences of said probes having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77,
hybridization indicating the presence of toxinogenic cyanobacteria of the genus *Nodularia*.

All the different embodiments described for the detection method in embodiment A can be applied to embodiment F2.

As before, and in a particular embodiment, the minimum detection threshold of the toxinogenic cyanobacteria of the genus *Nodularia* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to embodiments A1, B2, C2, D2, E2 or F2, in a sample likely to contain in addition at least one toxinogenic cyanobacteria of the genus *Cylindrospermopsis*, comprising in addition the addition of the ribosomal nucleic acid of a toxinogenic cyanobacteria of the genus *Cylindrospermopsis* and a signal probe to a support containing a capture probe, the capture probe and the signal probe forming a pair of probes, the sequences of said pair of probes being selected from x elements of one of the following sets:
  (SEQ ID NO: 78, SEQ ID NO: 79 and SEQ ID NO: 80)
x being 3,
or the sequences of said probes having at least 92% identity with the aforementioned sequences SEQ ID NO: 78, SEQ ID NO: 79, SEQ ID NO: 80,
hybridization indicating the presence of toxinogenic cyanobacteria of the genus *Cylindrospermopsis*.

All the different embodiments described for the detection method in embodiment A can be applied to embodiment G2.

As before, and in a particular embodiment, the minimum detection threshold of the toxinogenic cyanobacteria of the genus *Cylindrospermopsis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

As with the first aspect relating to the use, all combinations of embodiments A2, B2, C2, D2, E2, F2 and/or G2 of this fourth aspect can be considered. In this way, all the combinations of toxinogenic cyanobacteria B to G32 described in the first aspect can be detected by the methods as described in this fourth aspect.

According to another embodiment, the invention also concerns a method for detecting toxinogenic cyanobacteria in a sample likely to contain at least one toxinogenic cyanobacteria of the genus *Aphanizomenon* comprising the following steps:
  a) addition of the ribosomal nucleic acid of a toxinogenic cyanobacteria of the genus *Aphanizomenon* and a signal probe to a support containing a capture probe,
  b) detection of the optional hybridization of a complex formed between said capture probe, said ribosomal nucleic acid and said signal probe, the hybridization taking place between the capture probe, the ribosomal nucleic acid and the signal probe,
hybridization indicating the presence of toxinogenic cyanobacteria of the genus *Aphanizomenon*,
said capture probe and said signal probe forming a pair of probes, the sequences of said pair of probes being selected from x elements of one of the following sets:
  (SEQ ID NO: 20, SEQ ID NO: 21 and SEQ ID NO: 22)
  (SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24.

According to another embodiment, the invention also concerns a method for detecting toxinogenic cyanobacteria in a sample likely to contain at least one toxinogenic cyanobacteria of the genus *Dolichospermum* comprising the following steps:
  a) addition of the ribosomal nucleic acid of a toxinogenic cyanobacteria of the genus *Dolichospermum* and a signal probe to a support containing a capture probe,
  b) detection of the optional hybridization of a complex formed between said capture probe, said ribosomal nucleic acid and said signal probe, the hybridization taking place between the capture probe, the ribosomal nucleic acid and the signal probe,
hybridization indicating the presence of toxinogenic cyanobacteria of the genus *Dolichospermum*,
said capture probe and said signal probe forming a pair of probes, the sequences of said pair of probes being selected from x elements of one of the following sets:
  (SEQ ID NO: 25 and SEQ ID NO: 26)
x being 2,
or the sequences of said probes having at least 92% identity with the aforementioned sequences SEQ ID NO: 25, SEQ ID NO: 26.

According to another embodiment, the invention also concerns a method for detecting toxinogenic cyanobacteria in a sample likely to contain at least one toxinogenic cyanobacteria of the genus *Anabaena* comprising the following steps:
  a) addition of the ribosomal nucleic acid of a toxinogenic cyanobacteria of the genus *Anabaena* and a signal probe to a support containing a capture probe,
  b) detection of the optional hybridization of a complex formed between said capture probe, said ribosomal nucleic acid and said signal probe, the hybridization taking place between the capture probe, the ribosomal nucleic acid and the signal probe,
hybridization indicating the presence of toxinogenic cyanobacteria of the genus *Anabaena*, said capture probe and said signal probe forming a pair of probes, the sequences of said pair of probes being selected from x elements of one of the following sets:
  (SEQ ID NO: 27, SEQ ID NO: 28 and SEQ ID NO: 29)
  (SEQ ID NO: 30, SEQ ID NO: 31 and SEQ ID NO: 32)
  (SEQ ID NO: 33, SEQ ID NO: 34 and SEQ ID NO: 35)
  (SEQ ID NO: 36, SEQ ID NO: 37, SEQ ID NO: 38 and SEQ ID NO: 39)

(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)
(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)
(SEQ ID NO: 57, SEQ ID NO: 58 and SEQ ID NO: 59)
(SEQ ID NO: 60, SEQ ID NO: 61 and SEQ ID NO: 62)

x being 2, 3 or 4,
or the sequences of said probes having at least 92% identity with the aforementioned sequences SEQ ID NO: 27, SEQ ID NO: 28, SEQ ID NO:29, SEQ ID NO:30, SEQ ID NO:31, SEQ ID NO:32, SEQ ID NO:33, SEQ ID NO:34, SEQ ID NO:35, SEQ ID NO:36, SEQ ID NO:37, SEQ ID NO:38, SEQ ID NO:39, SEQ ID NO:40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62.

According to another embodiment, the invention also concerns a method for detecting toxinogenic cyanobacteria in a sample likely to contain at least one toxinogenic cyanobacteria of the genus *Planktothrix* comprising the following steps:
 a) addition of the ribosomal nucleic acid of a toxinogenic cyanobacteria of the genus *Planktothrix* and a signal probe to a support containing a capture probe,
 b) detection of the optional hybridization of a complex formed between said capture probe, said ribosomal nucleic acid and said signal probe, the hybridization taking place between the capture probe, the ribosomal nucleic acid and the signal probe,
hybridization indicating the presence of toxinogenic cyanobacteria of the genus *Planktothrix*, said capture probe and said signal probe forming a pair of probes, the sequences of said pair of probes being selected from x elements of one of the following sets:
 (SEQ ID NO: 63, SEQ ID NO: 64, SEQ ID NO: 65 and SEQ ID NO: 66)
 (SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69.

Thus, according to another particular embodiment this fourth aspect, the invention concerns a method for detecting toxinogenic cyanobacteria in a sample likely to contain at least one toxinogenic cyanobacteria of the genus *Microcystis* comprising the following steps:
 a) addition of a complex formed between:
  the ribosomal nucleic acid of a toxinogenic cyanobacteria of the genus *Microcystis*
  a signal probe
  and a capture probe
  on a support,
 b) detection of the optional hybridization of the abovementioned complex, the hybridization taking place between the capture probe, the ribosomal nucleic acid and the signal probe,
hybridization indicating the presence of toxinogenic cyanobacteria of the genus *Microcystis*, said capture probe and said signal probe forming a pair of probes, the sequences of said pair of probes being selected from x elements of one of the following sets:
 (SEQ ID NO: 1, SEQ ID NO: 2, SEQ ID NO: 3 and SEQ ID NO: 4)
 (SEQ ID NO: 5, SEQ ID NO: 6 and SEQ ID NO: 7)
 (SEQ ID NO: 8, SEQ ID NO: 9, SEQ ID NO: 10 and SEQ ID NO: 11)
 (SEQ ID NO: 12, SEQ ID NO: 13 and SEQ ID NO: 14)
 (SEQ ID NO: 15, SEQ ID NO: 16 and SEQ ID NO: 17)
 (SEQ ID NO: 18 and SEQ ID NO: 19)

x being 2, 3 or 4,
or the sequences of said probes having at least 92% identity with the abovementioned sequences SEQ ID NO: 1, SEQ ID NO: 2, SEQ ID NO: 3, SEQ ID NO: 4, SEQ ID NO: 5, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19.

All the different embodiments described for the detection method in embodiment A can be applied to embodiment A3.

As before, and in a particular embodiment, the minimum detection threshold of the toxinogenic cyanobacteria of the genus *Microcystis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns a method for detecting toxinogenic cyanobacteria, as described above according to embodiment A3, in a sample likely to contain in addition at least one toxinogenic cyanobacteria of the genus *Aphanizomenon*, comprising, in addition, the addition of a complex formed between:
 the ribosomal nucleic acid of a toxinogenic cyanobacteria of the genus *Aphanizomenon*
 a signal probe
 and a capture probe
on a support,
said capture probe and said signal probe forming a pair of probes, the sequences of said pair of probes being selected from x elements of one of the following sets:
 (SEQ ID NO: 20, SEQ ID NO: 21 and SEQ ID NO: 22)
 (SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24, hybridization indicating the presence of toxinogenic cyanobacteria of the genus *Aphanizomenon*.

All the different embodiments described for the detection method in embodiment A can be applied to embodiment B3.

As before, and in a particular embodiment, the minimum detection threshold of the toxinogenic cyanobacteria of the genus *Aphanizomenon* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also relates to one of the methods for detecting toxinogenic cyanobacteria, as described above according to embodiment A3 or B3, in a sample likely to contain in addition at least one toxinogenic cyanobacteria of the genus *Dolichospermum*, comprising in addition the addition of a complex formed between:

the ribosomal nucleic acid of a toxinogenic cyanobacteria
    of the genus *Dolichospermum*
a signal probe
and a capture probe
on a support,
said capture probe and said signal probe forming a pair of probes, the sequences of said pair of probes being selected from x elements of one of the following sets:
    (SEQ ID NO: 25 and SEQ ID NO: 26)
x being 2,
or the sequences of said probes having at least 92% identity with the aforementioned sequences SEQ ID NO: 25, SEQ ID NO: 26,
hybridization indicating the presence of toxinogenic cyanobacteria of the genus *Dolichospermum*.

All the different embodiments described for the detection method in embodiment A can be applied to embodiment C3.

As before, and in a particular embodiment, the minimum detection threshold of the toxinogenic cyanobacteria of the genus *Dolichospermum* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to embodiments A3, B3 or C3, in a sample likely to contain in addition at least one toxinogenic cyanobacteria of the genus *Anabaena*, comprising in addition the addition of a complex formed between:
    the ribosomal nucleic acid of a toxinogenic cyanobacteria
        of the genus *Anabaena*
    a signal probe
    and a capture probe
on a support,
said capture probe and said signal probe forming a pair of probes, the sequences of said pair of probes being selected from x elements of one of the following sets:
    (SEQ ID NO: 27, SEQ ID NO: 28 and SEQ ID NO: 29)
    (SEQ ID NO: 30, SEQ ID NO: 31 and SEQ ID NO: 32)
    (SEQ ID NO: 33, SEQ ID NO: 34 and SEQ ID NO: 35)
    (SEQ ID NO: 36, SEQ ID NO: 37, SEQ ID NO: 38 and SEQ ID NO: 39)
    (SEQ ID NO: 40, SEQ ID NO: 41 and SEQ ID NO: 42)
    (SEQ ID NO: 43, SEQ ID NO: 44 and SEQ ID NO: 45)
    (SEQ ID NO: 46, SEQ ID NO: 47 and SEQ ID NO: 48)
    (SEQ ID NO: 49, SEQ ID NO: 50 and SEQ ID NO: 51)
    (SEQ ID NO: 52, SEQ ID NO: 53 and SEQ ID NO: 54)
    (SEQ ID NO: 55 and SEQ ID NO: 56)
    (SEQ ID NO: 57, SEQ ID NO: 58 and SEQ ID NO: 59)
    (SEQ ID NO: 60, SEQ ID NO: 61 and SEQ ID NO: 62)
x being 2, 3 or 4,
or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62,
hybridization indicating the presence of toxinogenic cyanobacteria of the genus *Anabaena*.

All the different embodiments described for the detection method in embodiment A can be applied to embodiment D3.

As before, and in a particular embodiment, the minimum detection threshold of the toxinogenic cyanobacteria of the genus *Anabaena* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to embodiments A3, B3, C3 or D3, in a sample likely to contain in addition at least one toxinogenic cyanobacteria of the genus *Planktothrix*, comprising in addition the addition of a complex formed between:
    the ribosomal nucleic acid of a toxinogenic cyanobacteria
        of the genus *Planktothrix*
    a signal probe
    and a capture probe
on a support,
said capture probe and said signal probe forming a pair of probes, the sequences of said pair of probes being selected from x elements of one of the following sets:
    (SEQ ID NO: 63, SEQ ID NO: 64, SEQ ID NO: 65 and SEQ ID NO: 66)
    (SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
hybridization indicating the presence of toxinogenic cyanobacteria of the genus *Planktothrix*.

All the different embodiments described for the detection method in embodiment A can be applied to embodiment E3.

As before, and in a particular embodiment, the minimum detection threshold of the toxinogenic cyanobacteria of the *Planktothrix* genus is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to embodiments A3, B3, C3, D3 or E3, in a sample likely to contain in addition at least one toxinogenic cyanobacteria of the genus *Nodularia*, comprising in addition the addition of a complex formed between:
    the ribosomal nucleic acid of a toxinogenic cyanobacteria
        of the genus *Nodularia*
    a signal probe
    and a capture probe
on a support,
the capture probe and the signal probe forming a pair of probes, the sequences of said pair of probes being selected from x elements of one of the following sets:
    (SEQ ID NO: 70, SEQ ID NO: 71 and SEQ ID NO: 72)
    (SEQ ID NO: 73, SEQ ID NO: 74 and SEQ ID NO: 75)
    (SEQ ID NO: 76 and SEQ ID NO: 77)
x being 2 or 3,
or the sequences of said probes having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77, hybridization indicating the presence of toxinogenic cyanobacteria of the genus *Nodularia.*

All the different embodiments described for the detection procedure in embodiment A can be applied to embodiment F3.

As before, and in a particular embodiment, the minimum detection threshold of the toxinogenic cyanobacteria of the genus *Nodularia* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to embodiments A3, B3, C3, D3, E3 or F3, in a sample likely to contain in addition at least one toxinogenic cyanobacteria of the genus *Cylindrospermopsis*, comprising in addition the addition of a complex formed between:
  the ribosomal nucleic acid of a toxinogenic cyanobacteria of the genus *Cylindrospermopsis*
  a signal probe
  and a capture probe
on a support,
the capture probe and the signal probe forming a pair of probes, the sequences of said pair of probes being selected from x elements of one of the following sets:
  (SEQ ID NO: 78, SEQ ID NO: 79 and SEQ ID NO: 80)
x being 3,
or the sequences of said probes having at least 92% identity with the aforementioned sequences SEQ ID NO: 78, SEQ ID NO: 79, SEQ ID NO: 80,
hybridization indicating the presence of toxinogenic cyanobacteria of the genus *Cylindrospermopsis.*

All the different embodiments described for the detection method in embodiment A can be applied to embodiment G3.

As before, and in a particular embodiment, the minimum detection threshold of the toxinogenic cyanobacteria of the genus *Cylindrospermopsis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

As with the first aspect relating to the use, all combinations of embodiments A3, B3, C3, D3, E3, F3 and/or G3 of this fourth aspect can be considered. In this way, all combinations of toxinogenic cyanobacteria B to G32 described in the first aspect can be detected by the methods as described in this fourth aspect.

According to another embodiment, the invention also concerns a method for detecting toxinogenic cyanobacteria in a sample likely to contain at least one toxinogenic cyanobacteria of the genus *Aphanizomenon* comprising the following steps:
  a) addition of a complex formed between:
    the ribosomal nucleic acid of a toxinogenic cyanobacteria of the genus *Aphanizomenon*
    a signal probe
    and a capture probe
    on a support,
  b) detection of the optional hybridization of the above-mentioned complex, the hybridization taking place between the capture probe, the ribosomal nucleic acid and the signal probe,
hybridization indicating the presence of toxinogenic cyanobacteria of the genus *Aphanizomenon,*
said capture probe and said signal probe forming a pair of probes, the sequences of said pair of probes pair being selected from x elements of one of the following sets:
  (SEQ ID NO: 20, SEQ ID NO: 21 and SEQ ID NO: 22)
  (SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24.

According to another embodiment, the invention also concerns a method for detecting toxinogenic cyanobacteria in a sample likely to contain at least one toxinogenic cyanobacteria of the genus *Dolichospermum* comprising the following steps:
  a) addition of a complex formed between:
    the ribosomal nucleic acid of a toxinogenic cyanobacteria of the genus *Dolichospermum*
    a signal probe
    and a capture probe
    on a support,
  b) detection of the optional hybridization of the above-mentioned complex, the hybridization taking place between the capture probe, the ribosomal nucleic acid and the signal probe,
hybridization indicating the presence of toxinogenic cyanobacteria of the genus *Dolichospermum,*
said capture probe and said signal probe forming a pair of probes probe, the sequences of said pair of probes being selected from x elements of one of the following sets:
  (SEQ ID NO: 25 and SEQ ID NO: 26)
x being 2,
or the sequences of said probes having at least 92% identity with the aforementioned sequences SEQ ID NO: 25, SEQ ID NO: 26.

According to another embodiment, the invention also concerns a method for detecting toxinogenic cyanobacteria in a sample likely to contain at least one toxinogenic cyanobacteria of the genus *Anabaena* comprising the following steps:
  a) addition of a complex formed between:
    the ribosomal nucleic acid of a toxinogenic cyanobacteria of the genus *Anabaena*
    a signal probe
    and a capture probe
    on a support,
  b) detection of the optional hybridization of the above-mentioned complex, the hybridization taking place between the capture probe, the ribosomal nucleic acid and the signal probe,
hybridization indicating the presence of toxinogenic cyanobacteria of the genus *Anabaena*, said capture probe and said signal probe forming a pair of probes, the sequences of said pair of probes being selected from x elements of one of the following sets:
  (SEQ ID NO: 27, SEQ ID NO: 28 and SEQ ID NO: 29)
  (SEQ ID NO: 30, SEQ ID NO: 31 and SEQ ID NO: 32)
  (SEQ ID NO: 33, SEQ ID NO: 34 and SEQ ID NO: 35)
  (SEQ ID NO: 36, SEQ ID NO: 37, SEQ ID NO: 38 and SEQ ID NO: 39)
  (SEQ ID NO: 40, SEQ ID NO: 41 and SEQ ID NO: 42)
  (SEQ ID NO: 43, SEQ ID NO: 44 and SEQ ID NO: 45)
  (SEQ ID NO: 46, SEQ ID NO: 47 and SEQ ID NO: 48)
  (SEQ ID NO: 49, SEQ ID NO: 50 and SEQ ID NO: 51)

(SEQ ID NO: 52, SEQ ID NO: 53 and SEQ ID NO: 54)
(SEQ ID NO: 55 and SEQ ID NO: 56)
(SEQ ID NO: 57, SEQ ID NO: 58 and SEQ ID NO: 59)
(SEQ ID NO: 60, SEQ ID NO: 61 and SEQ ID NO: 62)

x being 2, 3 or 4, or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62.

According to another embodiment, the invention also concerns a method for detecting toxinogenic cyanobacteria in a sample likely to contain at least one toxinogenic cyanobacteria of the genus *Planktothrix* comprising the following steps:

a) addition of a complex formed between:
   the ribosomal nucleic acid of a toxinogenic cyanobacteria of the genus *Planktothrix*
   a signal probe
   and a capture probe
   on a support,
b) detection of the optional hybridization of the abovementioned complex, the hybridization taking place between the capture probe, the ribosomal nucleic acid and the signal probe, hybridization indicating the presence of toxinogenic cyanobacteria of the genus *Planktothrix*, said capture probe and said signal probe forming a pair of probes, the sequences of said pair of probes being selected from x elements of one of the following sets:

(SEQ ID NO: 63, SEQ ID NO: 64, SEQ ID NO: 65 and SEQ ID NO: 66)
(SEQ ID NO: 67, SEQ ID NO: 68 and SEQ ID NO: 69)

x being 3 or 4, or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69.

According to another particular embodiment this fourth aspect, the invention concerns a method of detecting toxinogenic cyanobacteria in a sample likely to contain at least one toxinogenic cyanobacteria of the genus *Microcystis* comprising the following steps:

a) addition of a signal probe and an optional complex formed between the ribosomal nucleic acid of a toxinogenic cyanobacteria of the genus *Microcystis* and a capture probe on a support,
b) detection of the optional hybridization of said complex with said signal probe, the hybridization taking place between the signal probe and the ribosomal nucleic acid of said complex, hybridization indicating the presence of toxinogenic cyanobacteria of the genus *Microcystis*, said capture probe and said signal probe forming a pair of probes, the sequences of said pair of probes being selected from x elements of one of the following sets:

(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)

x being 2, 3 or 4, or the sequences of said probes having at least 92% identity with the abovementioned sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19.

All the different embodiments described for the detection method in embodiment A can be applied to embodiment A4.

As before, and in a particular embodiment, the minimum detection threshold of the toxinogenic cyanobacteria of the genus *Microcystis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns a method for detecting toxinogenic cyanobacteria, as described above according to embodiment A4, in a sample likely to contain in addition at least one toxinogenic cyanobacteria of the genus *Aphanizomenon*, comprising, in addition, the addition of a signal probe and an optional complex formed between the ribosomal nucleic acid of a toxinogenic cyanobacteria of the genus *Aphanizomenon* and a capture probe on a support, said capture probe and said signal probe forming a pair of probes, the sequences of said pair of probes being selected from x elements of one of the following sets:

(SEQ ID NO: 20, SEQ ID NO: 21 and SEQ ID NO: 22)
(SEQ ID NO: 23 and SEQ ID NO: 24)

x being 2 or 3, or the sequences of the said probes having at least 92% identity with the abovementioned sequences SEQ ID NO: 20, SEQ ID NO: 21, SEQ ID NO: 22, SEQ ID NO: 23, SEQ ID NO: 24, hybridization indicating the presence of toxinogenic cyanobacteria of the genus *Aphanizomenon*.

All the different embodiments described for the detection method in embodiment A can be applied to embodiment B4.

As before, and in a particular embodiment, the minimum detection threshold of the toxinogenic cyanobacteria of the genus *Aphanizomenon* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described according to embodiments A4 or B4, in a sample likely to contain in addition at least one toxinogenic cyanobacteria of the genus *Dolichospermum*, comprising in addition the addition of a signal probe and an optional complex formed between the ribosomal nucleic acid of a toxinogenic cyanobacteria of the genus *Dolichospermum* and a capture probe on a support, said capture probe and said signal probe forming a pair of probes, the sequences of said pair of probes being selected from x elements of one of the following sets:

(SEQ ID NO: 25 and SEQ ID NO: 26)

x being 2, or the sequences of said probes having at least 92% identity with the aforementioned sequences SEQ ID NO: 25, SEQ ID NO: 26, hybridization indicating the presence of toxinogenic cyanobacteria of the genus *Dolichospermum*.

All the different embodiments described for the detection method in embodiment A can be applied to embodiment C4.

As before, and in a particular embodiment, the minimum detection threshold of the toxinogenic cyanobacteria of the genus *Dolichospermum* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to embodiments of execution A4, B4 or C4, in a sample likely to contain in addition at least one toxinogenic cyanobacteria of the genus *Anabaena*, comprising in addition the addition of a signal probe and an optional complex formed between the ribosomal nucleic acid of a toxinogenic cyanobacteria of the genus *Anabaena* and a capture probe on a support, said capture probe and said signal probe forming a pair of probes, the sequences of said pair of probes being selected from x elements of one of the following sets:

(SEQ ID NO: 27, SEQ ID NO: 28 and SEQ ID NO: 29)
(SEQ ID NO: 30, SEQ ID NO: 31 and SEQ ID NO: 32)
(SEQ ID NO: 33, SEQ ID NO: 34 and SEQ ID NO: 35)
(SEQ ID NO: 36, SEQ ID NO: 37, SEQ ID NO: 38 and SEQ ID NO: 39)
(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)
(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)
(SEQ ID NO: 57, SEQ ID NO: 58 and SEQ ID NO: 59)
(SEQ ID NO: 60, SEQ ID NO: 61 and SEQ ID NO: 62)

x being 2, 3 or 4, or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62, hybridization indicating the presence of toxinogenic cyanobacteria of the genus *Anabaena*.

All the different embodiments described for the detection method in embodiment A can be applied to embodiment D4.

As before, and in a particular embodiment, the minimum detection threshold of the toxinogenic cyanobacteria of the genus *Anabaena* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described according to the embodiments A4, B4, C4 or D4, in a sample likely to contain in addition at least one toxinogenic cyanobacteria of the genus *Planktothrix*, comprising in addition the addition of a signal probe and an optional complex formed between the ribosomal nucleic acid of a toxinogenic cyanobacteria of the genus *Planktothrix* and a capture probe on a support, said capture probe and said signal probe forming a pair of probes, the sequences of said pair of probes being selected from x elements of one of the following sets:

(SEQ ID NO: 63, SEQ ID NO: 64, SEQ ID NO: 65 and SEQ ID NO: 66)
(SEQ ID NO: 67, SEQ ID NO: 68 and SEQ ID NO: 69)

x being 3 or 4, or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69, hybridization indicating the presence of toxinogenic cyanobacteria of the genus *Planktothrix*.

All the different embodiments described for the detection method in embodiment A can be applied to embodiment D4.

As before, and in a particular embodiment, the minimum detection threshold of the toxinogenic cyanobacteria of the *Planktothrix* genus is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to the embodiments A, B4, C4, D4 or E4, in a sample likely to contain in addition at least one toxinogenic cyanobacteria of the genus *Nodularia*, comprising in addition the addition of a signal probe and an optional complex formed between the ribosomal nucleic acid of a toxinogenic cyanobacteria of the genus *Nodularia* and a capture probe on a support, the capture probe and the signal probe forming a pair of probes, the sequences of said pair of probes being selected from x elements of one of the following sets:

(SEQ ID NO: 70, SEQ ID NO: 71 and SEQ ID NO: 72)
(SEQ ID NO: 73, SEQ ID NO: 74 and SEQ ID NO: 75)
(SEQ ID NO: 76 and SEQ ID NO: 77)

x being 2 or 3, or the sequences of said probes having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77, hybridization indicating the presence of toxinogenic cyanobacteria of the genus *Nodularia*.

All the different embodiments described for the detection method in embodiment A can be applied to embodiment F4.

As before, and in a particular embodiment, the minimum detection threshold of the toxinogenic cyanobacteria of the genus *Nodularia* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

The invention also concerns one of the methods for detecting toxinogenic cyanobacteria, as described above according to one of the embodiments A4, B4, C4, D4, E4 or F4, in a sample likely to contain in addition at least one toxinogenic cyanobacteria of the genus *Cylindrospermopsis*, comprising in addition the addition of a signal probe and an optional complex formed between the ribosomal nucleic acid of a toxinogenic cyanobacteria of the genus *Cylindrospermopsis* and a capture probe on a support,
the capture probe and the signal probe forming a pair of probes, the sequences of said pair of probes being selected from x elements of one of the following sets:
  (SEQ ID NO: 78, SEQ ID NO: 79 and SEQ ID NO: 80)
x being 3,
or the sequences of said probes having at least 92% identity with the aforementioned sequences SEQ ID NO: 78, SEQ ID NO: 79, SEQ ID NO: 80,
hybridization indicating the presence of toxinogenic cyanobacteria of the genus *Cylindrospermopsis*.

All the different embodiments described for the detection method in embodiment A can be applied to embodiment G4.

As before, and in a particular embodiment, the minimum detection threshold of the toxinogenic cyanobacteria of the genus *Cylindrospermopsis* is between 0.02 ng and 0.7 ng of ribosomal RNA per millilitre of sample, which corresponds to a detection limit equivalent to 10 to 575 cells/mL.

In the same way, in a particular embodiment, the duration of the implementation of the said detection method is less than one hour.

As with the first aspect relating to the use, all combinations of embodiments A4, B4, C4, D4, E4, F4 and/or G4 of this fourth aspect can be considered. In this way, all the combinations of toxinogenic cyanobacteria B to G32 described in the first aspect can be detected by the methods as described in this fourth aspect.

According to another embodiment, the invention concerns a method for detecting toxinogenic cyanobacteria in a sample likely to contain at least one toxinogenic cyanobacteria of the genus *Aphanizomenon* comprising the following steps:
  a) addition of a signal probe and an optional complex formed between the ribosomal nucleic acid of a toxinogenic cyanobacteria of the genus *Aphanizomenon* and a capture probe on a support,
  b) detection of the optional hybridization of said complex with said signal probe, the hybridization taking place between the signal probe and the ribosomal nucleic acid of said complex,
hybridization indicating the presence of toxinogenic cyanobacteria of the genus *Aphanizomenon*,
said capture probe and said signal probe forming a pair of probes, the sequences of said pair of probes being selected from x elements of one of the following sets:
  (SEQ ID NO: 20, SEQ ID NO: 21 and SEQ ID NO: 22)
  (SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24.

According to another embodiment, the invention concerns a method for detecting toxinogenic cyanobacteria in a sample likely to contain at least one toxinogenic cyanobacteria of the genus *Dolichospermum* comprising the following steps:
  a) addition of a signal probe and an optional complex formed between the ribosomal nucleic acid of a toxinogenic cyanobacteria of the genus *Dolichospermum* and a capture probe on a support,
  b) detection of the optional hybridization of said complex with said signal probe, the hybridization taking place between the signal probe and the ribosomal nucleic acid of said complex,
hybridization indicating the presence of toxinogenic cyanobacteria of the genus *Dolichospermum*,
said capture probe and said signal probe forming a pair of probes, the sequences of said pair of probes being selected from x elements of one of the following sets:
  (SEQ ID NO: 25 and SEQ ID NO: 26)
x being 2,
or the sequences of said probes having at least 92% identity with the aforementioned sequences SEQ ID NO: 25, SEQ ID NO: 26.

According to another embodiment, the invention concerns a method for detecting toxinogenic cyanobacteria in a sample likely to contain at least one toxinogenic cyanobacteria of the genus *Anabaena* comprising the following steps:
  a) addition of a signal probe and an optional complex formed between the ribosomal nucleic acid of a toxinogenic cyanobacteria of the genus *Anabaena* and a capture probe on a support,
  b) detection of the optional hybridization of said complex with said signal probe, the hybridization taking place between the signal probe and the ribosomal nucleic acid of said complex,
hybridization indicating the presence of toxinogenic cyanobacteria of the genus *Anabaena*, said capture probe and said signal probe forming a pair of probes, the sequences of said pair of probes being selected from x elements of one of the following sets:
  (SEQ ID NO: 27, SEQ ID NO: 28 and SEQ ID NO: 29)
  (SEQ ID NO: 30, SEQ ID NO: 31 and SEQ ID NO: 32)
  (SEQ ID NO: 33, SEQ ID NO: 34 and SEQ ID NO: 35)
  (SEQ ID NO: 36, SEQ ID NO: 37, SEQ ID NO: 38 and SEQ ID NO: 39)
  (SEQ ID NO: 40, SEQ ID NO: 41 and SEQ ID NO: 42)
  (SEQ ID NO: 43, SEQ ID NO: 44 and SEQ ID NO: 45)
  (SEQ ID NO: 46, SEQ ID NO: 47 and SEQ ID NO: 48)
  (SEQ ID NO: 49, SEQ ID NO: 50 and SEQ ID NO: 51)
  (SEQ ID NO: 52, SEQ ID NO: 53 and SEQ ID NO: 54)
  (SEQ ID NO: 55 and SEQ ID NO: 56)
  (SEQ ID NO: 57, SEQ ID NO: 58 and SEQ ID NO: 59)
  (SEQ ID NO: 60, SEQ ID NO: 61 and SEQ ID NO: 62)
x being 2, 3 or 4,
or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62.

According to another embodiment, the invention concerns a method for detecting toxinogenic cyanobacteria in a sample likely to contain at least one toxinogenic cyanobacteria of the *Planktothrix* genus comprising the following steps:
  a) addition of a signal probe and an optional complex formed between the ribosomal nucleic acid of a toxinogenic cyanobacteria of the genus *Planktothrix* and a capture probe on a support, b) detection of the optional hybridization of said complex with said signal probe, the hybridization taking place between the signal probe and the ribosomal nucleic acid of said complex, hybridization indicating the presence of toxinogenic cyanobacteria of the genus *Planktothrix*, said capture probe and said signal probe forming a pair of probes, the sequences of said pair of probes being selected from x elements of one of the following sets:

(SEQ ID NO: 63, SEQ ID NO: 64, SEQ ID NO: 65 and SEQ ID NO: 66)
(SEQ ID NO: 67, SEQ ID NO: 68 and SEQ ID NO: 69)

x being 3 or 4, or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69.

According to one embodiment, and in all aspects of this fourth aspect, positive control can be used. The positive control can, for example, be a synthetic nucleic acid complementary to the capture probe and the signal probe. The positive control can also be used as a standard.

According to one embodiment, and in all aspects of this fourth aspect, a negative control can be used. For example, the negative control can be a synthetic nucleic acid that is non-complementary to the capture probe and the signal probe.

According to one embodiment, and in all aspects of this fourth aspect, the simultaneous detection of several cyanobacteria is possible. In this case, the simultaneous detection is carried out on the same medium, but separately. For example, if the support is a microplate, the detection of each cyanobacteria to be detected is performed in separate wells of the microplate.

A fifth aspect of the invention concerns kits for the detection of toxinogenic cyanobacteria.

Thus, according to this fifth aspect, the invention concerns a kit for the detection of toxinogenic cyanobacteria of the genus *Microcystis*, said kit containing:

a) at least one pair of probes specific to toxinogenic cyanobacteria of the genus *Microcystis*, the sequences of said probes being selected from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)

x being 2, 3 or 4 or the sequences of said probes having at least 92% identity with said sequences SEQ ID NO: 1, SEQ ID NO: 2, SEQ ID NO: 3, SEQ ID NO 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, one probe of said pair being a capture probe linked to at least one attachment molecule positioned at 3' or 5' of its sequence and the other probe of said pair being a signal probe linked to at least one marking molecule positioned at 3' or 5' of its sequence, said capture probe and said signal probe being capable of hybridizing with the ribosomal nucleic acid of a toxinogenic cyanobacteria of the genus *Microcystis*, b) optionally a hybridization solution
c) optionally a washing solution
d) optionally one or more revealing solutions.

The invention also relates to a kit, as described above according to embodiment A, for the detection of toxinogenic cyanobacteria of the genus *Microcystis* and/or *Aphanizomenon*, said kit containing in addition:

a) at least one pair of probes specific to toxinogenic cyanobacteria of the genus *Aphanizomenon*, the sequences of said probes being selected from x elements of one of the following sets:
(SEQ ID NO: 20, SEQ ID NO: 21 and SEQ ID NO: 22)
(SEQ ID NO: 23 and SEQ ID NO: 24)

x being 2 or 3, or the sequences of said probes having at least 92% identity with the abovementioned sequences SEQ ID NO: 20, SEQ ID NO: 21, SEQ ID NO: 22, SEQ ID NO: 23, SEQ ID NO: 24, one probe of said pair being a capture probe linked to at least one attachment molecule positioned at 3' or 5' of its sequence and the other probe of said pair being a signal probe linked to at least one marking molecule positioned at 3' or 5' of its sequence, said capture probe and said signal probe being capable of hybridizing with the ribosomal nucleic acid of a toxinogenic cyanobacteria of the genus *Aphanizomenon*.

The invention also relates to a kit, as described above according to embodiment A or B, for the detection of toxinogenic cyanobacteria of the genus *Microcystis* and/or *Dolichospermum*, said kit containing in addition:

a) at least one pair of probes specific to toxinogenic cyanobacteria of the genus *Dolichospermum*, the sequences of said probes being selected from x elements of one of the following sets:
(SEQ ID NO: 25 and SEQ ID NO: 26)

x being 2, or the sequences of said probes having at least 92% identity with the aforementioned sequences SEQ ID NO: 25, SEQ ID NO: 26, one probe of said pair being a capture probe linked to at least one attachment molecule positioned at 3' or 5' of its sequence and the other probe of said pair being a signal probe linked to at least one marking molecule positioned at 3' or 5' of its sequence, said capture probe and said signal probe being capable of hybridizing with the ribosomal nucleic acid of a toxinogenic cyanobacteria of the genus *Dolichospermum*.

The invention also relates to a kit, as described above according to embodiments A, B or C, for the detection of toxinogenic cyanobacteria of the genus *Microcystis* and/or *Anabaena*, said kit containing in addition:

a) at least one pair of probes specific to toxinogenic cyanobacteria of the genus *Anabaena*, the sequences of said probes being selected from x elements of one of the following sets:
(SEQ ID NO: 27, SEQ ID NO: 28 and SEQ ID NO: 29)
(SEQ ID NO: 30, SEQ ID NO: 31 and SEQ ID NO: 32)
(SEQ ID NO: 33, SEQ ID NO: 34 and SEQ ID NO: 35)
(SEQ ID NO: 36, SEQ ID NO: 37, SEQ ID NO: 38 and SEQ ID NO: 39)
(SEQ ID NO: 40, SEQ ID NO: 41 and SEQ ID NO: 42)
(SEQ ID NO: 43, SEQ ID NO: 44 and SEQ ID NO: 45)
(SEQ ID NO: 46, SEQ ID NO: 47 and SEQ ID NO: 48)
(SEQ ID NO: 49, SEQ ID NO: 50 and SEQ ID NO: 51)
(SEQ ID NO: 52, SEQ ID NO: 53 and SEQ ID NO: 54)
(SEQ ID NO: 55 and SEQ ID NO: 56)

(SEQ ID NO: 57, SEQ ID NO: 58 and SEQ ID NO: 59)
(SEQ ID NO: 60, SEQ ID NO: 61 and SEQ ID NO: 62)
x being 2, 3 or 4,
or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62,
one probe of said pair being a capture probe linked to at least one attachment molecule positioned at 3' or 5' of its sequence and the other probe of said pair being a signal probe linked to at least one marking molecule positioned at 3' or 5' of its sequence,
said capture probe and said signal probe being capable of hybridizing with the ribosomal nucleic acid of a toxinogenic cyanobacteria of the genus *Anabaena*.

The invention also concerns a kit, as described above according to embodiments A, B, C or D, for the detection of toxinogenic cyanobacteria of the genus *Microcystis* and/or *Planktothrix*, said kit containing in addition:
a) at least one pair of probes specific to toxinogenic cyanobacteria of the genus *Planktothrix*, the sequences of said probes being selected from x elements of one of the following sets:
(SEQ ID NO: 63, SEQ ID NO: 64, SEQ ID NO: 65 and SEQ ID NO: 66)
(SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
one probe of said pair being a capture probe linked to at least one attachment molecule positioned at 3' or 5' of its sequence and the other probe of said pair being a signal probe linked to at least one marking molecule positioned at 3' or 5' of its sequence,
said capture probe and said signal probe being capable of hybridizing with the ribosomal nucleic acid of a toxinogenic cyanobacteria of the genus *Planktothrix*.

The invention also concerns a kit, as described above according to embodiments A, B, C, D or E, for the detection of toxinogenic cyanobacteria of the genus *Microcystis* and/or *Nodularia*, said kit containing in addition:
a) at least one pair of probes specific to toxinogenic cyanobacteria of the genus *Nodularia*, the sequences of said probes being selected from x elements of one of the following sets:
(SEQ ID NO: 70, SEQ ID NO: 71 and SEQ ID NO: 72)
(SEQ ID NO: 73, SEQ ID NO: 74 and SEQ ID NO: 75)
(SEQ ID NO: 76 and SEQ ID NO: 77)
x being 2 or 3,
or the sequences of said probes having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77,
one probe of said pair being a capture probe linked to at least one attachment molecule positioned at 3' or 5' of its sequence and the other probe of said pair being a signal probe linked to at least one marking molecule positioned at 3' or 5' of its sequence,
said capture probe and said signal probe being capable of hybridizing with the ribosomal nucleic acid of a toxinogenic cyanobacteria of the genus *Nodularia*.

The invention also concerns a kit, as described above according to embodiments A, B, C, D, E or F, for the detection of toxinogenic cyanobacteria of the genus *Microcystis* and/or *Cylindrospermopsis*, said kit containing in addition:
a) at least one pair of probes specific to toxinogenic cyanobacteria of the genus *Cylindrospermopsis*, the sequences of said probes being selected from x elements of one of the following sets:
(SEQ ID NO: 78, SEQ ID NO: 79 and SEQ ID NO: 80)
x being 3,
or the sequences of said probes having at least 92% identity with the aforementioned sequences SEQ ID NO: 78, SEQ ID NO: 79, SEQ ID NO: 80,
one probe of said pair being a capture probe linked to at least one attachment molecule positioned at 3' or 5' of its sequence and the other probe of said pair being a signal probe linked to at least one marking molecule positioned at 3' or 5' of its sequence,
said capture probe and said signal probe being capable of hybridizing with the ribosomal nucleic acid of a toxinogenic cyanobacteria of the genus *Cylindrospermopsis*.

As with the first aspect relating to the use, all combinations of embodiments A, B, C, D, E, F and/or G of this fifth aspect can be considered. In this way, all the combinations of toxinogenic cyanobacteria B to G32 described in the first aspect can be detected by the kits as described in this fifth aspect.

According to another embodiments, the invention also concerns a kit for the detection of toxinogenic cyanobacteria of the genus *Aphanizomenon*, said kit containing:
a) at least one pair of probes specific to toxinogenic cyanobacteria of the genus *Aphanizomenon*, the sequences of said probes being selected from x elements of one of the following sets:
(SEQ ID NO: 20, SEQ ID NO: 21 and SEQ ID NO: 22)
(SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24, one probe of said pair being a capture probe linked to at least one attachment molecule positioned at 3' or 5' of its sequence and the other probe of said pair being a signal probe linked to at least one marking molecule positioned at 3' or 5' of its sequence, said capture probe and said signal probe being capable of hybridizing with the ribosomal nucleic acid of a toxinogenic cyanobacteria of the genus *Aphanizomenon*,
b) optionally a hybridization solution
c) optionally a washing solution
d) optionally one or more revealing solutions According to another embodiments, the invention also concerns a kit for the detection of toxinogenic cyanobacteria of the genus *Dolichospermum*, said kit containing:
a) at least one pair of probes specific to toxinogenic cyanobacteria of the genus *Dolichospermum*, the sequences of said probes being selected from x elements of one of the following sets:
(SEQ ID NO: 25 and SEQ ID NO: 26)
x being 2,
or the sequences of said probes having at least 92% identity with the aforementioned sequences SEQ ID NO: 25, SEQ ID NO: 26,
one probe of said pair being a capture probe linked to at least one attachment molecule positioned at 3' or 5' of its sequence and the other probe of said pair being a signal probe linked to at least one marking molecule positioned at 3' or 5' of its sequence, said capture probe and said signal probe being capable of hybridizing with the ribosomal nucleic acid of a toxinogenic cyanobacteria of the genus *Dolichospermum*,
  b) optionally a hybridization solution
  c) optionally a washing solution
  d) optionally one or more revealing solutions According to another embodiments, the invention also concerns a kit for the detection of toxinogenic cyanobacteria of the genus *Anabaena*, said kit containing:
  a) at least one pair of probes specific to toxinogenic cyanobacteria of the genus *Anabaena*, the sequences of said probes being selected from x elements of one of the following sets:
    (SEQ ID NO: 27, SEQ ID NO: 28 and SEQ ID NO: 29)
    (SEQ ID NO: 30, SEQ ID NO: 31 and SEQ ID NO: 32)
    (SEQ ID NO: 33, SEQ ID NO: 34 and SEQ ID NO: 35)
    (SEQ ID NO: 36, SEQ ID NO: 37, SEQ ID NO: 38 and SEQ ID NO: 39)
    (SEQ ID NO: 40, SEQ ID NO: 41 and SEQ ID NO: 42)
    (SEQ ID NO: 43, SEQ ID NO: 44 and SEQ ID NO: 45)
    (SEQ ID NO: 46, SEQ ID NO: 47 and SEQ ID NO: 48)
    (SEQ ID NO: 49, SEQ ID NO: 50 and SEQ ID NO: 51)
    (SEQ ID NO: 52, SEQ ID NO: 53 and SEQ ID NO: 54)
    (SEQ ID NO: 55 and SEQ ID NO: 56)
    (SEQ ID NO: 57, SEQ ID NO: 58 and SEQ ID NO: 59)
    (SEQ ID NO: 60, SEQ ID NO: 61 and SEQ ID NO: 62)
  x being 2, 3 or 4,
  or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62,
  one probe of said pair being a capture probe linked to at least one attachment molecule positioned at 3' or 5' of its sequence and the other probe of said pair being a signal probe linked to at least one marking molecule positioned at 3' or 5' of its sequence,
  said capture probe and said signal probe being capable of hybridizing with the ribosomal nucleic acid of a toxinogenic cyanobacteria of the genus *Anabaena*,
  b) optionally a hybridization solution
  c) optionally a washing solution
  d) optionally one or more revealing solutions According to another embodiment, the invention also concerns a kit for the detection of toxinogenic cyanobacteria of the genus *Planktothrix*, the said kit containing:
  a) at least one pair of probes specific to toxinogenic cyanobacteria of the genus *Planktothrix*, the sequences of said probes being selected from x elements of one of the following sets:
    (SEQ ID NO: 63, SEQ ID NO: 64, SEQ ID NO: 65 and SEQ ID NO: 66)
    (SEQ ID NO: 67, SEQ ID NO: 68 and SEQ ID NO: 69)
  x being 3 or 4,
  or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
  one probe of said pair being a capture probe linked to at least one attachment molecule positioned at 3' or 5' of its sequence and the other probe of said pair being a signal probe linked to at least one marking molecule positioned at 3' or 5' of its sequence, said capture probe and said signal probe being capable of hybridizing with the ribosomal nucleic acid of a toxinogenic cyanobacteria of the genus *Planktothrix*,
  b) optionally a hybridization solution
  c) optionally a washing solution
  d) optionally one or more revealing solutions In all embodiments of this fifth aspect, and according to a particular embodiment, the said one capture probe is linked to at least one attachment molecule positioned 5' from its sequence and the said signal probe is linked to at least one marking molecule positioned 5' from its sequence. In all embodiments of this fifth aspect, and according to a particular embodiment, the said one capture probe is linked to at least one attachment molecule positioned 5' from its sequence and the said signal probe is linked to at least one marking molecule positioned 3' from its sequence. In all embodiments of this fifth aspect, and according to a particular embodiment, said capture probe is linked to at least one attachment molecule positioned 3' from its sequence and said signal probe is linked to at least one marking molecule positioned 5' from its sequence. In all embodiments of this fifth aspect, and according to a particular embodiment, said capture probe is linked to an attachment molecule positioned 3' from its sequence and said signal probe is linked to one or more marking molecules positioned 3' from its sequence.

In all embodiments of this fifth aspect, the said at least one attachment molecule may be selected from a biotin molecule, avidin molecule, streptavidin molecule, a thiol group, an amine group and a carbon group.

In all embodiments of this fifth aspect, and in a particularly preferred embodiment, the said at least one attachment molecule is a biotin molecule.

In all embodiments this fifth aspect, the said at least one marking molecule may be chosen from a fluorochrome, a biotin, a molecule linked to a biotin, digoxigenin, an enzyme using a chemiluminescent substrate, an enzyme using a chromogenic substrate or an enzyme using an electrochemical oxidation substrate.

In all embodiments of this fifth aspect, and in one particularly preferred embodiment, the said at least one marking molecule is digoxigenin.

In all embodiments of this fifth aspect, the said fluorochrome can be chosen from the group consisting of: Alexa fluor, in particular Alexa fluor 350, 405, 430, 488, 500, 514, 532, 546, 555, 568, 594, 610, 633, 647, 660, 680, 700, 750 or 790, Fluorescein Isothiocyanate (FITC), Rhodamine, Allophycocyanine (APC) and Phycoerythrin (PE).

In all embodiments of this fifth aspect, said enzyme using a chemiluminescent substrate may be horseradish peroxidase (HRP) and said chemiluminescent substrate may be luminol, or said enzyme using a chemiluminescent substrate may be luciferase and said chemiluminescent substrate may be luciferin.

In all embodiments of this fifth aspect, the said enzyme using a chromogenic substrate can be alkaline phosphatase and the said chromogenic substrate can be Tetrazolium Nitroblue (NBT) and Bromochlorylindolophosphate (BCIP), or said enzyme using a chromogenic substrate may be horseradish peroxidase (HRP) and said chromogenic substrate may be selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

In all embodiments of this fifth aspect, said enzyme using an electrochemically oxidized substrate can be horseradish peroxidase (HRP) and said electrochemically oxidized substrate can be 3,3',5,5'-Tetramethylbenzidine (TMB).

In all embodiments this fifth aspect, and in a particular embodiment, the said hybridization solution may comprise 0 to 0.3 M of NaCl, 0 to 0.1 M of buffer chosen from citrate, Tris-HCl, PIPES, HEPES or phosphate, 0.001 to 0.05% of detergent agent chosen from SDS, triton, TWEEN20, optionally 0.001 to 0.5 M chelating agent selected from EDTA or EGTA, optionally 0.1 to 30% blocking agent selected from BSA, herring DNA, salmon DNA, calf DNA, yeast DNA or an exogenous protein and optionally another chemical agent selected from $MgCl_2$, $CaCl_2$ and KCl, preferably $MgCl_2$.

In all embodiments of this fifth aspect, and in another particular embodiment, said hybridization solution comprises 0.1 M to 1 M of NaCl or KCl, 0.01 M to 1 M of Tris-HCl, HEPES, PBS, $KH_2PO_4$ or SSC with a pH ranging from 6.0 to 9.0, 0.01 and 0.05% of detergent agent selected from SDS or N-Lauroylsarcosine, optionally 0.01 and 0.1 M chelating agent selected from EDTA, EGTA or a similar chelating agent selected from calcium citrate or sodium hexametaphosphate and optionally 0.1 and 30% blocking agent selected from a protein such as Bovine Serum Albumin Protein (BSA) or a nucleic acid such as Herring DNA.

In all embodiments of this fifth aspect, and in another particular embodiment, the said hybridization solution consists of 0.3M NaCl, 0.08M Tris-HCl and 0.04% SDS and is pH 8. In all embodiments of this fifth aspect, and in a particular embodiment, the said washing solution comprises 0 to 0.3 M NaCl, 0 to 0.1 M buffer chosen from sodium citrate, Tris-HCl, PIPES, HEPES or phosphate, 0.001 to 0.05% detergent agent chosen from SDS, triton, TWEEN20, optionally 0.001 to 0.5 M chelating agent selected from EDTA or EGTA, optionally 0.1 to 30% blocking agent selected from BSA, herring DNA, salmon DNA, calf DNA, yeast DNA or an exogenous protein and optionally another chemical agent selected from $MgCl_2$, $CaCl_2$ and KCl, preferably $MgCl_2$.

In all embodiments of this fifth aspect, and in another particular embodiment, said washing solution comprises 0.1 M to 1 M of NaCl or KCl, 0.01 M to 1 M of Tris-HCl, HEPES, PBS, $KH_2PO_4$ or SSC with a pH ranging from 6.0 to 9.0, 0.01 and 0.05% of detergent agent selected from SDS or N-Lauroylsarcosine, optionally 0.01 and 0.1 M chelating agent selected from EDTA, EGTA or a similar chelating agent selected from calcium citrate or sodium hexametaphosphate and optionally 0.1 and 30% blocking agent selected from a protein such as Bovine Serum Albumin Protein (BSA) or a nucleic acid such as Herring DNA.

In all embodiments of this fifth aspect, and in another particular embodiment, the said washing solution comprises 0.01 and 0.7 M of PBS, $Na_2HPO_4$, $KH_2PO_4$, $K_2PO_4$ and/or SSC, and 0.1 and 0.4 M of NaCl or KCl.

In all embodiments of this fifth aspect, and in another particular embodiment, the said washing solution consists of 0.1M of $K_2PO_4$, 0.1M of $KH_2PO_4$ and 0.1M of KCl and has a pH of 7.6. In all embodiments of this fifth aspect, the term "revealing solution" means any solution containing the means necessary for the revelation of any hybridization between the capture probe, the ribosomal nucleic acid and the signal probe. Depending on the marking molecule used, the kit of the present invention may include one or more revealing solutions.

For example, when the marking molecule is a biotin molecule or is conjugated with a biotin molecule, the revealing solution may contain a fluorochrome conjugated with streptavidin or avidin.

For example, when the marking molecule is a digoxigenin molecule, the revealing solution may contain a fluorochrome conjugated to an anti-digoxigenin antibody.

For example, when the marking molecule is an enzyme using a chemiluminescent substrate, such as horseradish peroxidase or luciferase, the revealing solution may contain the corresponding chemiluminescent substrate, such as luminol when the enzyme using a chemiluminescent substrate is horseradish peroxidase or luciferin when the enzyme using a chemiluminescent substrate is luciferase.

For example, when the marking molecule is an enzyme using a chromogenic substrate, such as alkaline phosphatase or horseradish peroxidase, the revealing solution may contain the corresponding chromogenic substrate, such as Tetrazolium Nitroblue (NBT) or Bromochlorylindolophosphate (BCIP) when the enzyme using a chromogenic substrate is alkaline phosphatase or 3,3'-Diaminobenzidine (DAB), 3,3', 5,5'-Tetramethylbenzidine (TMB), or 2,2'-azino-bis(3-ethylbenzothiazoline-6-sulphonic acid) (ABTS) when the enzyme using a chemiluminescent substrate is horseradish peroxidase.

For example, when the marking molecule is an enzyme using an electrochemically oxidized substrate, such as horseradish peroxidase, the revealing solution may contain the electrochemically oxidized substrate, such as 3,3',5,5'-Tetramethylbenzidine (TMB).

For example, when the marking molecule is a biotin molecule or is conjugated with a biotin molecule, the kit of the present invention may include two revealing solutions.

For example, one of the revealing solutions may include:
an enzyme using a chemiluminescent substrate, such as horseradish peroxidase or luciferase, coupled with streptavidin or avidin, or
an enzyme using a chromogenic substrate, such as alkaline phosphatase or horseradish peroxidase, coupled with streptavidin or avidin, or
an enzyme using an electrochemically oxidized substrate, such as horseradish peroxidase.

The other revealing solution may include:
a chemiluminescent substrate, such as luminol when the enzyme using a chemiluminescent substrate is horseradish peroxidase or luciferin when the enzyme using a chemiluminescent substrate is luciferase, or
a chromogenic substrate, such as Tetrazolium Nitroblue (NBT) or Bromochlorylindolophosphate (BCIP) when the enzyme using a chromogenic substrate is alkaline phosphatase or 3,3'-Diaminobenzidine (DAB), 3,3',5, 5'-Tetramethylbenzidine (TMB), or 2,2'-azino-bis(3-ethylbenzothiazoline-6-sulphonic acid) (ABTS) when the enzyme using a chemiluminescent substrate is horseradish peroxidase, or an electrochemically oxidized substrate, such as 3,3',5,5'-Tetramethylbenzidine (TMB). For example, when the marking molecule is a digoxigenin molecule the kit of the present invention may include two revealing solutions.

One of the revealing solutions may, for example, contain:
an enzyme using a chemiluminescent substrate conjugated to an anti-digoxigenin antibody, or
an enzyme using a chromogenic substrate conjugated to an anti-digoxigenin antibody, or
an enzyme using an electrochemically oxidized substrate conjugated to an anti-digoxigenin antibody, or The other revealing solution may include:
a chemiluminescent substrate, such as luminol when the enzyme using a chemiluminescent substrate is horseradish peroxidase or luciferin when the enzyme using a chemiluminescent substrate is luciferase, or
a chromogenic substrate, such as Tetrazolium Nitroblue (NBT) or Bromochlorylindolophosphate (BCIP) when the enzyme using a chromogenic substrate is alkaline phosphatase or 3,3'-Diaminobenzidine (DAB), 3,3',5,5'-Tetramethylbenzidine (TMB), or 2,2'-azino-bis(3-ethylbenzothiazoline-6-sulphonic acid) (ABTS) when the enzyme using a chemiluminescent substrate is horseradish peroxidase, or
an electrochemically oxidized substrate, such as 3,3',5,5'-Tetramethylbenzidine (TMB). In all embodiments of this fifth aspect, and in a particular embodiment, the said kit can also include a lysis solution.

According to this particular embodiment, the said lysis solution may comprise a neutral buffer chosen from phosphate, SSC or Tris, a chaotropic agent chosen from guanidium chloride, an ionic or non-ionic detergent such as sodium dodecyl sulphate (SDS) or Triton X100, a reducing agent selected from b-mercaptoethanol or DiThioTreitol and a chelating agent selected from Ethylene Diamine Tetra Acetic Acid (EDTA) or Ethylene Glycol Tetraacetic Acid (EGTA).

In all embodiments of this fifth aspect, and in a particular embodiment, the said kit can include in addition a chromogenic substrate when:
the marking molecule is an enzyme using a chromogenic substrate,
the marking molecule is biotin and is detected via an enzyme using a chromogenic substrate conjugated to streptavidin or avidin
the marking molecule is conjugated to biotin and is detected via an enzyme using a chromogenic substrate conjugated to streptavidin or avidin
the marking molecule is digoxigenin and is detected via an enzyme using a chromogenic substrate conjugated to an anti-digoxigenin antibody.

According to this particular embodiment, said enzyme using a chromogenic substrate may be alkaline phosphatase and said chromogenic substrate may be Tetrazolium Nitroblue (NBT) and Bromochlorylindolophosphate (BCIP), or said enzyme using a chromogenic substrate may be horseradish peroxidase (HRP) and said chromogenic substrate may be selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

In all embodiments of this fifth aspect, and in a particular embodiment, the said kit can include in addition a chemiluminescent substrate when:
the marking molecule is an enzyme using a chemiluminescent substrate
the marking molecule is biotin and is detected via an enzyme using a chemiluminescent substrate conjugated to streptavidin or avidin
the marking molecule is conjugated to biotin and is detected via an enzyme using a chemiluminescent substrate conjugated to streptavidin or avidin
the marking molecule is digoxigenin and is detected via an enzyme using a chemiluminescent substrate conjugated to an anti-digoxigenin antibody.

According to this particular embodiment, said enzyme using a chemiluminescent substrate may be horseradish peroxidase (HRP) and said chemiluminescent substrate may be luminol, or said enzyme using a chemiluminescent substrate may be luciferase and said chemiluminescent substrate may be luciferin.

In all embodiments of this fifth aspect, and in a particular embodiment, the said kit can include in addition an electrochemical oxidation substrate when:
the marking molecule is an enzyme using an electrochemical oxidation substrate
the marking molecule is biotin and is detected via an enzyme using an electrochemically oxidized substrate conjugated to streptavidin or avidin
the marking molecule is conjugated to biotin and is detected via an enzyme using an electrochemically oxidized substrate conjugated to streptavidin or avidin, or
the marking molecule is digoxigenin and is detected via an enzyme using an electrochemically oxidized substrate conjugated to an anti-digoxigenin antibody.

According to this particular embodiment, said enzyme using an electrochemically oxidized substrate may be horseradish peroxidase (HRP) and said electrochemically oxidized substrate may be 3,3',5,5'-Tetramethylbenzidine (TMB).

In all embodiments of this fifth aspect, and in a particular embodiment, the said kit may additionally include a solution containing an anti-digoxigenin antibody when the marking molecule is digoxigenin.

According to this particular embodiment, the said anti-digoxigenin antibody can be conjugated:
to a fluorochrome
to an enzyme using a chromogenic substrate
to an enzyme using a chemiluminescent substrate
to an enzyme using an electrochemical oxidation substrate.

According to this particular embodiment, said fluorochrome can be selected from the group consisting of: Alexa fluor, in particular Alexa fluor 350, 405, 430, 488, 500, 514, 532, 546, 555, 568, 594, 610, 633, 647, 660, 680, 700, 750 or 790, Fluorescein Isothiocyanate (FITC), Rhodamine, Allophycocyanine (APC) and Phycoerythrin (PE).

According to this particular embodiment, said enzyme using a chromogenic substrate may be alkaline phosphatase and said chromogenic substrate may be Tetrazolium Nitroblue (NBT) and Bromochlorylindolophosphate (BCIP), or said enzyme using a chromogenic substrate may be horseradish peroxidase (HRP) and said chromogenic substrate may be selected from 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

According to this particular embodiment, said enzyme using a chemiluminescent substrate may be horseradish peroxidase (HRP) and said chemiluminescent substrate may be luminol, or said enzyme using a chemiluminescent substrate may be luciferase and said chemiluminescent substrate may be luciferin.

According to this particular embodiment, said enzyme using an electrochemically oxidized substrate can be horseradish peroxidase (HRP) and said electrochemically oxidized substrate can be 3,3',5,5'-Tetramethylbenzidine (TMB).

In all embodiments of this fifth aspect, and in a particular embodiment, the said kit can also include a support.

According to this particular embodiment, the said support can be chosen from the group consisting of: a microplate, a glass slide, magnetic beads, electrodes printed in different materials such as carbon or gold.

According to this particular embodiment, the said support can be functionalized with streptavidin, avidin, an aldehyde group, an epoxy group, a carboxyl group, an isothiocyanate group, gold, mercaptosilane or a maleimide group.

In all embodiments of this fifth aspect, and in a particular embodiment, the said kit can include in addition a positive control. The positive control may be a synthetic nucleic acid molecule complementary to said signal probe and said capture probe.

In all embodiments of this fifth aspect, and in a particular embodiment, the said kit can include in addition a negative control. The negative control may be a synthetic nucleic acid molecule which is not complementary to said signal probe and said capture probe.

In all embodiments of this fifth aspect, and in a particular embodiment, the said signal probes can be kept in one of the hybridization solutions as defined above.

In all embodiments of this fifth aspect, and in a particular embodiment, the said capture probes can be kept on a support as previously defined.

In all embodiments of this fifth aspect, and in a particular embodiment, the said support containing the said capture probes can be preserved in a conservation solution such as, for example, the commercial solution ProClin® (Sigma-Aldrich®, 48912-U).

In all embodiments of this fifth aspect, and in a particular embodiment, the said support containing the said capture probes can preferably be preserved freeze-dried.

In one aspect of the invention, said kit is preferably stored at 4° C.

In all embodiments of this fifth aspect, and in a particular embodiment, the said kit contains in addition a procedure for using the said kit.

Another aspect of the invention concerns a kit for the detection of toxinogenic cyanobacteria of the genus *Microcystis*, said kit containing:
a) at least one pair of probes specific to toxinogenic cyanobacteria of the genus *Microcystis*, the sequences of said probes being selected from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)
x being 2, 3 or 4
or the sequences of said probes having a least 92% identity with the abovementioned sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
one probe of said pair being a capture probe linked to at least one attachment molecule positioned at 3' or 5' of its sequence and the other probe of said pair being a signal probe linked to at least one signal molecule positioned at 3' or 5' of its sequence,
said capture probe and said signal probe being capable of hybridizing with the ribosomal nucleic acid of a toxinogenic cyanobacteria of the genus *Microcystis*,
said attachment molecule being a biotin molecule,
said signal molecule being digoxigenin
b) a hybridization solution containing 0.3M NaCl, 0.08M Tris-HCl and 0.04% SDS and pH 8,
c) a washing solution containing 0.1M $K_2PO_4$, 0.1M $KH_2PO_4$ and 0.1M KCl and is pH 7.6,
d) a lysis solution being a commercial solution from the Quick-RNA™ MiniPrep kit (Zymo Research®, USA),
e) a support, said support being a microplate functionalized with streptavidin or avidin f) a solution containing an anti-digoxigenin antibody, said anti-digoxigenin antibody being bound to horseradish peroxidase (HRP)
g) a chromogenic substrate, said chromogenic substrate being 3,3',5,5'-Tetramethylbenzidine (TMB),
h) a positive control, said positive control being a synthetic nucleic acid molecule complementary to said signal probe and said capture probe
i) a negative control, said negative control being a synthetic nucleic acid molecule non-complementary to said signal probe and said capture probe
said capture probes being kept freeze-dried on said support,
said signal probes being kept in said hybridization solution.

Another aspect of this fifth aspect concerns a kit for the detection of toxinogenic cyanobacteria of the genus *Microcystis* and/or *Aphanizomenon*, said kit containing:
a) at least one pair of probes specific to toxinogenic cyanobacteria of the genus *Microcystis*, the sequences of said probes being selected from x elements of one of the following sets:
(SEQ ID NO: 1, SEQ ID NO: 2, SEQ ID NO: 3 and SEQ ID NO: 4)
(SEQ ID NO: 5, SEQ ID NO: 6 and SEQ ID NO: 7)
(SEQ ID NO: 8, SEQ ID NO: 9, SEQ ID NO: 10 and SEQ ID NO: 11)
(SEQ ID NO: 12, SEQ ID NO: 13 and SEQ ID NO: 14)
(SEQ ID NO: 15, SEQ ID NO: 16 and SEQ ID NO: 17)
(SEQ ID NO: 18 and SEQ ID NO: 19)
x being 2, 3 or 4
or the sequences of said probes having a least 92% identity with the abovementioned sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
one probe of said pair being a capture probe linked to at least one attachment molecule positioned at 3' or 5' of its sequence and the other probe of said pair being a signal probe linked to at least one signal molecule positioned at 3' or 5' of its sequence,
said capture probe and said signal probe being capable of hybridizing with the ribosomal nucleic acid of a toxinogenic cyanobacteria of the genus *Microcystis*,
said attachment molecule being a biotin molecule,
said signal molecule being digoxigenin b) at least one pair of probes specific to toxinogenic cyanobacteria of the genus *Aphanizomenon*, the sequences of said probes being selected from x elements of one of the following sets:
(SEQ ID NO: 20, SEQ ID NO: 21 and SEQ ID NO: 22)
(SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24, one probe of said pair being a capture probe linked to at least one attachment molecule positioned at 3' or 5' of its sequence and the other probe of said pair being a signal probe linked to at least one signal molecule positioned at 3' or 5' of its sequence, said capture probe and said signal probe being capable of hybridizing with the ribosomal nucleic acid of a toxinogenic cyanobacteria of the genus *Aphanizomenon*, said attachment molecule being a biotin molecule, said signal molecule being digoxigenin
  c) a hybridization solution containing 0.3M NaCl, 0.08M Tris-HCl and 0.04% SDS and pH 8,
  d) a washing solution containing 0.1M K$_2$PO$_4$, 0.1M KH$_2$PO$_4$ and 0.1M KCl and is pH 7.6,
  e) a lysis solution being a commercial solution from the Quick-RNA™ MiniPrep kit (Zymo Research®, USA),
  f) a support, said support being a microplate functionalized with streptavidin or avidin
  g) a solution containing an anti-digoxigenin antibody, said anti-digoxigenin antibody being bound to horseradish peroxidase (HRP)
  h) a chromogenic substrate, said chromogenic substrate being 3,3',5,5'-Tetramethylbenzidine (TMB),
  i) a positive control, said positive control being a synthetic nucleic acid molecule complementary to said signal probe and said capture probe,
  j) a negative control, said negative control being a synthetic nucleic acid molecule non-complementary to said signal probe and said capture probe,
said capture probes being kept freeze-dried on said support, said signal probes being kept in said hybridization solution.

Another aspect of this fifth aspect concerns a kit for the detection of toxinogenic cyanobacteria of the genus *Microcystis* and/or *Aphanizomenon* and/or *Dolichospermum*, said kit containing:
  a) at least one pair of probes specific to toxinogenic cyanobacteria of the genus *Microcystis*, the sequences of said probes being selected from x elements of one of the following sets:
    (SEQ ID NO: 1, SEQ ID NO: 2, SEQ ID NO: 3 and SEQ ID NO: 4)
    (SEQ ID NO: 5, SEQ ID NO: 6 and SEQ ID NO: 7)
    (SEQ ID NO: 8, SEQ ID NO: 9, SEQ ID NO: 10 and SEQ ID NO: 11)
    (SEQ ID NO: 12, SEQ ID NO: 13 and SEQ ID NO: 14)
    (SEQ ID NO: 15, SEQ ID NO: 16 and SEQ ID NO: 17)
    (SEQ ID NO: 18 and SEQ ID NO: 19)
x being 2, 3 or 4,
or the sequences of said probes having a least 92% identity with the abovementioned sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19,
one probe of said pair being a capture probe linked to at least one attachment molecule positioned at 3' or 5' of its sequence and the other probe of said pair being a signal probe linked to at least one signal molecule positioned at 3' or 5' of its sequence,
said capture probe and said signal probe being capable of hybridizing with the ribosomal nucleic acid of a toxinogenic cyanobacteria of the genus *Microcystis*,
said attachment molecule being a biotin molecule,
said signal molecule being digoxigenin
  b) at least one pair of probes specific to toxinogenic cyanobacteria of the genus *Aphanizomenon*, the sequences of said probes being selected from x elements of one of the following sets:
    (SEQ ID NO: 20, SEQ ID NO: 21 and SEQ ID NO: 22)
    (SEQ ID NO: 23 and SEQ ID NO: 24)
x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24,
one probe of said pair being a capture probe linked to at least one attachment molecule positioned at 3' or 5' of its sequence and the other probe of said pair being a signal probe linked to at least one signal molecule positioned at 3' or 5' of its sequence
said capture probe and said signal probe being capable of hybridizing with the ribosomal nucleic acid of a toxinogenic cyanobacteria of the genus *Aphanizomenon*,
said attachment molecule being a biotin molecule,
said signal molecule being digoxigenin,
  c) at least one pair of probes specific to toxinogenic cyanobacteria of the genus *Dolichospermum*, the sequences of said probes being selected from x elements of one of the following sets:
    (SEQ ID NO 25 and SEQ ID NO 26)
x being 2,
or the sequences of said probes having at least 92% identity with the aforementioned sequences SEQ ID NO: 25, SEQ ID NO: 26,
one probe of said pair being a capture probe linked to at least one attachment molecule positioned at 3' or 5' of its sequence and the other probe of said pair being a signal probe linked to at least one signal molecule positioned at 3' or 5' of its sequence,
said capture probe and said signal probe being capable of hybridizing with the ribosomal nucleic acid of a toxinogenic cyanobacteria of the genus *Dolichospermum*,
said attachment molecule being a biotin molecule,
said signal molecule being digoxigenin,
  d) a hybridization solution containing 0.3M NaCl, 0.08M Tris-HCl and 0.04% SDS and pH 8,
  e) a washing solution containing 0.1M K$_2$PO$_4$, 0.1M KH$_2$PO$_4$ and 0.1M KCl and is pH 7.6.
  f) a lysis solution being a commercial solution from the Quick-RNA™ MiniPrep kit (Zymo Research®, USA),
  g) a support, said support being a microplate functionalized with streptavidin or avidin
  h) a solution containing an anti-digoxigenin antibody, said anti-digoxigenin antibody being bound to horseradish peroxidase (HRP)
  i) a chromogenic substrate, said chromogenic substrate being 3,3',5,5'-Tetramethylbenzidine (TMB),
  j) a positive control, said positive control being a synthetic nucleic acid molecule complementary to said signal probe and said capture probe,
  k) a negative control, said negative control being a synthetic nucleic acid molecule non-complementary to said signal probe and said capture probe, said capture probes being kept freeze-dried on said support, said signal probes being kept in said hybridization solution.

Another aspect of this fifth aspect also concerns a kit for the detection of toxinogenic cyanobacteria of the genus *Aphanizomenon*, said kit containing:
- a) at least one pair of probes specific to toxinogenic cyanobacteria of the genus *Aphanizomenon*, the sequences of said probes being selected from x elements of one of the following sets:
  - (SEQ ID NO: 20, SEQ ID NO: 21 and SEQ ID NO: 22)
  - (SEQ ID NO: 23 and SEQ ID NO: 24)

x being 2 or 3,
or the sequences of said probes having at least 92% identity with the abovementioned sequences SEQ ID NO: 20, SEQ ID NO: 21, SEQ ID NO: 22, SEQ ID NO: 23, SEQ ID NO: 24,
one probe of said pair being a capture probe linked to at least one attachment molecule positioned at 3' or 5' of its sequence and the other probe of said pair being a signal probe linked to at least one signal molecule positioned at 3' or 5' of its sequence,
said capture probe and said signal probe being capable of hybridizing with the ribosomal nucleic acid of a toxinogenic cyanobacteria of the genus *Aphanizomenon*,
said attachment molecule being a biotin molecule,
said signal molecule being digoxigenin,
- b) a hybridization solution containing 0.3M NaCl, 0.08M Tris-HCl and 0.04% SDS and pH 8,
- c) a washing solution containing 0.1M $K_2PO_4$, 0.1M $KH_2PO_4$ and 0.1M KCl and is pH 7.6.
- d) a lysis solution being a commercial solution from the Quick-RNA™ MiniPrep kit (Zymo Research®, USA),
- e) a support, said support being a microplate functionalized with streptavidin or avidin,
- f) a solution containing an anti-digoxigenin antibody, said anti-digoxigenin antibody being bound to horseradish peroxidase (HRP),
- g) a chromogenic substrate, said chromogenic substrate being 3,3',5,5'-Tetramethylbenzidine (TMB),
- h) a positive control, said positive control being a synthetic nucleic acid molecule complementary to said signal probe and said capture probe,
- i) a negative control, said negative control being a synthetic nucleic acid molecule non-complementary to said signal probe and said capture probe, said capture probes being kept freeze-dried on said support, said signal probes being kept in said hybridization solution.

Another aspect of this fifth aspect also concerns a kit for the detection of toxinogenic cyanobacteria of the genus *Dolichospermum*, said kit containing:
- a) at least one pair of probes specific to toxinogenic cyanobacteria of the genus *Dolichospermum*, the sequences of said probes being selected from x elements of one of the following sets:
  - (SEQ ID NO 25 and SEQ ID NO 26)

x being 2,
or the sequences of said probes having at least 92% identity with the aforementioned sequences SEQ ID NO: 25, SEQ ID NO: 26,
one probe of said pair being a capture probe linked to at least one attachment molecule positioned at 3' or 5' of its sequence and the other probe of said pair being a signal probe linked to at least one signal molecule positioned at 3' or 5' of its sequence,
said capture probe and said signal probe being capable of hybridizing with the ribosomal nucleic acid of a toxinogenic cyanobacteria of the genus *Dolichospermum*,
said attachment molecule being a biotin molecule,
said signal molecule being digoxigenin,
- b) a hybridization solution containing 0.3M NaCl, 0.08M Tris-HCl and 0.04% SDS and pH 8,
- c) a washing solution containing 0.1M $K_2PO_4$, 0.1M $KH_2PO_4$ and 0.1M KCl and is pH 7.6.
- d) a lysis solution being a commercial solution from the Quick-RNA™ MiniPrep kit (Zymo Research®, USA),
- e) a support, said support being a microplate functionalized with streptavidin or avidin,
- f) a solution containing an anti-digoxigenin antibody, said anti-digoxigenin antibody being bound to horseradish peroxidase (HRP),
- g) a chromogenic substrate, said chromogenic substrate being 3,3',5,5'-Tetramethylbenzidine (TMB),
- h) a positive control, said positive control being a synthetic nucleic acid molecule complementary to said signal probe and said capture probe,
- i) a negative control, said negative control being a synthetic nucleic acid molecule non-complementary to said signal probe and said capture probe, said capture probes being kept freeze-dried on said support, said signal probes being kept in said hybridization solution.

Another aspect of this fifth aspect also concerns a kit for the detection of toxinogenic cyanobacteria of the genus *Anabaena*, said kit containing:
- a) at least one pair of probes specific to toxinogenic cyanobacteria of the genus *Anabaena*, the sequences of said probes being selected from x elements of one of the following sets:
  - (SEQ ID NO: 27, SEQ ID NO: 28 and SEQ ID NO: 29)
  - (SEQ ID NO: 30, SEQ ID NO: 31 and SEQ ID NO: 32)
  - (SEQ ID NO: 33, SEQ ID NO: 34 and SEQ ID NO: 35)
  - (SEQ ID NO: 36, SEQ ID NO: 37, SEQ ID NO: 38 and SEQ ID NO: 39)
  - (SEQ ID NO: 40, SEQ ID NO: 41 and SEQ ID NO: 42)
  - (SEQ ID NO: 43, SEQ ID NO: 44 and SEQ ID NO: 45)
  - (SEQ ID NO: 46, SEQ ID NO: 47 and SEQ ID NO: 48)
  - (SEQ ID NO: 49, SEQ ID NO: 50 and SEQ ID NO: 51)
  - (SEQ ID NO: 52, SEQ ID NO: 53 and SEQ ID NO: 54)
  - (SEQ ID NO: 55 and SEQ ID NO: 56)
  - (SEQ ID NO: 57, SEQ ID NO: 58 and SEQ ID NO: 59)
  - (SEQ ID NO: 60, SEQ ID NO: 61 and SEQ ID NO: 62)

x being 2, 3 or 4,
or the sequences of said probes having at least 92% identity with the aforementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62,
one probe of said pair being a capture probe linked to at least one attachment molecule positioned at 3' or 5' of its sequence and the other probe of said pair being a signal probe linked to at least one signal molecule positioned at 3' or 5' of its sequence,
said capture probe and said signal probe being capable of hybridizing with the ribosomal nucleic acid of a toxinogenic cyanobacteria of the genus *Anabaena*,
said attachment molecule being a biotin molecule,
said signal molecule being digoxigenin, b) a hybridization solution containing 0.3M NaCl, 0.08M Tris-HCl and 0.04% SDS and pH 8,
c) a washing solution containing 0.1M K$_2$PO$_4$, 0.1M KH$_2$PO$_4$ and 0.1M KCl and is pH 7.6.
d) a lysis solution being a commercial solution from the Quick-RNA™ MiniPrep kit (Zymo Research®, USA),
e) a support, said support being a microplate functionalized with streptavidin or avidin,
f) a solution containing an anti-digoxigenin antibody, said anti-digoxigenin antibody being bound to horseradish peroxidase (HRP),
g) a chromogenic substrate, said chromogenic substrate being 3,3',5,5'-Tetramethylbenzidine (TMB),
h) a positive control, said positive control being a synthetic nucleic acid molecule complementary to said signal probe and said capture probe,
i) a negative control, said negative control being a synthetic nucleic acid molecule non-complementary to said signal probe and said capture probe,
said capture probes being kept freeze-dried on said support,
said signal probes being kept in said hybridization solution.

Another aspect of this fifth aspect also concerns a kit for the detection of toxinogenic cyanobacteria of the genus *Planktothrix*, said kit containing:
a) at least one pair of probes specific to toxinogenic cyanobacteria of the genus *Planktothrix*, the sequences of said probes being selected from x elements of one of the following sets:
   (SEQ ID NO: 63, SEQ ID NO: 64, SEQ ID NO: 65 and SEQ ID NO: 66)
   (SEQ ID NO: 67, SEQ ID NO: 68 and SEQ ID NO: 69)
x being 3 or 4,
or the sequences of said probes having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69,
one probe of said pair being a capture probe linked to at least one attachment molecule positioned at 3' or 5' of its sequence and the other probe of said pair being a signal probe linked to at least one signal molecule positioned at 3' or 5' of its sequence,
said capture probe and said signal probe being capable of hybridizing with the ribosomal nucleic acid of a toxinogenic cyanobacteria of the genus *Planktothrix*,
said attachment molecule being a biotin molecule,
said signal molecule being digoxigenin,
b) a hybridization solution containing 0.3M NaCl, 0.08M Tris-HCl and 0.04% SDS and pH 8,
c) a washing solution containing 0.1M K$_2$PO$_4$, 0.1M KH$_2$PO$_4$ and 0.1M KCl and is pH 7.6.
d) a lysis solution being a commercial solution from the Quick-RNA™ MiniPrep kit (Zymo Research®, USA),
e) a support, said support being a microplate functionalized with streptavidin or avidin,
f) a solution containing an anti-digoxigenin antibody, said anti-digoxigenin antibody being bound to horseradish peroxidase (HRP),
g) a chromogenic substrate, said chromogenic substrate being 3,3',5,5'-Tetramethylbenzidine (TMB),
h) a positive control, said positive control being a synthetic nucleic acid molecule complementary to said signal probe and said capture probe,
i) a negative control, said negative control being a synthetic nucleic acid molecule non-complementary to said signal probe and said capture probe,
said capture probes being kept freeze-dried on said support,
said signal probes being kept in said hybridization solution.

A sixth aspect of the invention concerns devices for the detection of toxinogenic cyanobacteria.

Thus, according to this sixth aspect, the invention concerns a device consisting of a support comprising probes specific to toxinogenic cyanobacteria of the genus *Microcystis* for the implementation of a method for the detection of toxinogenic cyanobacteria in a sample likely to contain at least one toxinogenic cyanobacteria of the genus *Microcystis*, said probes having a sequence selected from the sequences:
   SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19 or sequences having at least 92% identity with the above sequences SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, each probe being linked or capable of being linked to at least one attachment molecule positioned 3' or 5' from its sequence,
   said probes being capable of hybridizing with the ribosomal nucleic acid of a toxinogenic cyanobacteria of the genus *Microcystis* optionally present in said sample to form a complex.

In the same way, the invention also relates to a device consisting of a support, as described above according to embodiment A, additionally comprising probes specific to toxinogenic cyanobacteria of the genus *Aphanizomenon* for the implementation of a method for detecting toxinogenic cyanobacteria in a sample likely to contain at least one toxinogenic cyanobacteria of the genus *Microcystis* and/or *Aphanizomenon*, said probes having a sequence selected from the sequences:
   SEQ ID NO: 20, SEQ ID NO: 21, SEQ ID NO: 22, SEQ ID NO: 23, SEQ ID NO: 24 or the sequence of said probe having at least 92% identity with the above SEQ ID NO: 20, SEQ ID NO: 21, SEQ ID NO: 22, SEQ ID NO: 23, SEQ ID NO: 24,
   each probe being linked or capable of being linked to at least one attachment molecule positioned 3' or 5' from its sequence,
   said probes being capable of hybridizing with the ribosomal nucleic acid of a toxinogenic cyanobacteria of the genus *Microcystis* and/or *Aphanizomenon* optionally present in said sample to form a complex.

In the same way, the invention also concerns one of the devices consisting of a support, as described above according to embodiments A or B, comprising in addition, probes specific to toxinogenic cyanobacteria of the genus *Dolichospermum* for the implementation of a method for detecting toxinogenic cyanobacteria in a sample likely to contain at least one toxinogenic cyanobacteria of the genus *Microcystis* and/or *Dolichospermum*, the said probes having a sequence chosen from the sequences:
   SEQ ID NO 25, SEQ ID NO 26 or the sequence of said probe having at least 92% identity with the abovementioned sequences SEQ ID NO 25, SEQ ID NO 26,
   each probe being linked or capable of being linked to at least one attachment molecule positioned 3' or 5' from its sequence, said probes being capable of hybridizing with the ribosomal nucleic acid of a toxinogenic cyanobacteria of the genus *Dolichospermum* optionally present in said sample to form a complex.

In the same way, the invention also concerns one of the devices consisting of a support, as described above according to embodiments A, B or C, comprising in addition, probes specific to toxinogenic cyanobacteria of the genus *Anabaena* for the implementation of a method for detecting toxinogenic cyanobacteria in a sample likely to contain at least one toxinogenic cyanobacteria of the genus *Microcystis* and/or *Anabaena*, the said probes having a sequence chosen from the sequences:

SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62 or the sequence of said probe having at least 92% identity with the abovementioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62, each probe being linked or capable of being linked to at least one attachment molecule positioned 3' or 5' from its sequence, said probes being capable of hybridizing with the ribosomal nucleic acid of a toxinogenic cyanobacteria of the genus *Anabaena* optionally present in said sample to form a complex.

In the same way, the invention also concerns one of the devices consisting of a support, as described above according to embodiments A, B, C or D, comprising in addition, probes specific to toxinogenic cyanobacteria of the genus *Planktothrix* for the implementation of a method for the detection of toxinogenic cyanobacteria in a sample likely to contain at least one toxinogenic cyanobacteria of the genus *Microcystis* and/or *Planktothrix*, said probes having a sequence selected from the sequences:

SEQ ID NO: 63, SEQ ID NO: 64, SEQ ID NO: 65, SEQ ID NO: 66, SEQ ID NO: 67, SEQ ID NO: 68, SEQ ID NO: 69 or the sequence of said probe having at least 92% identity with the abovementioned sequences SEQ ID NO: 63, SEQ ID NO: 64, SEQ ID NO: 65, SEQ ID NO: 66, SEQ ID NO: 67, SEQ ID NO: 68, SEQ ID NO: 69, each probe being linked or capable of being linked to at least one attachment molecule positioned 3' or 5' from its sequence, said probes being capable of hybridizing with the ribosomal nucleic acid of a toxinogenic cyanobacteria of the genus *Planktothrix* optionally present in said sample to form a complex.

In the same way, the invention also concerns one of the devices consisting of a support, as described above according to embodiments A, B, C, D or E, comprising in addition, probes specific to toxinogenic cyanobacteria of the genus *Nodularia* for the implementation of a method of detecting toxinogenic cyanobacteria in a sample likely to contain at least one toxinogenic cyanobacteria of the genus *Microcystis* and/or *Nodularia*, the said probes having a sequence chosen from the sequences:

SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77 or the sequence of said probe having at least 92% identity with the abovementioned sequences SEQ ID NO: 70, SEQ ID NO: 71, SEQ ID NO: 72, SEQ ID NO: 73, SEQ ID NO: 74, SEQ ID NO: 75, SEQ ID NO: 76, SEQ ID NO: 77, each probe being linked or capable of being linked to at least one attachment molecule positioned 3' or 5' from its sequence, said probes being capable of hybridizing with the ribosomal nucleic acid of a toxinogenic cyanobacteria of the genus *Nodularia* optionally present in said sample to form a complex.

In the same way, the invention also concerns one of the devices consisting of a support, as described above according to embodiments A, B, C, D, E or F, comprising in addition, probes specific to toxinogenic cyanobacteria of the genus *Cylindrospermopsis* for the implementation of a method for detecting toxinogenic cyanobacteria in a sample likely to contain at least one toxinogenic cyanobacteria of the genus *Microcystis* and/or *Cylindrospermopsis*, said probes having a sequence selected from the sequences:

SEQ ID NO: 78, SEQ ID NO: 79, SEQ ID NO: 80 or the sequence of said probe having at least 92% identity with the abovementioned sequences SEQ ID NO: 78, SEQ ID NO: 79, SEQ ID NO: 80, each probe being linked or capable of being linked to at least one attachment molecule positioned 3' or 5' from its sequence, said probes being capable of hybridizing with the ribosomal nucleic acid of a toxinogenic cyanobacteria of the genus *Cylindrospermopsis* optionally present in said sample to form a complex.

As with the first aspect relating to the use, all combinations of embodiments A, B, C, D, E, F and/or G of this sixth aspect can be considered.

The invention also concerns a device consisting of a support comprising probes specific to toxinogenic cyanobacteria of the genus *Aphanizomenon* for the implementation of a method for detecting toxinogenic cyanobacteria in a sample likely to contain at least one toxinogenic cyanobacteria of the genus *Aphanizomenon*, said probes having a sequence selected from the sequences:

SEQ ID NO: 20, SEQ ID NO: 21, SEQ ID NO: 22, SEQ ID NO: 23, SEQ ID NO: 24 or sequences having at least 92% identity with the above SEQ ID NO: 20, SEQ ID NO: 21, SEQ ID NO: 22, SEQ ID NO: 23, SEQ ID NO: 24, each probe being linked or capable of being linked to at least one attachment molecule positioned 3' or 5' from its sequence, said probes being capable of hybridizing with the ribosomal nucleic acid of a toxinogenic cyanobacteria of the genus *Aphanizomenon* optionally present in said sample to form a complex.

The invention also concerns a device consisting of a support comprising probes specific to toxinogenic cyanobacteria of the genus *Dolichospermum* for the implementation of a method for detecting toxinogenic cyanobacteria in a sample likely to contain at least one toxinogenic cyanobacteria of the genus *Dolichospermum*, said probes having a sequence selected from the sequences:

SEQ ID NO: 25, SEQ ID NO: 26 or sequences having at least 92% identity with the above-mentioned sequences SEQ ID NO: 25, SEQ ID NO: 26, each probe being linked or capable of being linked to at least one attachment molecule positioned 3' or 5' from its sequence, said probes being capable of hybridizing with the ribosomal nucleic acid of a toxinogenic cyanobacteria of the genus *Dolichospermum* optionally present in said sample to form a complex.

The invention also concerns a device consisting of a support comprising probes specific to toxinogenic cyanobacteria of the genus *Anabaena* for the implementation of a method for detecting toxinogenic cyanobacteria in a sample likely to contain at least one toxinogenic cyanobacteria of the genus *Anabaena*, said probes having a sequence selected from the sequences:

SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62 or sequences having at least 92% identity with the above-mentioned sequences SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, SEQ ID NO: 45, SEQ ID NO: 46, SEQ ID NO: 47, SEQ ID NO: 48, SEQ ID NO: 49, SEQ ID NO: 50, SEQ ID NO: 51, SEQ ID NO: 52, SEQ ID NO: 53, SEQ ID NO: 54, SEQ ID NO: 55, SEQ ID NO: 56, SEQ ID NO: 57, SEQ ID NO: 58, SEQ ID NO: 59, SEQ ID NO: 60, SEQ ID NO: 61, SEQ ID NO: 62, each probe being linked or capable of being linked to at least one attachment molecule positioned 3' or 5' from its sequence, said probes being capable of hybridizing with the ribosomal nucleic acid of a toxinogenic cyanobacteria of the genus *Anabaena* optionally present in said sample to form a complex.

The invention also relates to a device consisting of a support comprising probes specific to toxinogenic cyanobacteria of the genus *Planktothrix* for the implementation of a method for detecting toxinogenic cyanobacteria in a sample likely to contain at least one toxinogenic cyanobacteria of the genus *Planktothrix*, said probes having a sequence selected from the sequences:

SEQ ID NO: 63, SEQ ID NO: 64, SEQ ID NO: 65, SEQ ID NO: 66, SEQ ID NO: 67, SEQ ID NO: 68, SEQ ID NO: 69 or sequences having at least 92% identity with the above sequences SEQ ID NO: 63, SEQ ID NO: 64, SEQ ID NO: 65, SEQ ID NO: 66, SEQ ID NO: 67, SEQ ID NO: 68, SEQ ID NO: 69, each probe being linked or capable of being linked to at least one attachment molecule positioned 3' or 5' from its sequence, said probes being capable of hybridizing with the ribosomal nucleic acid of a toxinogenic cyanobacteria of the genus *Planktothrix* optionally present in said sample to form a complex.

In all embodiments of this sixth aspect and according to a particular embodiment, the said attachment molecule is located 3' from the sequence of the said probe.

In all embodiments of this sixth aspect and according to a particular embodiment, the said attachment molecule can be chosen from a biotin, avidin, streptavidin molecule, a thiol group, an amine group and a carbon.

In all embodiments of this sixth aspect and according to a particularly preferred embodiment, the said attachment molecule is a biotin molecule.

In all embodiments of this sixth aspect and according to a particular embodiment, the said device can be chosen from the group consisting of: a microplate, a glass slide, magnetic balls, electrodes printed in different materials such as carbon or gold.

In all embodiments of this sixth aspect and according to a particular embodiment, the said device can be:

functionalized with streptavidin or avidin and said attachment molecule being a biotin said device being functionalized with an aldehyde group, an epoxy group, a carboxyl group or an isothiocyanate group and said attachment molecule being an amine or carbon group.

said device being functionalized with gold, mercaptosilane or a maleimide moiety and said attachment molecule being a thiol group.

In all the embodiments of this sixth aspect and according to a particular embodiment, the said sample may be a sample of fresh water, brackish water, culture media or cyanobacteria culture produced for commercial purposes.

The figures and following examples will better illustrate the invention, without limiting its scope.

Example 1: Probe Validation a) Growing Conditions

The cyanobacterial cultures used to test the probes described in this invention are listed in Table 1. All the cultures are currently maintained at Microbia Environnement on the business incubation site of the Oceanological Observatory of Banyuls-sur-mer, France. The cultures are maintained in BG11 media proposed by MM Allen and RY Stanier (*Selective isolation of blue-green algae from water and soil, J Gen Microbiol.* 1968 April; 51(2): 203-9) at different temperatures (18 and 20° C.) and under a luminosity intensity of 100 µE m$^{-2}$ s$^{-1}$ with a day: night cycle of 12:12. The BG11 medium is made from fresh or brackish water and is commonly used to cultivate cyanobacteria.

TABLE 1

Toxinogenic cyanobacteria used to test the probes described in the present invention, including class, growth medium and strain number

| Genus | CLASS | Cultural environment | Strain identification number |
|---|---|---|---|
| *Anabaena* | Cyanophyceae | BG11 | TCC79 |
| *Aphanizomenon* | Cyanophyceae | BG-11 | PCC 7909 |

TABLE 1-continued

Toxinogenic cyanobacteria used to test the probes described in the present invention, including class, growth medium and strain number

| Genus | CLASS | Cultural environment | Strain identification number |
|---|---|---|---|
| Microcystis | Cyanophyceae | BG-11 | 728.11 MNHN, FL |
| Nodularia | Cyanophyceae | BG-11 | 1657, 1655 |
| Planktothrix | Cyanophyceae | BG-11 | TCC779, TCC83.1, |
| Planktothrix | Cyanophyceae | BG-11 | TCC14, TCC24 | b) RNA Preparation

A known number of cells is filtered on a polycarbonate membrane with a porosity of 0.1 µm (Whatman® Nuclepore Track-Etched Membranes) using a filtration system and a vacuum pump. 1 ml TRI-Reagent (Sigma®, France) or 1 ml lysis buffer from the Quick-RNA™ MiniPrep kit (Zymo Research®, USA) is immediately added to each filtrate and homogenised. Cellular lysis is completed by adding beads (0.5 mm, Zymo Research®, USA) and applying vibration with a Tissue Lyser Mill (Qiagen®, USA) for 2 minutes at maximum speed.

Total RNAs are isolated using the Quick-RNA™ Mini-Prep kit or by extraction with TriReagent. The RNA concentration is measured using a Nanodrop spectrophotometer (Peqlab®, Erlangen, Germany). The samples are either used immediately or stored at −80° C. until use.

The total RNAs of 10,000 to 500,000 cells were extracted in 3 replicates from different cultures and different strains of toxinogenic cyanobacteria. The RNA concentration values obtained were used to obtain an average value of RNA content per cell under optimal culture conditions (FIG. 1). Ayers et al (2005) assume that the exponential growth obtained under optimal culture growth conditions corresponds approximately to what happens during an efflorescence.

c) Design and Synthesis of Nucleic Probes

The probes of the present invention are synthesized according to the methods known to man of the art. They are rehydrated in ultrapure water to obtain a mother solution with a concentration of 100 µM. Oligonucleotide probes have been designated and tested for the toxinogenic cyanobacteria Anabaena, Aphanizonmenon, Nodularia, Microcystis and Planktothrix. (Table 2). The sequence probes SEQ ID NO: 28 and SEQ ID NO: 29 were used to test the Positive Control (PC) and Negative Control (NC).

TABLE 2

Oligonucleotide probes targeting Anabaena, Aphanizonienon Noduiaria, Microcystis and Planktothrix.

| Species | Pair of probes tested (SEQ ID NO) | Sequences (5'-3') | Tm | GC (%) | Sequences (5'-3') | Tm | GC (%) |
|---|---|---|---|---|---|---|---|
| PC (positif control) | 28/29 | GAC TCT TTA ACA GCA GAC ATA CAA TGC CAC (SEQ ID NO: 28) | 60 | 43 | CTG CGG ACC CTT TAC GCC CAA TC (SEQ ID NO: 29) | 60 | 61 |
| NC (negative control) | 28/29 | GAC TCT TTA ACA GCA GAC ATA CAA TGC CAC (SEQ ID NO: 28) | 60 | 43 | CTG CGG ACC CTT TAC GCC CAA TC (SEQ ID NO 29) | 60 | 61 |
| Planktothrix sp | 67/68 | CTTACGGCAC TCTCCCCTTTC AAGG (SEQ ID NO: 67) | 61 | 56 | AGATTCCAGA GATGTCAAGT CCTGGTA (SEQ ID NO: 68) | 58 | 44 |
| Anabaena sp | 28/29 | GAC TCT TTA ACA GCA GAC ATA CAA TGC CAC (SEQ ID NO: 28) | 60 | 43 | CTG CGG ACC CTT TAC GCC CAA TC (SEQ ID NO 29) | 60 | 61 |
| Anabaena sp | 33/34 | CTC TGC CCC GAC CAC ACT CTA GCT TT (SEQ ID NO: 33) | 63 | 58 | GTAGTTT CCA CTG CTC TTA TTT GGT (SEQ ID NO: 34) | 54 | 40 |
| Aphanizomenon sp | 20/21 | AAT TCC CTC TGC CCC GAC CAC ACT (SEQ ID NO: 20) | 61 | 58 | CTA GCT TTG TAG TTT CCA CTG CTC TT (SEQ ID NO: 21) | 56 | 42 |
| Anabaena sp | 40/41 | GGC ACT TCC ATC TTT CAA YAG AAT TCG (SEQ ID NO: 40) | 57 | 41 | ACC ACC TGT GTT CAC GTT CCC GAA (SEQ ID NO: 41) | 59 | 54 |

TABLE 2-continued

Oligonucleotide probes targeting Anabaena, Aphanizonienon Noduiaria, Microcystis and Planktothrix.

| Species | Pair of probes tested (SEQ ID NO) | Sequences (5'-3') | Tm | GC (%) | Sequences (5'-3') | Tm | GC (%) |
|---|---|---|---|---|---|---|---|
| Anabaena sp | 46/47 | TTC ACG CTC CCG AAG GCA CTC CTA (SEQ ID NO: 46) | 61 | 58 | GAC GAC AGC CAT GCA CCA CCT GTG (SEQ ID NO: 47) | 63 | 63 |
| Microcystis sp | 1/2 | GCCAATTAGG TTTCACCTBGC GGC AC (SEQ ID NO: 1) | 61 | 54 | ATCGGGTATT AGCAGTCGTT TCCAACTG (SEQ ID NO: 2) | 60 | 46 |
| Nodularia sp | 76/77 | CTG AGC TAC GGT TTT GTG AGA TTT GCA TC (SEQ ID NO: 76) | 60 | 45 | ACA TTG CTG TGT AGC TGC CCT TTG TCC GT (SEQ ID NO: 77) | 63 | 52 | d) Sandwich Hybridization Test

Probe specificity and sensitivity tests are carried out by sandwich hybridization. The biotinylated capture probe (SEQ ID NO: 28; SEQ ID NO: 33; SEQ ID NO: 20; SEQ ID NO: 40; SEQ ID NO: 46; SEQ ID NO: 76; SEQ ID NO: 1; SEQ ID NO: 67) is coupled to a neutravidin-functionalized solid support and a signal probe coupled to a digoxigenin molecule (SEQ ID NO: 29; SEQ ID NO: 34; SEQ ID NO: 21; SEQ ID NO: 41; SEQ ID NO: 47; SEQ ID NO: 77; SEQ ID NO: 2; SEQ ID NO: 68). The signal probe is placed in the presence of nucleic acid molecules that may contain the target ribosomal nucleic acid complementary to the capture and signal probes. The mixture is placed in the presence of the capture probe which will hybridize to its complementary targets forming a hybrid of three molecules: the capture probe, the signal probe and the target ribosomal nucleic acid. The hybrid complexes are revealed by the digoxigenin attached to the signal probe thanks to a colorimetric reaction initiated by a horseradish peroxidase-type enzyme with its substrate producing a blue colour. The intensity of the colour is proportional to the concentration of the target ribosomal nucleic acid. Using a calibration curve, the target nucleic acid concentration is associated with a number of toxinogenic cyanobacterial cells present in the sample being analysed.

The complete test is carried out in less than an hour.

The samples for the sandwich hybridization test are prepared as follows:

The culture cells are collected by filtration on a polycarbonate membrane (0.5 µm porosity; Whatman® Nuclepore Track-Etched Membranes). The membranes are transferred to a tube (Eppendorf®) containing 1 ml of TriReagent solution (Sigma®, France) and heated at 65° C. for 10 minutes. They are then subjected to the mill in the presence of 0.5 mm beads (Bashing Beads, Zymo Research®) for 1 minute at maximum speed. The supernatant is collected and 200 µL of chloroform is added and mixed. The samples are centrifuged for 15 minutes at 4° C. and the aqueous phase is transferred to a clean tube. 0.5 volume of isopropanol is added and the mixture is incubated for 1 hour at −20° C. After 20 minutes centrifugation at 9000 g at 4° C., the supernatant is removed and the pellet is washed twice with 70% ethanol. The pellets are dried in the open air and then solubilised in 50 to 100 µL of ultra pure water. The quantity and quality of RNA obtained are measured by spectrophotometry with NanoDrop (Thermo Scientific®) or NanoVue (Biochrom Spectrophotometers®). The total RNAs are fragmented using a solution comprising 40 mM Trizma base, pH 8.0/100 mM KOAc/30 mM MgOAc for 10 minutes at 65° C. before hybridization.

Figure 2:
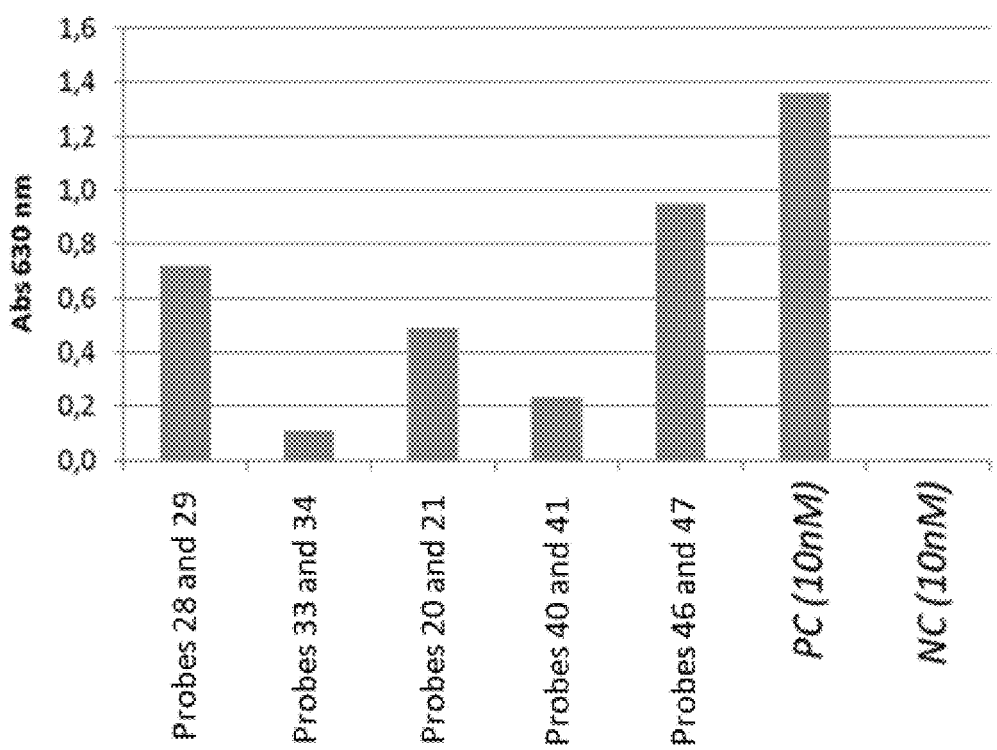
FIG. 2: Specificity test of probes targeting *Anabaena* and/or *Aphanizomenon*. Hybridization of 50 ng RNA extracted from an *Anabaena* culture, 10 nM positive control (PC, complementary synthetic DNA) or 10 nM negative control (NC, non-complementary synthetic DNA) with the following pairs of probes: SEQ ID NO 28 and SEQ ID NO: 29, SEQ ID NO: 33 and SEQ ID NO: 34 or SEQ ID NO: 20 and SEQ ID NO: 21, SEQ ID NO: 40 and SEQ ID NO: 41, SEQ ID NO: 46 and SEQ ID NO: 47.

Hybridization steps are performed in a standard 96-well microplate (Nunc®, Denmark) functionalized with NeutrAvidin solution at 1 µg ml-1, incubated for 24 hours and washed with a saline solution such as PBS 1× ($K_2PO_4$, 0.1 M; $KH_2PO_4$, 0.1 M; KCl, 0.1 M, pH 7.6). The first hybridization step consists of mixing 200 ng RNA with the hybridization buffer (0.3 M NaCl, 0.08 M Tris-HCl, 0.04% SDS, pH 8) to a final volume of 100 µL containing the signal probe (1 mM), and heating at 60° C. for 10 minutes. The samples are then cooled and a final 0.05 M EDTA solution is added. The mixture is added to the microplate wells and incubated for 10 minutes at 60° C. The microplate is washed three times with a saline solution such as PBX 1×. 100 µL of anti-DIG-HRP antibody at a concentration of 75 mU/ml is then added and incubated for 15 minutes at room temperature. 100 µL of TMB is added and the absorbance is measured after 15 minutes of reaction at a wavelength of 630 nm. Then 50 µl of $H_2SO_4$ 10% is added and the absorbance is immediately measured at a wavelength of 450 nm. Each step of the development is carried out at room temperature with constant agitation and shielded from light. Screening of the following pairs of probes: SEQ ID NO: 28 and SEQ ID NO: 29, SEQ ID NO: 33 and SEQ ID NO: 34 and SEQ ID NO: 20 and SEQ ID NO: 21 and SEQ ID NO: 40 and SEQ ID NO: 41 or SEQ ID NO: 46 and SEQ ID NO: 47 was conducted at the same hybridization temperature. The results were compared with those obtained on the positive (PC) and negative (NC) controls (FIG. 2). The positive control is a synthetic DNA fragment of 10 nM concentration complementary to both probes and the negative control is a synthetic DNA fragment of 10 nM concentration non-complementary to both probes. In general, the results obtained by sandwich hybridisation tests with samples from *Anabaena* cultures show good reactivity of the probes with the total RNA extracted. The SEQ ID NO: 20 and SEQ ID NO: 21 designated to recognise the genus *Aphanizomenon* cross-react with the *Anabaena* strain used. This result is explained by uncertainties in the current classification which is being revised as supported by Gugger et al. and Komarec who showed confusion in the classification of the genus *Anabaena* and *Aphanizomenon* (Gugger M., Lyra C., Henriksen P., Coute A., Humbert J-C. and Sivonen K. (2002). "Phylogenetic comparison of the cyanobacterial genera *Anabaena* and *Aphanizomenon*." International Journal of Systematic and Evolutionary Microbiology, 52, 1867-1880; J Komarec (2010). "Modern taxonomic revision of planktic nostocacean cyanobacteria: a short review of genera." *Hydrobiologia* 639:231-243).

For these reasons, the probes SEQ ID NO: 46 and SEQ ID NO: 47; and SEQ ID NO: 76 and SEQ ID NO: 77; and SEQ ID NO: 1 and SEQ ID NO: 2; and SEQ ID NO: 67 and SEQ ID NO: 68 have been chosen to produce the calibration curves.

e) Calibration Curves to Quantify Target RNAs

Figure 3:
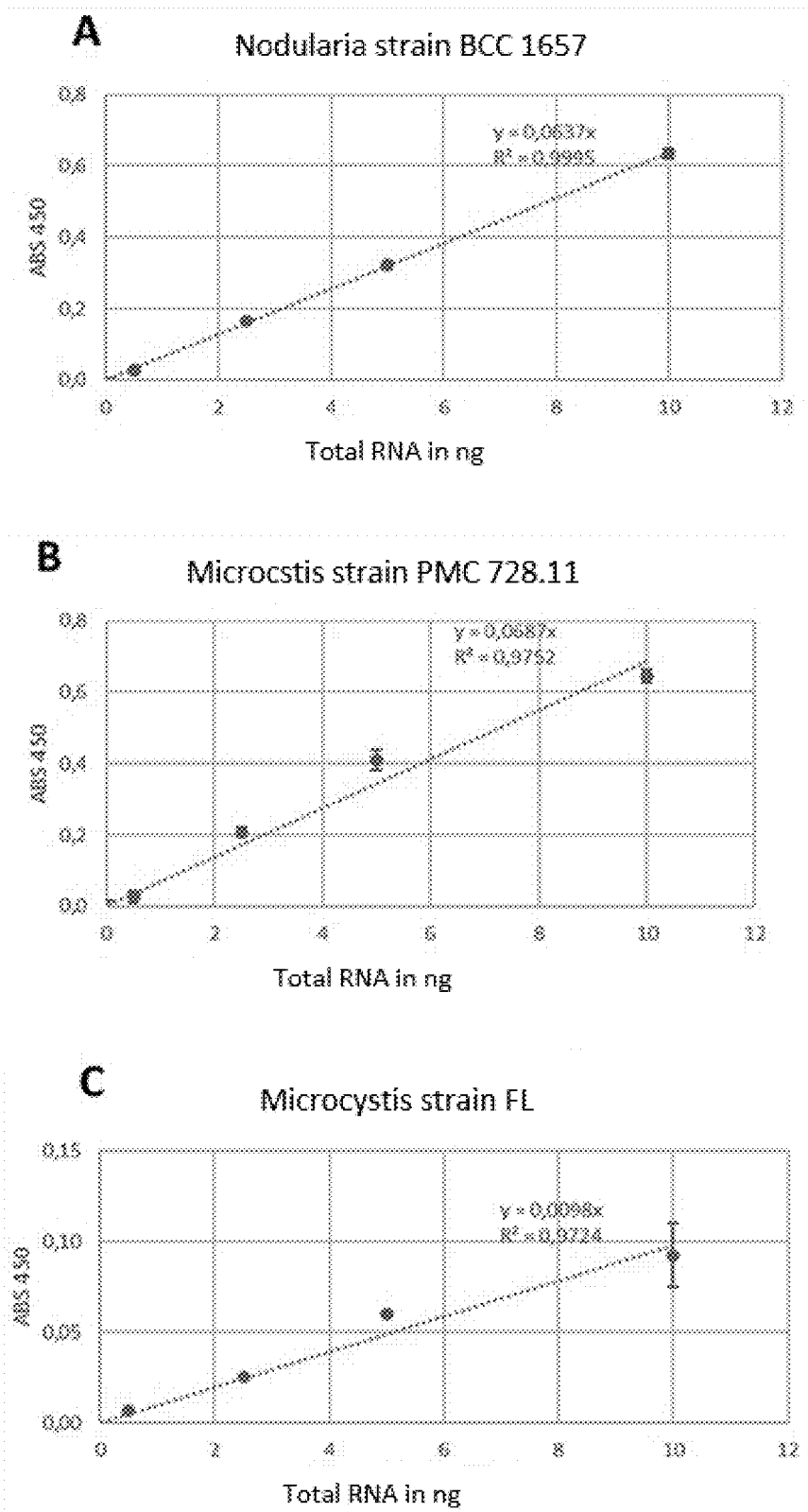
FIG. 3: Correspondence between RNA concentration (pg/μL) and absorbance at 450 nm: *Nodularia* (BCC1657 strain) and sequence probes SEQ ID NO: 76 and SEQ ID NO: 77 (A.), *Microcystis* (728.11 strain) and sequence probes SEQ ID NO: 1 and SEQ ID NO: 2 (B.); *Microcystis* (FL strain) and sequence probes SEQ ID NO: 1 and SEQ ID NO: 2 (C.).); *Planktothrix* (TCC strain 24) and sequence probes SEQ ID NO: 67 and SEQ ID NO: 68 (D.); *Planktothrix* (TCC strain 83.1) and sequence probes SEQ ID NO: 67 and SEQ ID NO: 68 (E.); *Planktothrix* (TCC strain 14) and sequence probes SEQ ID NO: 67 and SEQ ID NO: 68 (F.); *Planktothrix* (TCC strain 779) and sequence probes SEQ ID NO: 67 and SEQ ID NO: 68 (G.).
Figure 3:
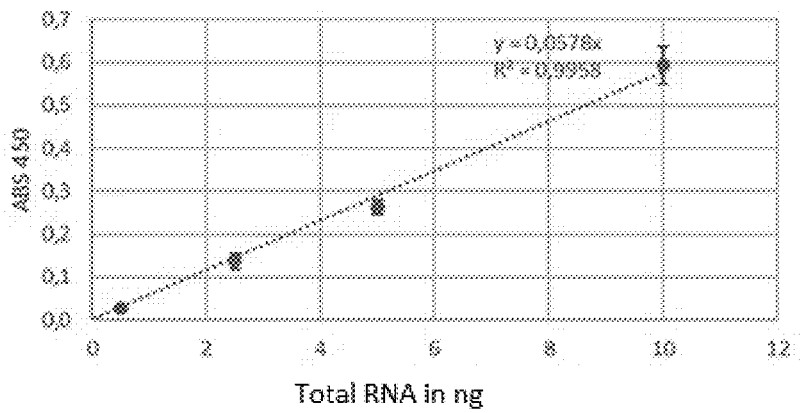
Figure 3:
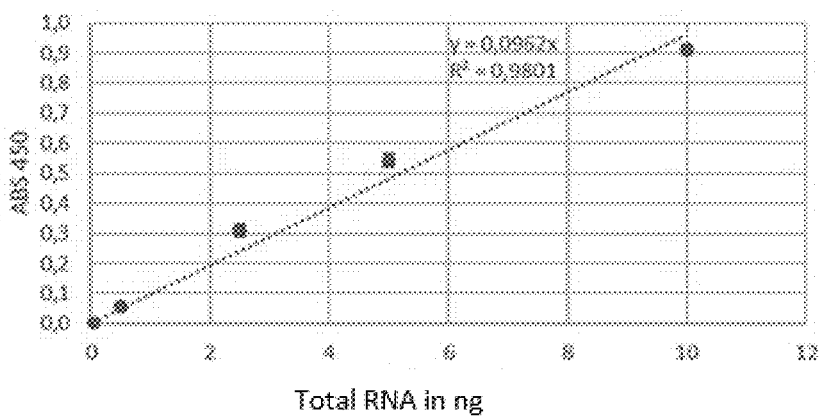
Figure 3:
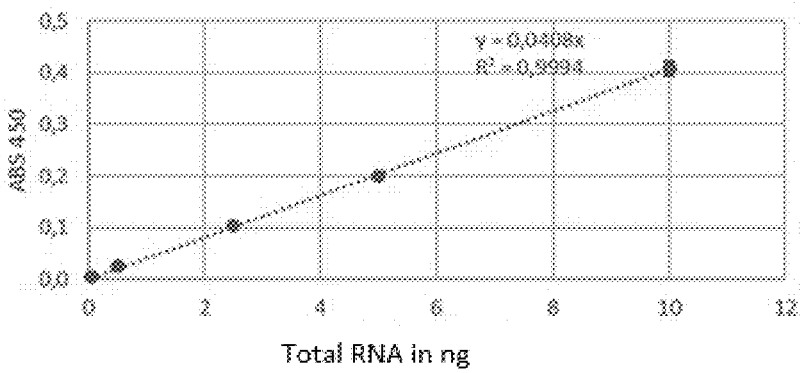
Figure 3:
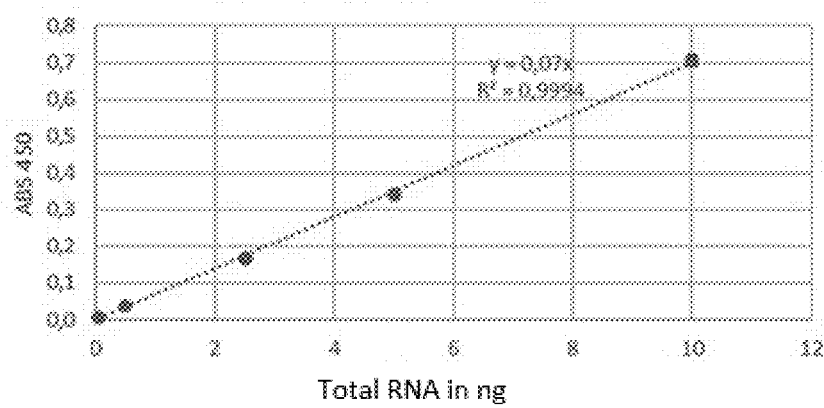

The best combinations of probes were used to establish the calibration curves. These calibration curves were developed from RNAs extracted from a determined number of algal cells from a culture as described in parts a) and b) of this example. A dilution of the RNAs was performed from 0.05 ng to 10 ng. Hybridization steps are performed as in part d) of this example. FIG. 3 shows the calibration curves obtained with the serial dilution at an absorbance of 450 nm for the following toxinogenic cyanobacteria:

*Nodularia* (strain BCC 1657); probe pair tested: SEQ ID NO: 76 and SEQ ID NO: 77 (A.)
*Microcystis* (strain 728.11); probe pair tested: SEQ ID NO: 1 and SEQ ID NO: 2 (B.)
*Microcystis* (FL strain); probe pair tested: SEQ ID NO: 1 and SEQ ID NO: 2 (C.)
*Planktothrix* (strain TCC 24); probe pair tested: SEQ ID NO: 67 and SEQ ID NO: 68 (D.)
*Planktothrix* (strain TCC 83.1); probe pair tested: SEQ ID NO: 67 and SEQ ID NO: 68 (E.)
*Planktothrix* (TCC 14 strain); probe pair tested: SEQ ID NO: 67 and SEQ ID NO: 68 (F.)
*Planktothrix* (strain TCC 779); probe pair tested: SEQ ID NO: 67 and SEQ ID NO: 68 (G.).

The result shows a minimum detection threshold between 0.05 and 0.5 ng total RNA for each genus tested (FIG. 3).

Example 2: Detection of Cyanobacteria from Natural Environmental Samples

Implementation comparisons between the present invention and the traditional technique based on the identification and counting of cyanobacteria b microscopy with the Utermöhl method (1958) have been carried out on natural samples.

a) Detection of *Microcystis* on a Natural Body of Water

*Microcystis* monitoring was carried out on a basin located in Spain. Water samples were collected once a week on the surface. In parallel, a 50 ml sub-sample was collected, fixed to Lugol, and sedimented for 24 hours.

Microscopic counting according to the Utermöhl method, a reference method (Utermöhl VH, 1931. Neue wege in der quantitativen erfassung des planktons. Verh Int Verein Theor Angew Limnol 5: 567-595), required a 12-hour sedimentation stage followed by a careful counting of the cells under the microscope. The entire Utermöhl method was carried out in 24 to 48 hours. This method makes it possible to detect the presence or absence of toxinogenic cyanobacteria cells of the genus *Microcystis* and thus to determine the number of toxinogenic cyanobacteria cells of the genus *Microcystis*. However, this method cannot determine the activity of cells of toxinogenic cyanobacteria of the genus *Microcystis*.

The embodiment of the present invention was carried out in less than one hour and made it possible to determine the activity of cells of toxinogenic cyanobacteria of the genus *Microcystis* as well as the average number of living and active cells.

For each hybridization test, 10 millilitres of water were immediately filtered through polycarbonate membranes (porosity 0.1 µm; Whatman® Nuclepore Track-Etched Membranes). The membranes were transferred to a tube (Eppendorf®) containing 2 ml of ZR lysis solution (ZymoResearch®, USA) and heated at 65° C. for 10 minutes. They are then subjected to the mill in the presence of 0.5 mm beads (Bashing Beads, ZymoResearch®) for 1 minute at maximum speed. RNA extraction is performed with the QuickRNA® kit (ZymoResearch®, USA) with an elution volume of 180 µl of ultrapure water. The total RNAs are fragmented using a solution comprising 40 mM Trizma base, pH 8.0/100 mM KOAc/30 mM MgOAc) for 10 minutes at 65° C. prior to hybridization.

Figure 4:
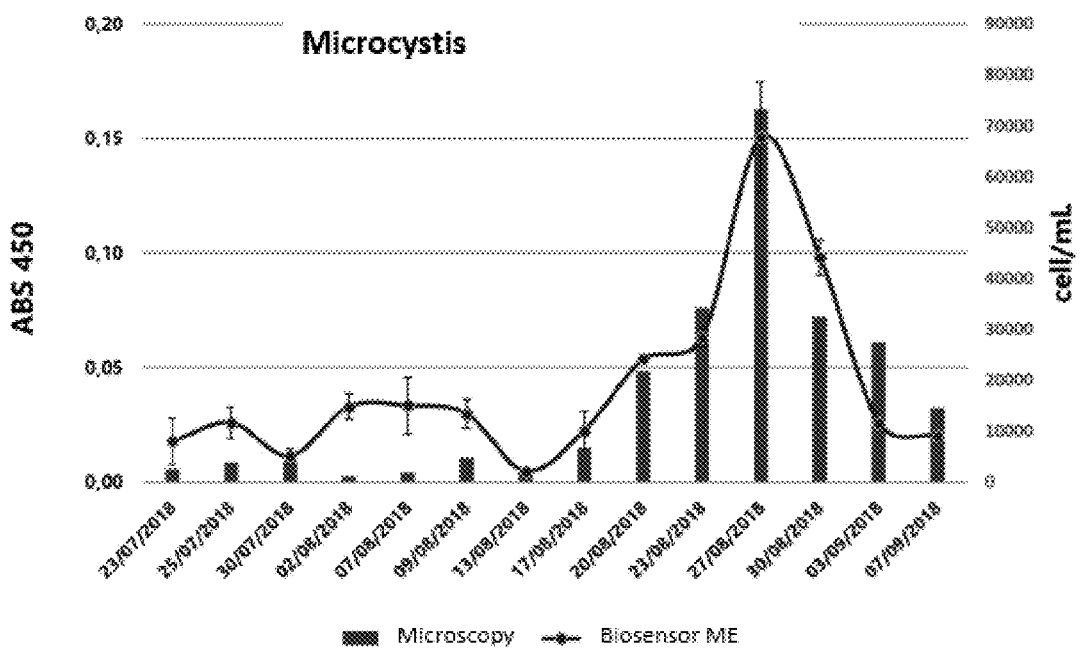
FIG. 4: Comparison of *Microcystis* detection by microscopy cell counts (cells/mL) and signals from the sandwich hybridization test according to the invention read at 450 nm (BIOCAPTER data). The results are reported per 1 mL of sample.

The hybridization steps are performed in a standard 96-well microplate (Nunc®, Denemark) functionalized with NeutrAvidin solution at 1 µg ml-1, incubated for 24 hours with the sequence probe SEQ ID NO: 1 at a concentration of 1 µM. After 24 hours the microplate is washed with a saline solution such as PBS 1× ($K_2PO_4$, 0.1 M; $KH_2PO_4$, 0.1 M; KCl, 0.1 M, pH 7.6). The RNA eluate is mixed with the hybridization buffer (0.3 M NaCl, 0.08 M Tris-HCl, 0.04% SDS, pH 8) to a final volume of 300 µl containing the sequence signal probe SEQ ID NO: 2 (1 mM). The hybridization mix is heated at 60° C. for 10 minutes, then a final 0.05 M EDTA solution is added. 100 µl of the mixture is dispensed into 3 wells of the microplate and incubated for 10 minutes at 60° C. The microplate is washed three times with a saline solution such as PBX 1×. 100 µL of anti-DIG-HRP antibody at a concentration of 75 mU/ml is then added and incubated for 15 minutes at room temperature. 100 µL of TMB are added and the absorbance is measured after 15 minutes of reaction at a wavelength of 630 nm. Then 50 µL of $H_2SO_4$ 10% are added and the absorbance is immediately measured at a wavelength of 450 nm. Each step of the development is carried out at room temperature with constant agitation and shielded from light. In general, the results obtained by sandwich hybridization tests with naturally contaminated environmental samples are in agreement with the counts obtained by microscopy. However, the present invention makes it possible to obtain the results in less than one hour, compared with 24 to 48 hours for the counting method. The hybridization test has allowed the detection of *Microcystis* with the lowest microscopically determined concentration of 982 cells/mL in the environmental sample (FIG. 4). The known state of the art has never reported the detection of this type of cyanobacteria at such low cell equivalent thresholds in environmental samples. This threshold represents neither the limit of quantification nor the limit of detection in the environmental medium, which are well below what is shown by this environmental monitoring of *Microcystis* activity.

b) Detection of *Planktothrix* on a Natural Basin of Water

The monitoring of *Planktothrix* was carried out on a basin of water located in Spain from 23 July to 7 Sep. 2018. Water samples were collected once a week on the surface. At the same time, a 50 ml sub-sample was collected, fixed to Lugol, and sedimented for 24 hours. Microscopic counting according to the Utermöhl method required a 12-hour sedimentation step followed by a careful counting of the cells under the microscope. The entire Utermöhl method was carried out in 24 to 48 hours. This method makes it possible to detect the presence or absence of cells of toxinogenic cyanobacteria of the genus *Planktothrix* and thus to determine the number of cells. However, this method cannot determine the activity of cells of toxinogenic cyanobacteria of the genus *Planktothrix*.

The embodiment of the present invention was carried out in less than one hour and made it possible to determine the activity of the cells of toxinogenic cyanobacteria of the genus *Planktothrix* as well as the number of cells.

For each hybridization test, 10 millilitres of water are immediately filtered through polycarbonate membranes (porosity 0.1 μm; Whatman® Nuclepore Track-Etched Membranes). The membranes are transferred to a tube (Eppendorf®) containing 2 ml ZR lysis solution (ZymoResearch®, USA) and heated at 60° C. for 10 minutes. They are then subjected to the mill in the presence of 0.5 mm beads (Bashing Beads, ZymoResearch®) for 2 minutes at maximum speed. RNA extraction is performed with the QuickRNA® kit (ZymoResearch®, USA) with an elution volume of 180 μl of ultrapure water. The total RNAs are fragmented using a solution comprising 40 mM Trizma base, pH 8.0/100 mM KOAc/30 mM MgOAc) for 10 minutes at 65° C. prior to hybridization and the samples are stabilized with a 0.05% EDTA solution.

The hybridization steps are performed in a standard 96-well microplate (Nunc®, Denemark) functionalized with NeutrAvidin solution at 1 μg/ml, incubated for 24 hours with the sequence probe SEQ ID NO: 67 at a concentration of 1 μM. After 24 hours the microplate is washed with a saline solution such as PBS 1× ($K_2PO_4$, 0.1 M; $KH_2PO_4$, 0.1 M; KCl, 0.1 M, pH 7.6). The eluate with RNA is mixed with the hybridization buffer (0.3 M NaCl, 0.08 M Tris-HCl, 0.04% SDS, pH 8) to a final volume of 300 μl containing the sequence probe SEQ ID NO: 68 at a concentration of 1 μM. The hybridization mix is heated at 60° C. for 10 minutes, then a final 0.05 M EDTA solution is added. 100 μl of the mixture is dispensed into 3 wells of the microplate and incubated for 15 minutes at 60° C. The microplate is washed three times with a saline solution such as PBS 1×. 100 μL of anti-DIG-HRP antibody at a concentration of 75 mU/ml is then added and incubated for 15 minutes at room temperature. 100 μL of TMB are added and the absorbance is measured after 15 minutes of reaction at a wavelength of 630 nm. Then 50 μL of 10% $H_2SO_4$ are added and the absorbance is immediately measured at a wavelength of 450 nm. Each step of the development is carried out at room temperature with constant agitation and shielded from light.

Figure 5:
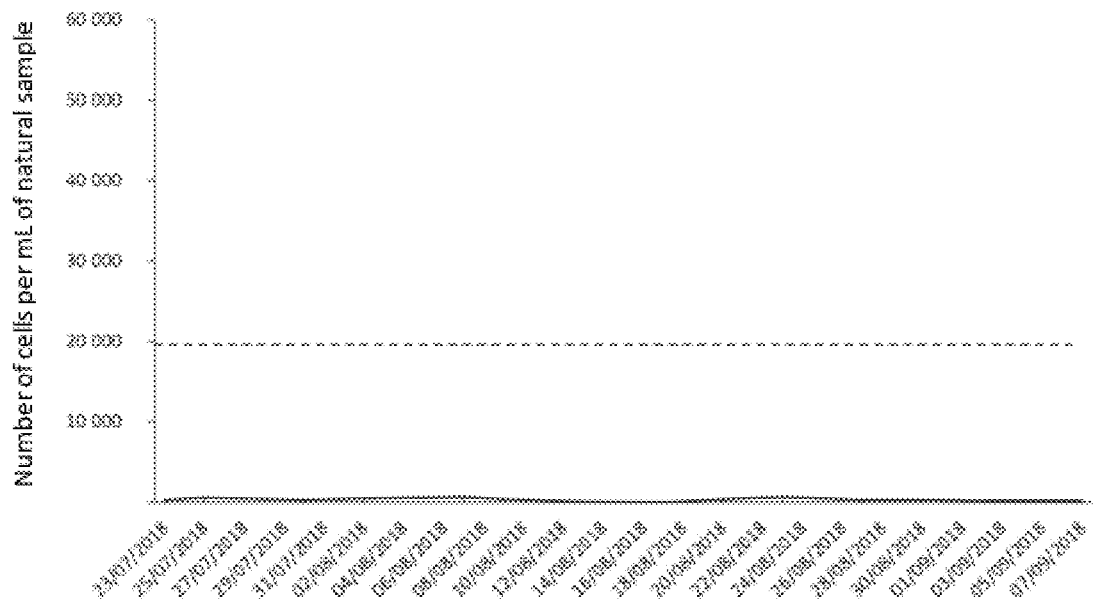
FIG. 5: Comparison of *Planktothrix* detection by microscopy cell counts (cells/mL) and signals from the sandwich hybridization test according to the invention read at 450 nm (BIOCAPTER data).

In general, the results obtained by sandwich hybridization tests with naturally contaminated environmental samples are in agreement with the counts obtained by microscopy. However, the present invention makes it possible to obtain the results in less than one hour, compared with 24 to 48 hours for the counting method. The hybridization test did not detect any *Planktothrix* cells as like the microscopy results which did not identify any *Planktothrix* (FIG. 5).

c) Detection of *Aphanizomenon* on a Natural Basin Water

The monitoring of *Aphanizomenon* was carried out on a basin of water located in France (Occitania) from 25 June to 28 Oct. 2019. Water samples were collected twice a week on the surface. At the same time, a 50 ml sub-sample was collected, fixed to Lugol, and sedimented for 24 hours. Microscopic counting according to the Utermöhl method required a 12-hour sedimentation step followed by a careful counting of the cells under the microscope. The entire Utermöhlmethod was carried out in 24 to 48 hours. This method makes it possible to detect the presence or absence of cells of toxinogenic cyanobacteria of the genus *Aphanizomenon* and thus to determine the number of cells. However, this method cannot determine the activity of cells of toinogenic cyanobacteria of the genus *Aphanizomenon*.

The embodiment of the present invention was carried out in less than one hour and made it possible to determine the activity of the cells of toxinogenic cyanobacteria of the genus *Aphanizomenon* as well as the number of cells.

For each hybridization test, 250 millilitres of water are immediately filtered through polycarbonate membranes (porosity 0.1 μm; Whatman® Nuclepore Track-Etched Membranes). The membranes are transferred to a tube (Eppendorf®) containing 2 ml of ZR lysis solution (ZymoResearch®, USA) and heated at 60° C. for 10 minutes. They are then subjected to the mill in the presence of 0.5 mm beads (Bashing Beads, ZymoResearch®) for 2 minutes at maximum speed. RNA extraction is performed with the QuickRNA® kit (ZymoResearch®, USA) with an elution volume of 250 μl of ultrapure water. The total RNAs are fragmented using a solution comprising 40 mM Trizma base, pH 8.0/100 mM KOAc/30 mM MgOAc) for 10 minutes at 65° C. prior to hybridization and the samples are stabilized with a 0.05% EDTA solution.

The hybridization steps are performed in a standard 96-well microplate (Nunc®, Denemark) functionalized with NeutrAvidin solution at 1 μg/ml, incubated for 24 hours with the sequence probe SEQ ID NO: 20 at a concentration of 1 μM. After 24 hours the microplate is washed with a saline solution such as PBS 1× ($K_2PO_4$, 0.1 M; $KH_2PO_4$, 0.1 M; KCl, 0.1 M, pH 7.6). The eluate with RNA is mixed with the hybridization buffer (0.3 M NaCl, 0.08 M Tris-HCl, 0.04% SDS, pH 8) to a final volume of 300 μl containing the sequence probe SEQ ID NO: 68 at a concentration of 1 μM. The hybridization mix is heated at 60° C. for 10 minutes, then a final 0.05 M EDTA solution is added. 100 μl of the mixture is dispensed into 3 wells of the microplate and incubated for 15 minutes at 60° C. The microplate is washed three times with a saline solution such as PBS 1×. 100 μL of anti-DIG-HRP antibody at a concentration of 75 mU/ml is then added and incubated for 15 minutes at room temperature. 100 μL of TMB are added and the absorbance is measured after 15 minutes of reaction at a wavelength of 630 nm. Then 50 μL of $H_2SO_4$ 10% are added and the absorbance is immediately measured at a wavelength of 450 nm. Each step of the development is carried out at room temperature with constant agitation and shielded from light.

Figure 6:
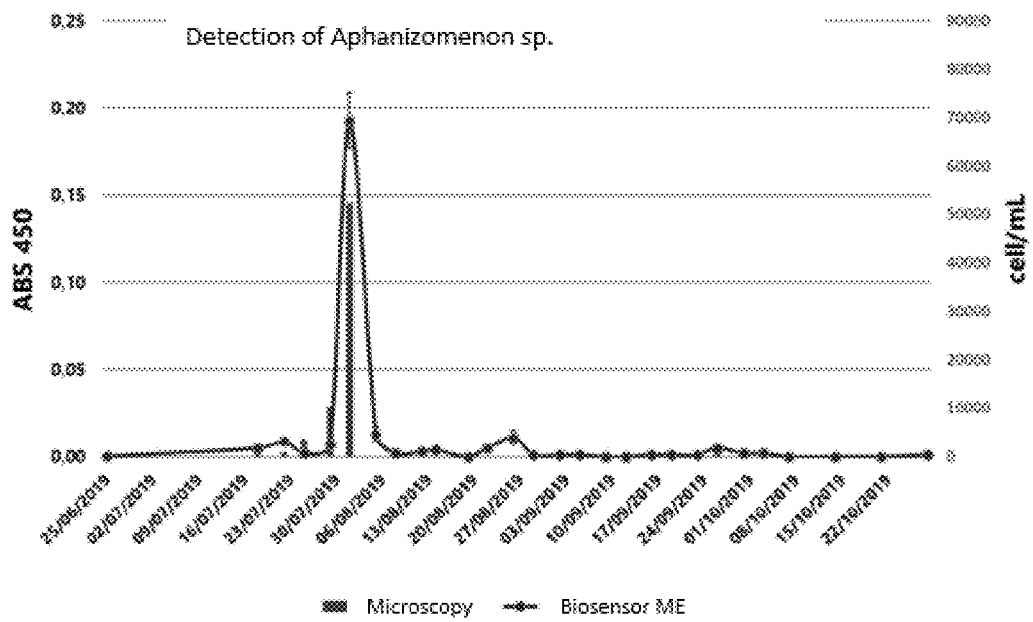
FIG. 6: Comparison of *Planktothrix* detection by microscopy cell counts (cells/mL) and signals from the sandwich hybridization test according to the invention read at 450 nm (BIOCAPTER data).

In general, the results obtained by sandwich hybridization tests with naturally contaminated environmental samples are in agreement with the counts obtained by microscopy. However, the present invention makes it possible to obtain the results in less than one hour, compared with 24 to 48 hours for the counting method. The hybridization test has allowed the detection of *Aphanizomenon*, whose lowest concentration determined by microscopy is 969 cells/mL in the environmental sample (FIG. 6). The known state of the art has never reported the detection of this type of cyanobacteria at such low cell equivalent thresholds in environmental samples. This threshold represents neither the limit of quantification nor the limit of detection in the environmental medium, which are well below what is shown by this environmental monitoring of *Aphanizomenon* activity.

d) Detection of *Planktothrix* on a Basin of Water

The monitoring of *Planktothrix* was carried out on water basin located in France (Aquitaine) from 17 Jul. to 23 Oct. 2019. Water samples were collected in 2 sites once a week or once every 15 days on the surface. In parallel, a 50 ml sub-sample was collected, fixed to the Lugol, and sedimented for 24 hours. Microscopic counting according to the Utermöhlmethod required a 12-hour sedimentation step followed by a careful counting of the cells under the microscope. The entire Utermöhl method was carried out in 24 to 48 hours. This method makes it possible to detect the presence or absence of cells of toxinogenic cyanobacteria of the genus *Planktothrix* and thus to determine the number of cells. However, this method cannot determine the activity of cells of toxinogenic cyanobacteria of the genus *Planktothrix*.

The execution of the present invention was carried out in less than one hour and made it possible to determine the activity of the cells of toxinogenic cyanobacteria of the genus *Planktothrix* as well as the number of cells.

For each hybridization test and for each site, 50 millilitres of water are immediately filtered through polycarbonate membranes (porosity 0.1 µm; Whatman® Nuclepore Track-Etched Membranes). The membranes are transferred to a tube (Eppendorf®) containing 2 ml of ZR lysis solution (ZymoResearch®, USA) and heated at 60° C. for 10 minutes. They are then subjected to the mill in the presence of 0.5 mm beads (Bashing Beads, ZymoResearch®) for 2 minutes at maximum speed. RNA extraction is performed with the QuickRNA® kit (ZymoResearch®, USA) with an elution volume of 100 µl of ultrapure water. The total RNAs are fragmented using a solution comprising 40 mM Trizma base, pH 8.0/100 mM KOAc/30 mM MgOAc) for 10 minutes at 65° C. prior to hybridization and the samples are stabilized with a 0.05% EDTA solution.

The hybridization steps are performed in a standard 96-well microplate (Nunc®, Denmark) functionalized with NeutrAvidin solution at 1 µg/ml, incubated for 24 hours with the sequence probe SEQ ID NO: 67 at a concentration of 1 µM. After 24 hours the microplate is washed with a saline solution such as PBS 1× ($K_2PO_4$, 0.1 M; $KH_2PO_4$, 0.1 M; KCl, 0.1 M, pH 7.6). The eluate with RNA is mixed with the hybridization buffer (0.3 M NaCl, 0.08 M Tris-HCl, 0.04% SDS, pH 8) to a final volume of 300 µl containing the sequence probe SEQ ID NO: 68 at a concentration of 1 µM. The hybridization mix is heated at 60° C. for 10 minutes, then a final 0.05 M EDTA solution is added. 100 µl of the mixture is dispensed into 3 wells of the microplate and incubated for 15 minutes at 60° C. The microplate is washed three times with a saline solution such as PBS 1×. 100 µL of anti-DIG-HRP antibody at a concentration of 75 mU/ml is then added and incubated for 15 minutes at room temperature. 100 µL of TMB are added and the absorbance is measured after 15 minutes of reaction at a wavelength of 630 nm. Then 50 µL of 10% $H_2SO_4$ are added and the absorbance is immediately measured at a wavelength of 450 nm. Each step of the development is carried out at room temperature with constant agitation and shielded from light.

Figure 7:
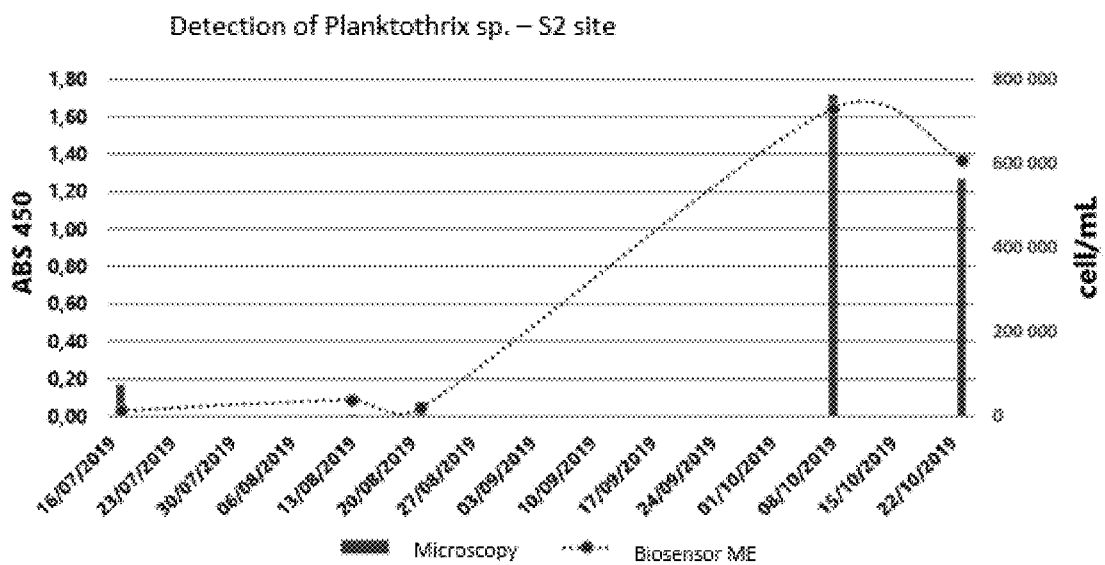
FIG. 7: Comparison of *Planktothrix* detection by microscopy cell counts (cells/mL) and signals from the sandwich hybridization test according to the invention read at 450 nm (BIOCAPTER data).
Figure 7:
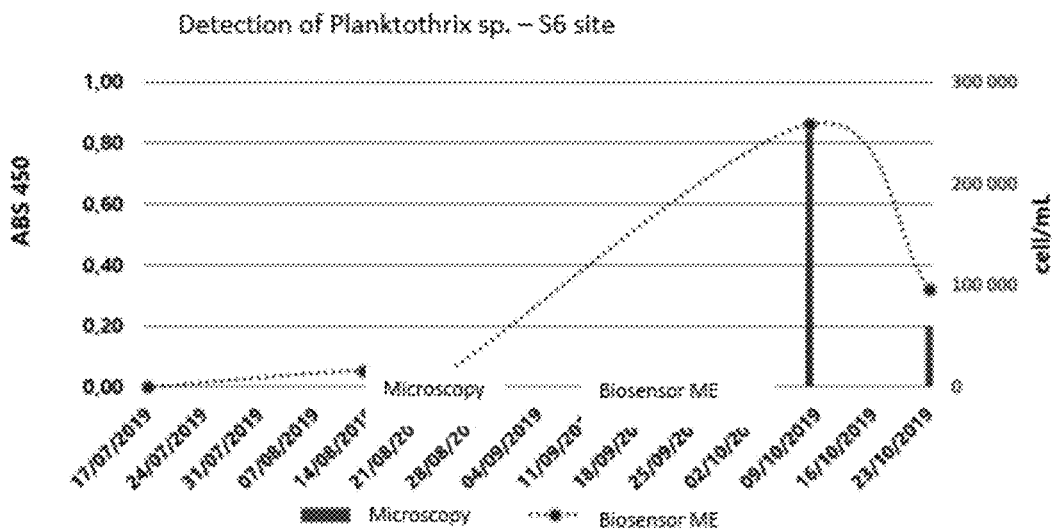

In general, the results obtained by sandwich hybridization tests with naturally contaminated environmental samples are in agreement with the counts obtained by microscopy. However, the present invention makes it possible to obtain the results in less than one hour, compared with 24 to 48 hours for the counting method. The hybridization assay allowed the detection of *Planktothrix* with the lowest microscopically determined concentration of 3083 cells/mL for the S2 site (FIG. 7a) and 1116 cells/mL for the S6 site in the environmental samples (FIG. 7b). The known state of the art has never reported the detection of this type of cyanobacteria at such low cell equivalent thresholds in environmental samples. This threshold represents neither the limit of quantification nor the limit of detection in the environmental medium, which are well below what is shown by this environmental monitoring of *Planktothrix* activity.

The invention claimed is:

1. A method for the detection of at least one toxinogenic cyanobacteria of the genus *Microcystis* in a sample comprising the following steps:
   a) contacting said sample with a capture probe and a signal probe specific to toxinogenic cyanobacteria of the genus *Microcystis*, the capture probe and the signal probe forming a pair of probes, wherein the sequences of the probes of said pairs are as follows:
   SEQ ID NO: 1 and SEQ ID NO: 2,
   SEQ ID NO: 15 and SEQ ID NO: 16, or
   SEQ ID NO: 18 and SEQ ID NO: 19,
   said capture probe being linked to at least one attachment molecule positioned at 3' or 5' end of its sequence and said signal probe being linked to at least one marking molecule positioned at 3' or 5' end of its sequence, said capture probe and said signal probe being capable of hybridizing with a ribosomal nucleic acid of a toxinogenic cyanobacteria of the genus *Microcystis* to form a complex, and b) detection of said hybridization complex, wherein presence of said hybridization complex indicates the presence of toxinogenic cyanobacteria of the genus *Microcystis* in the sample.

2. The method for the detection of toxinogenic cyanobacteria according to claim 1, further comprising contacting said sample with a capture probe and a signal probe specific to toxinogenic cyanobacteria of the genus *Aphanizomenon*, the capture probe and the signal probe forming a pair of probes, wherein the sequences of the probes of said pairs are as follows:

(SEQ ID NO: 20 and SEQ ID NO: 21), (SEQ ID NO: 20 and SEQ ID NO: 22), (SEQ ID NO: 21 and SEQ ID NO: 22); or (SEQ ID NO: 23 and SEQ ID NO: 24), said capture probe being linked to at least one attachment molecule positioned at 3' or 5' end of its sequence and said signal probe being linked to at least one marking molecule positioned at 3' or 5' end of its sequence, wherein presence of a hybridization complex indicates the presence of toxinogenic cyanobacteria of the genus *Aphanizomenon* in the sample.

3. The method for the detection of toxinogenic cyanobacteria according to claim 1, further comprising contacting said sample with a capture probe and a signal probe specific to toxinogenic cyanobacteria of the genus *Dolichospermum*, the capture probe and the signal probe forming a pair of probes, wherein the sequences of the probes of said pairs are as follows:

(SEQ ID NO 25 and SEQ ID NO 26), said capture probe being linked to at least one attachment molecule positioned at 3' or 5' end of its sequence and said signal probe being linked to at least one marking molecule positioned at 3' or 5' end of its sequence, wherein presence of a hybridization complex indicates the presence of toxinogenic cyanobacteria of the genus *Dolichospermum* in the sample.

4. The method for the detection of toxinogenic cyanobacteria according to claim 1, further comprising contacting said sample with a capture probe and a signal probe specific to toxinogenic cyanobacteria of the genus *Anabaena*, the capture probe and the signal probe forming a pair of probes, wherein the sequences of the probes of said pairs are as follows:

(SEQ ID NO: 27 and SEQ ID NO: 28), (SEQ ID NO: 27 and SEQ ID NO: 29), (SEQ ID NO: 28 and SEQ ID NO: 29);

(SEQ ID NO: 30 and SEQ ID NO: 31), (SEQ ID NO: 30 and SEQ ID NO: 32), (SEQ ID NO: 31 and SEQ ID NO: 32);

(SEQ ID NO: 33 and SEQ ID NO: 34), (SEQ ID NO: 33 and SEQ ID NO: 35), (SEQ ID NO: 34 and SEQ ID NO: 35);

(SEQ ID NO: 36 and SEQ ID NO: 37), (SEQ ID NO: 36 and SEQ ID NO: 38), (SEQ ID NO: 36 and SEQ ID NO: 39), (SEQ ID NO: 37 and SEQ ID NO: 38), (SEQ ID NO: 37 and SEQ ID NO: 39), (SEQ ID NO: 38 and SEQ ID NO: 39);

(SEQ ID NO: 40 and SEQ ID NO: 41), (SEQ ID NO: 40 and SEQ ID NO: 42), (SEQ ID NO: 41 and SEQ ID NO: 42);

(SEQ ID NO: 43 and SEQ ID NO: 44), (SEQ ID NO: 43 and SEQ ID NO: 45), (SEQ ID NO: 44 and SEQ ID NO: 45);

(SEQ ID NO: 46 and SEQ ID NO: 47), (SEQ ID NO: 46 and SEQ ID NO: 48), (SEQ ID NO: 47 and SEQ ID NO: 48);

(SEQ ID NO: 49 and SEQ ID NO: 50), (SEQ ID NO: 49 and SEQ ID NO: 51), (SEQ ID NO: 50 and SEQ ID NO: 51);

(SEQ ID NO: 52 and SEQ ID NO: 53), (SEQ ID NO: 52 and SEQ ID NO: 54), (SEQ ID NO: 53 and SEQ ID NO: 54);

(SEQ ID NO: 55 and SEQ ID NO: 56);

(SEQ ID NO: 57 and SEQ ID NO: 58), (SEQ ID NO: 57 and SEQ ID NO: 59), (SEQ ID NO: 58 and SEQ ID NO: 59); or (SEQ ID NO: 60 and SEQ ID NO: 61), (SEQ ID NO: 60 and SEQ ID NO: 62), (SEQ ID NO: 61 and SEQ ID NO: 62), said capture probe being linked to at least one attachment molecule positioned at 3' or 5' end of its sequence and said signal probe being linked to at least one marking molecule positioned at 3' or 5' end of its sequence, wherein presence of a hybridization complex indicates the presence of toxinogenic cyanobacteria of the genus *Anabaena* in the sample.

5. The method for the detection of toxinogenic cyanobacteria according to claim 1, further comprising contacting said sample with a capture probe and a signal probe specific to toxinogenic cyanobacteria of the genus *Planktothrix*, the capture probe and the signal probe forming a pair of probes, wherein the sequences of the probes of said pairs are as follows:

(SEQ ID NO: 63 and SEQ ID NO: 64), (SEQ ID NO: 63 and SEQ ID NO: 65), (SEQ ID NO: 63 and SEQ ID NO: 66), (SEQ ID NO: 64 and SEQ ID NO: 65), (SEQ ID NO: 64 and SEQ ID NO: 66), (SEQ ID NO: 65 and SEQ ID NO: 66); or (SEQ ID NO: 67 and SEQ ID NO: 68), (SEQ ID NO: 67 and SEQ ID NO: 69), (SEQ ID NO: 68 and SEQ ID NO: 69), said capture probe being linked to at least one attachment molecule positioned at 3' or 5' end of its sequence and said signal probe being linked to at least one marking molecule positioned at 3' or 5' end of its sequence, wherein presence of a hybridization complex indicates the presence of toxinogenic cyanobacteria of the genus *Planktothrix* in the sample.

6. The method for the detection of toxinogenic cyanobacteria according to claim 1, wherein, said capture probe is linked to at least one attachment molecule positioned 5' end to its sequence and said signal probe is linked to at least one marking molecule positioned 5' end to its sequence, or said capture probe is linked to at least one attachment molecule positioned 5' end of its sequence and said signal probe is linked to at least one marking molecule positioned 3' end of its sequence, or said capture probe is linked to at least one attachment molecule positioned 3' end of its sequence and said signal probe is linked to at least one marking molecule positioned 5' end of its sequence, or said capture probe is linked to at least one attachment molecule positioned 3' end of its sequence and said signal probe is linked to at least one marking molecule positioned 3' end of its sequence.

7. A pair of probes for the detection of toxinogenic cyanobacteria of the genus *Microcystis*, the sequences of which are as follows:
 SEQ ID NO: 1 and SEQ ID NO: 2,
 SEQ ID NO: 15 and SEQ ID NO: 16, or
 SEQ ID NO: 18 and SEQ ID NO: 19,
 wherein one probe of said pair is a capture probe linked to at least one attachment molecule position at 3' or 5' end of its sequence and the other probe of said pair is a signal probe linked at least one marking molecule positioned at 3' or 5' end of its sequence.

8. A kit for the detection of toxinogenic cyanobacteria of the genus *Microcystis*, said kit containing:
 a) at least one pair of probes specific to toxinogenic cyanobacteria of the genus *Microcystis*, the sequences of said probes being as follows:
 SEQ ID NO: 1 and SEQ ID NO: 2,
 SEQ ID NO: 15 and SEQ ID NO: 16, or
 SEQ ID NO: 18 and SEQ ID NO: 19,
 wherein one probe of said pair being a capture probe linked to at least one attachment molecule positioned at 3' or 5' end of its sequence and the other probe of said pair being a signal probe linked to at least one marking molecule positioned at 3' or 5' end of its sequence,
 said capture probe and said signal probe being capable of hybridizing with a ribosomal nucleic acid of a toxinogenic cyanobacteria of the genus *Microcystis*,
 b) optionally a hybridization solution,
 c) optionally a washing solution, and
 d) optionally one or more revelation solutions.

9. The kit according to claim 8, for the detection of toxinogenic cyanobacteria of the genus *Microcystis* and/or *Aphanizomenon*, said kit additionally containing:
 at least one pair of probes specific to toxinogenic cyanobacteria of the genus *Aphanizomenon*, the sequences of said probes being as follows:
 (SEQ ID NO: 20 and SEQ ID NO: 21), (SEQ ID NO: 20 and SEQ ID NO: 22), (SEQ ID NO: 21 and SEQ ID NO: 22); or
 (SEQ ID NO: 23 and SEQ ID NO: 24),
 one probe of said pair being a capture probe linked to at least one attachment molecule positioned at 3' or 5' end of its sequence and the other probe of said pair being a signal probe linked to at least one marking molecule positioned at 3' or 5' end of its sequence,
 said capture probe and said signal probe being capable of hybridizing with a ribosomal nucleic acid of a toxinogenic cyanobacteria of the genus *Aphanizomenon*.

10. The kit according to claim 8, for the detection of toxinogenic cyanobacteria of the genus *Microcystis* and/or *Dolichospermum*, said kit additionally containing:
 at least one pair of probes specific to toxinogenic cyanobacteria of the genus *Dolichospermum*, the sequences of said probes being as follows:
 (SEQ ID NO: 25 and SEQ ID NO: 26),
 one probe of said pair being a capture probe linked to at least one attachment molecule positioned at 3' or 5' end of its sequence and the other probe of said pair being a signal probe linked to at least one marking molecule positioned at 3' or 5' end of its sequence,
 said capture probe and said signal probe being capable of hybridizing with a ribosomal nucleic acid of a toxinogenic cyanobacteria of the genus *Dolichospermum*.

11. The kit according to claim 8, for the detection of toxinogenic cyanobacteria of the genus *Microcystis* and/or *Anabaena*, said kit additionally containing:
 at least one pair of probes specific to toxinogenic cyanobacteria of the genus *Anabaena*, the sequences of said probes being as follows:
 (SEQ ID NO: 27 and SEQ ID NO: 28), (SEQ ID NO: 27 and SEQ ID NO: 29), (SEQ ID NO: 28 and SEQ ID NO: 29);
 (SEQ ID NO: 30 and SEQ ID NO: 31), (SEQ ID NO: 30 and SEQ ID NO: 32), (SEQ ID NO: 31 and SEQ ID NO: 32);
 (SEQ ID NO: 33 and SEQ ID NO: 34), (SEQ ID NO: 33 and SEQ ID NO: 35), (SEQ ID NO: 34 and SEQ ID NO: 35);
 (SEQ ID NO: 36 and SEQ ID NO: 37), (SEQ ID NO: 36 and SEQ ID NO: 38), (SEQ ID NO: 36 and SEQ ID NO: 39), (SEQ ID NO: 37 and SEQ ID NO: 38), (SEQ ID NO: 37 and SEQ ID NO: 39), (SEQ ID NO: 38 and SEQ ID NO: 39);
 (SEQ ID NO: 40 and SEQ ID NO: 41), (SEQ ID NO: 40 and SEQ ID NO: 42), (SEQ ID NO: 41 and SEQ ID NO: 42);
 (SEQ ID NO: 43 and SEQ ID NO: 44), (SEQ ID NO: 43 and SEQ ID NO: 45), (SEQ ID NO: 44 and SEQ ID NO: 45);
 (SEQ ID NO: 46 and SEQ ID NO: 47), (SEQ ID NO: 46 and SEQ ID NO: 48), (SEQ ID NO: 47 and SEQ ID NO: 48);
 (SEQ ID NO: 49 and SEQ ID NO: 50), (SEQ ID NO: 49 and SEQ ID NO: 51), (SEQ ID NO: 50 and SEQ ID NO: 51);
 (SEQ ID NO: 52 and SEQ ID NO: 53), (SEQ ID NO: 52 and SEQ ID NO: 54), (SEQ ID NO: 53 and SEQ ID NO: 54);
 (SEQ ID NO: 55 and SEQ ID NO: 56);
 (SEQ ID NO: 57 and SEQ ID NO: 58), (SEQ ID NO: 57 and SEQ ID NO: 59), (SEQ ID NO: 58 and SEQ ID NO: 59); or
 (SEQ ID NO: 60 and SEQ ID NO: 61), (SEQ ID NO: 60 and SEQ ID NO: 62), (SEQ ID NO: 61 and SEQ ID NO: 62),
 one probe of said pair being a capture probe linked to at least one attachment molecule positioned at 3' or 5' end of its sequence and the other probe of said pair being a signal probe linked to at least one marking molecule positioned at 3' or 5' end of its sequence, and
 said capture probe and said signal probe being capable of hybridizing with a ribosomal nucleic acid of a toxinogenic cyanobacteria of the genus *Anabaena*.

12. The kit according to claim 8, for the detection of toxinogenic cyanobacteria of the genus *Microcystis* and/or *Planktothrix*, said kit additionally containing:
 at least one pair of probes specific to toxinogenic cyanobacteria of the genus *Planktothrix*, the sequences of said probes being as follows:
 (SEQ ID NO: 63 and SEQ ID NO: 64), (SEQ ID NO: 63 and SEQ ID NO: 65), (SEQ ID NO: 63 and SEQ ID NO: 66), (SEQ ID NO: 64 and SEQ ID NO: 65), (SEQ ID NO: 64 and SEQ ID NO: 66), (SEQ ID NO: 65 and SEQ ID NO: 66); or
 (SEQ ID NO: 67 and SEQ ID NO: 68), (SEQ ID NO: 67 and SEQ ID NO: 69), (SEQ ID NO: 68 and SEQ ID NO: 69),
 one probe of said pair being a capture probe linked to at least one attachment molecule positioned at 3' or 5' end of its sequence and the other probe of said pair being a signal probe linked to at least one marking molecule positioned at 3' or 5' end of its sequence, and said capture probe and said signal probe being capable of hybridizing with a ribosomal nucleic acid of a toxinogenic cyanobacteria of the genus *Planktothrix*.

13. The kit according to claim 8, said kit additionally including a support.

14. The kit according to claim 13, said support being selected from the group consisting of: a microplate, a glass slide, magnetic beads, and electrodes printed in different materials such as carbon or gold.

15. The method for the detection of toxinogenic cyanobacteria according to claim 1, wherein said at least one attachment molecule is selected from a biotin, avidin, streptavidin, a thiol group, an amine group and a carbon.

16. The method for the detection of toxinogenic cyanobacteria according to claim 15, wherein said at least one attachment molecule is a biotin molecule.

17. The method for the detection of toxinogenic cyanobacteria according to claim 1, said at least one marking molecule is a fluorochrome, a biotin, a biotin-bound molecule, digoxigenin, an enzyme using a chemiluminescent substrate, an enzyme using a chromogenic substrate or an enzyme using an electrochemically oxidized substrate.

18. The method for the detection of toxinogenic cyanobacteria according to claim 17, wherein said at least one marking molecule is:

digoxigenin; or alkaline phosphatase, the chromogenic substrate of which is Tetrazolium Nitroblue (NBT) or Bromochlorylindolophosphate (BCIP); or horseradish peroxidase (HRP), the chromogenic substrate of which is 3,3'-Diaminobenzidine (DAB), 3,3',5,5'-Tetramethylbenzidine (TMB), or 2,2'-azino-bis(3-ethylbenzothiazoline-6-sulphonic acid) (ABTS).

* * * * *